US012697829B2

(12) United States Patent
David et al.

(10) Patent No.: US 12,697,829 B2
(45) Date of Patent: Aug. 4, 2026

(54) PRINTHEAD FORCE ADJUST AND LIFT SYSTEM AND METHOD

(71) Applicant: Brady Worldwide, Inc., Milwaukee, WI (US)

(72) Inventors: Don Rodriguez David, Singapore (SG); Mui Heng Too, Singapore (SG)

(73) Assignee: Brady Worldwide, Inc., Milwaukee, WI (US)

( * ) Notice: Subject to any disclaimer, the term of this patent is extended or adjusted under 35 U.S.C. 154(b) by 103 days.

(21) Appl. No.: 18/790,744

(22) Filed: Jul. 31, 2024

(65) Prior Publication Data

US 2026/0034813 A1 Feb. 5, 2026

(51) Int. Cl.

*B41J 25/308* (2006.01)
*B41J 2/325* (2006.01)
*B41J 11/00* (2006.01)
*B41J 11/04* (2006.01)
*B41J 15/04* (2006.01)

(52) U.S. Cl.

CPC ........... *B41J 25/3082* (2013.01); *B41J 2/325* (2013.01); *B41J 11/009* (2013.01); *B41J 11/04* (2013.01); *B41J 15/044* (2013.01)

(58) Field of Classification Search

CPC ... B41J 2/32; B41J 2/325; B41J 15/042; B41J 11/04; B41J 2202/31; B41J 25/312; B41J 25/34; B41J 3/4075; B65H 2701/192
See application file for complete search history.

(56) References Cited

U.S. PATENT DOCUMENTS 3,107,875 A 10/1963 Gochenour et al.
3,990,690 A 11/1976 Lick
(Continued)

FOREIGN PATENT DOCUMENTS

CN 201089251 7/2008
CN 101659162 3/2010
(Continued)

OTHER PUBLICATIONS

Brady, "BradyPrinter i7100 600 dpi Industrial Label Printer with Product and Wire ID Software Suite", https://www.bradyid.com/label-printers/bradyprinter-i7100-600dpi-industrial-label-printer-product-wire-id-software-suite-pid-149056?s_kwcid=AL!10720!3!309643306982!e!!g!!i7100&cid=ppc&camp=ppc-us-brand-google.com-search-models_exact-i7100-i7100&gad_source=1&gclid=Cj0KCQjw-r-vBhCARIsAGgUO2AUxMKTjV5dcxFJ2_07HQwdlSEGfbkFDUslm1OQ--yKe7jeooS1qaUaAhqDEALw_wcB, 9 pages, Accessed May 30, 2024.
(Continued)

*Primary Examiner* — John P Zimmermann
(74) *Attorney, Agent, or Firm* — Husch Blackwell LLP

(57) ABSTRACT

The present disclosure is directed to a printhead assembly for use in a printer. The printhead assembly includes a printhead positioned to engage a platen roller of the printer and a printhead holder retaining the printhead. The printhead assembly also includes a cam shaft designed to rotate into an idle position and one or more active positions and a force cam connected to the cam shaft and positioned to apply a variable downward force to the printhead. The printhead assembly further includes lift cams connected to the cam shaft and positioned to engage the printhead holder. The force cam causes the printhead to apply a nip force to the platen roller when the cam shaft is in any of the active positions. The lift cams engage the printhead holder and move the printhead out of engagement with the platen roller when the cam shaft is in the idle position.

20 Claims, 51 Drawing Sheets

(56) References Cited

U.S. PATENT DOCUMENTS

| | | | | |
|---|---|---|---|---|
| 4,079,896 | A | 3/1978 | Plach | |
| 4,815,871 | A | 3/1989 | Mcgourty et al. | |
| 4,897,670 | A | 1/1990 | Hasegawa et al. | |
| 4,919,555 | A | 4/1990 | Kikuchi | |
| 4,984,915 | A | 1/1991 | Tashiro et al. | |
| 5,170,960 | A | 12/1992 | Pretto | |
| 5,176,458 | A | 1/1993 | Wirth | |
| 5,232,174 | A | 8/1993 | Sato et al. | |
| 5,304,007 | A | 4/1994 | Flanagan | |
| 5,318,370 | A | 6/1994 | Nehowig | |
| 5,445,463 | A | 8/1995 | Paranjpe | |
| 5,455,617 | A | 10/1995 | Stephenson et al. | |
| 5,531,527 | A | 7/1996 | Maekawa et al. | |
| 5,694,159 | A * | 12/1997 | Kajiya | B41J 2/32 347/222 |
| 5,718,525 | A | 2/1998 | Bruhnke et al. | |
| 5,788,384 | A | 8/1998 | Goodwin et al. | |
| 5,813,343 | A | 9/1998 | Harb | |
| 5,820,277 | A | 10/1998 | Schulte | |
| 5,938,350 | A | 8/1999 | Colonel | |
| 5,947,409 | A | 9/1999 | Corrigan, Jr. | |
| 6,061,076 | A * | 5/2000 | Ishii | B41J 11/20 347/197 |
| 6,095,704 | A | 8/2000 | Jaeger et al. | |
| 6,183,148 | B1 * | 2/2001 | Martinez | B41J 2/32 400/600.1 |
| 6,266,075 | B1 | 7/2001 | Feitel et al. | |
| 6,302,604 | B1 | 10/2001 | Bryant et al. | |
| 6,361,228 | B1 | 3/2002 | Barrus et al. | |
| 6,364,552 | B1 | 4/2002 | Nehowig et al. | |
| 6,616,362 | B2 | 9/2003 | Bouverie et al. | |
| 6,644,544 | B1 | 11/2003 | Spurr et al. | |
| 6,769,825 | B2 | 8/2004 | Strohdiek et al. | |
| 6,840,689 | B2 | 1/2005 | Barrus et al. | |
| 7,125,182 | B2 | 10/2006 | Campbell et al. | |
| 7,131,778 | B2 | 11/2006 | Tobin et al. | |
| 7,427,132 | B2 * | 9/2008 | Sawai | B41J 29/02 347/198 |
| 7,506,834 | B2 | 3/2009 | Lenkl | |
| 7,824,116 | B2 | 11/2010 | Lyman | |
| 7,893,952 | B2 | 2/2011 | Bandholz et al. | |
| 7,905,444 | B2 | 3/2011 | Chen | |
| 7,911,204 | B2 | 3/2011 | Chen | |
| 8,029,201 | B2 | 10/2011 | Chen | |
| 8,177,446 | B2 | 5/2012 | Kuo et al. | |
| 8,182,163 | B2 | 5/2012 | Kuo et al. | |
| 8,616,793 | B2 | 12/2013 | Kasugai et al. | |
| 8,648,890 | B2 | 2/2014 | Eoka | |
| 8,721,203 | B2 | 5/2014 | Ehrhardt, Jr. | |
| 8,783,981 | B2 | 7/2014 | Watson et al. | |
| 8,844,859 | B2 | 9/2014 | Deonarine | |
| 9,545,800 | B2 * | 1/2017 | Murata | B41J 2/32 |
| 9,718,285 | B2 | 8/2017 | Kokuta | |
| 9,908,344 | B2 | 3/2018 | Onodera et al. | |
| 10,059,135 | B2 * | 8/2018 | Ando | B41J 25/34 |
| 10,301,132 | B2 | 5/2019 | Gonzalez Perello et al. | |
| 10,618,311 | B2 | 4/2020 | Lu et al. | |
| 10,640,325 | B2 | 5/2020 | Yap | |
| 10,759,202 | B2 | 9/2020 | Chen et al. | |
| 10,967,660 | B2 | 4/2021 | Ji et al. | |
| 2006/0033802 | A1 | 2/2006 | Park | |
| 2006/0239741 | A1 * | 10/2006 | Han | B41J 13/0045 400/120.01 |
| 2006/0291933 | A1 * | 12/2006 | Watanabe | B41J 11/04 400/58 |
| 2007/0034727 | A1 | 2/2007 | Kaya | |
| 2008/0180468 | A1 * | 7/2008 | Takahashi | B41J 2/32 346/134 |
| 2008/0232888 | A1 | 9/2008 | Liu et al. | |
| 2009/0175670 | A1 | 7/2009 | Chen | |
| 2009/0238628 | A1 | 9/2009 | Kuo et al. | |
| 2010/0061790 | A1 | 3/2010 | Yu et al. | |
| 2011/0020044 | A1 | 1/2011 | Yu | |
| 2011/0020045 | A1 | 1/2011 | Yu | |
| 2011/0074903 | A1 * | 3/2011 | Takahashi | B41J 2/32 347/198 |
| 2012/0050446 | A1 | 3/2012 | Tsuchiya et al. | |
| 2014/0232806 | A1 * | 8/2014 | Tsuchiya | B41J 11/04 347/197 |
| 2017/0021648 | A1 * | 1/2017 | Tanizaki | B41J 3/4075 |
| 2019/0070867 | A1 | 3/2019 | Seki | |
| 2020/0238740 | A1 * | 7/2020 | Yada | B41J 25/308 |
| 2022/0379639 | A1 | 12/2022 | Shimoda | |

FOREIGN PATENT DOCUMENTS

| | | | |
|---|---|---|---|
| CN | 202702893 | | 1/2013 |
| CN | 207758366 | U | 8/2018 |
| CN | 211892498 | | 11/2020 |
| CN | 211892520 | | 11/2020 |
| CN | 112455097 | A | 3/2021 |
| CN | 213704930 | U | 7/2021 |
| CN | 215243845 | U | 12/2021 |
| CN | 116080272 | | 5/2023 |
| CN | 116215089 | | 6/2023 |
| DE | 4405044 | A1 | 8/1995 |
| DE | 20117005 | U1 | 2/2002 |
| DE | 20117004 | U1 | 4/2002 |
| DE | 202008009215 | U1 | 1/2009 |
| EP | 3255001 | A1 | 12/2017 |
| FR | 2959445 | A3 | 11/2011 |
| JP | S6377750 | A | 4/1988 |
| JP | 2008055762 | A | 3/2008 |
| JP | 2008137319 | A | 6/2008 |
| KR | 1020060079558 | | 7/2006 |
| TW | M642044 | U | 6/2023 |
| WO | 9402322 | A1 | 2/1994 |
| WO | 2008095442 | A1 | 8/2008 |

OTHER PUBLICATIONS

Wraptor A6500 Wrap Printer Applicator with Product and Wire ID Software Suite, https://www.bradyid.com/automated-labeling/wraptor-a6500-wrap-printer-applicator-product-wire-id-software-suite-pid-149242, 8 pages, Accessed Sep. 16, 2024.

Partial European Search Report received for European Patent Application No. 25190678.0, mailed on Dec. 12, 2025, 18 pages.

Extended European Search Report received for European Patent Application No. 25190678.0, mailed on Apr. 2, 2026, 19 pages.

* cited by examiner

PRINTHEAD FORCE ADJUST AND LIFT SYSTEM AND METHOD

CROSS-REFERENCE TO RELATED APPLICATIONS

None.

BACKGROUND

Thermal transfer printers employ a digital printing method that uses a ribbon and a printhead to selectively transfer ink onto a substrate (e.g., paper or another form of printable media). This method is known in the art to produce high-quality, high-resolution, durable prints. For example, thermal transfer printers are commonly used to print labels (e.g., barcodes) that will be used for long-term applications or that will be exposed to harsh conditions such as heat, ultraviolet light, moisture, and chemicals. Thermal transfer printers are also capable of handling high-volume print jobs in an efficient and cost-effective manner. For these and other reasons, thermal transfer printers are commonplace in a variety of industries including retail, healthcare, manufacturing, and others.

The ribbon and the substrate are fed between the printhead and a platen roller at a nip point. At the nip point, the printhead applies heat to the ribbon and presses the ribbon and the substrate against the platen roller such that ink melted by the printhead is transferred from the ribbon to the substrate. The force applied by the printhead at the nip point (i.e., the "nip force") is critical to the printing process as it ensures the ink-coated surface of the ribbon is pressed firmly against the substrate when the ink is transferred. However, different substrates have different nip force requirements. For example, a lower nip force may be required when printing on lightweight or specialty media like magazine paper, vinyl stickers, or coated paper (e.g., for fine art prints). On the other hand, a higher nip force may be required for heavier or rougher media such as cardstock, textured paper, canvas, and the like.

If the nip force is too low, the printhead may fail to effectively transfer ink to the substrate resulting in faint, incomplete, or patchy prints. If the nip force is too high, the ribbon material may break due to excessive pressure, prints may be smudged, blurred, or too dark, and/or the printhead may wear out more quickly due to excessive friction and heat. Additionally, the ribbon material and/or the substrate may be damaged or warped (e.g., wrinkled or dented) if the printhead applies a constant nip force to the same area over a sufficient period of time (e.g., between print jobs or during extended periods of non-use).

Existing printing devices generally require users to adjust the nip force setting manually when installing different forms of printable media. In some cases, users are required to manually adjust the printhead and associated components. In other cases, users may select the desired setting using a digital electronic display. However, in both cases, users are required to take affirmative steps to ensure the correct nip force setting and the possibility exists that a user may forget to do so. Furthermore, many existing devices leave the printhead in contact with the platen roller during periods of non-use (e.g., applying a constant nip force) because the addition of a lifting mechanism for the printhead requires additional space and may affect the usability, size, and/or cost of the printer.

In view of the issues described above, a need exists for a printhead mechanism that improves the ease and convenience of adjusting the nip force applied by the printhead to different forms of printable media. Additionally, a need exists for a printhead that is lifted out of contact with the platen roller during periods of non-use so that a constant nip force is not applied to the same area of ribbon material or substrate between print jobs or during periods of non-use. Further, providing a single mechanism capable of meeting both needs would reduce the cost and space demands of doing so.

SUMMARY

The present systems and methods disclosed herein overcome many of the shortcomings and limitations of the prior art devices discussed above.

In one aspect, a printhead assembly for use in a printer is disclosed. The printhead assembly includes a printhead positioned to engage a platen roller of the printer and a printhead holder retaining the printhead. The printhead assembly includes a cam shaft designed to rotate into an idle position and one or more active positions and a force cam connected to the cam shaft and positioned to apply a downward force to the printhead. The printhead assembly includes a first lift cam and a second lift cam, the first and second lift cams connected to the cam shaft and positioned to engage the printhead holder. The force cam causes the printhead to apply a nip force to the platen roller when the cam shaft is in any of the one or more active positions. The first and second lift cams engage the printhead holder and move the printhead out of engagement with the platen roller when the cam shaft is in the idle position.

In another aspect, a printhead control system for a printer is disclosed. The printhead control system includes a printhead assembly. The printhead assembly includes a printhead retained by a printhead holder and arranged to engage a platen roller of the printer, a cam shaft designed to rotate into one or more rotational positions, a force cam configured to apply a downward force to the printhead holder, a lift cam configured to apply an upward force to the printhead holder, a cam adjustment gear connected to the cam shaft and configured to rotate therewith, and a sensor arranged to detect the rotational position of the cam shaft. The printhead control system also includes a gear subassembly including a driver configured to generate rotational motion and a gear member arranged to transmit the rotational motion generated by the driver to the cam adjustment gear. The printhead control system further includes a controller of the printer configured to operate the gear subassembly to place the cam shaft in a desired rotational position.

In a further aspect, a method of adjusting a nip force setting of a printhead in a printer is disclosed. The method includes the step of providing a printhead assembly. The printhead assembly includes a printhead positioned to contact a platen roller of the printer, a push plate arranged to apply a downward force to the printhead, a cam shaft with a force cam positioned thereon and configured to rotate therewith, and a driver configured to change the rotational position of the cam shaft. The force cam is configured to alter the position of the push plate relative to the printhead depending on the rotational position of the cam shaft. The method includes the step of providing a media cartridge including a smart cell. The media cartridge retains a supply of printable media for use with the printer. The method also includes the steps of positioning the media cartridge on a media holder of the printer such that a reader positioned on the media holder aligns with and receives a signal from the smart cell and transmitting the signal received from the smart cell to a controller of the printer. The method further includes the steps of determining, based on the signal received, a nip force associated with the type of printable media retained by the media cartridge, operating the driver to rotate the cam shaft in a rotational position associated with the nip force such that the force cam causes the push plate to apply the nip force to the printhead, and performing printing operations with the nip force.

DETAILED DESCRIPTION

Figure 1:
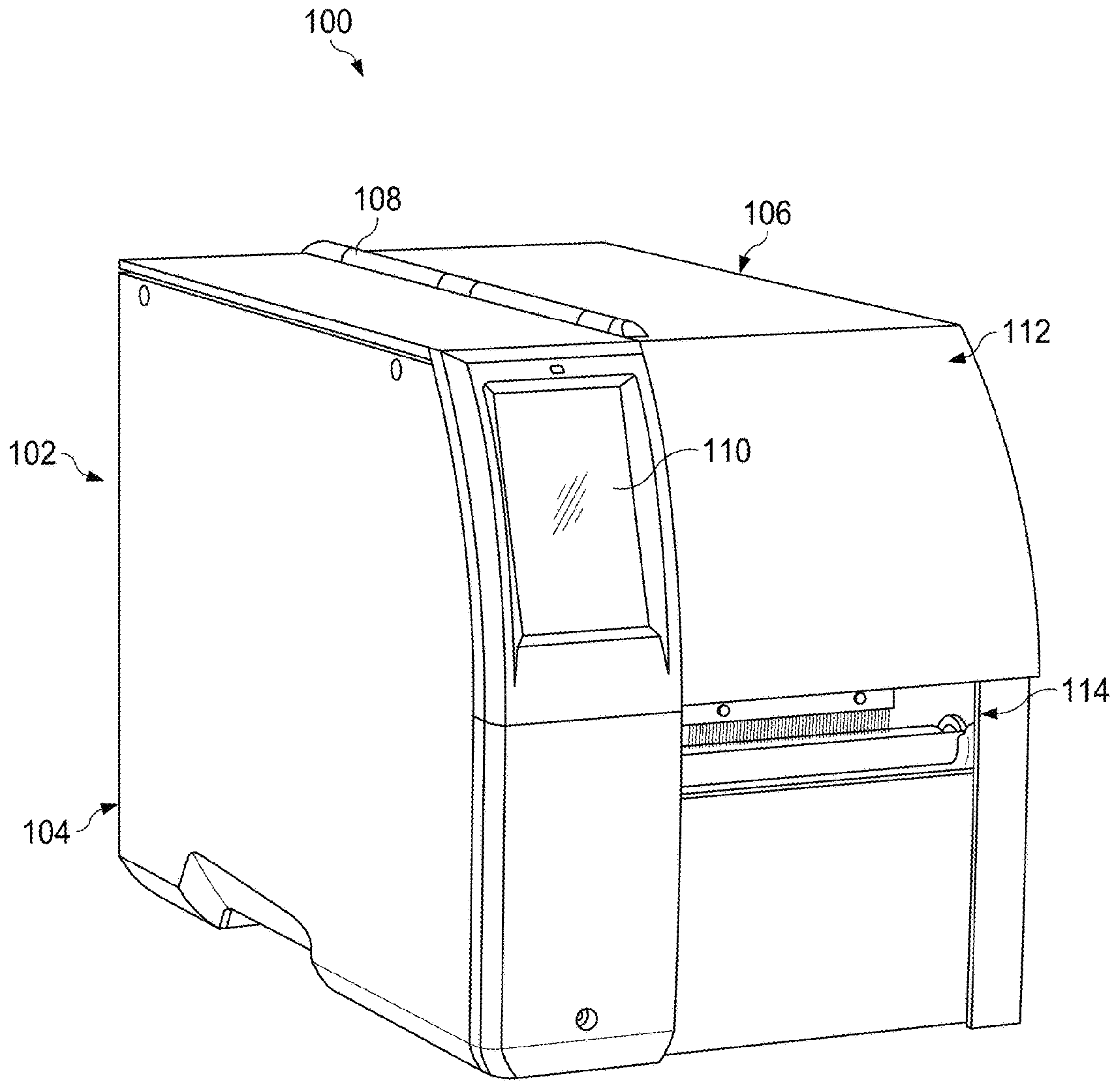
FIG. 1 illustrates a front, top, and left side isometric view of an exemplary printer in a closed configuration.

Before any embodiments are described in detail, it is to be understood that the disclosure is not limited in its application to the details of construction and the arrangement of components set forth in the following description or illustrated in the following drawings, which is limited only by the claims that follow the present disclosure. The disclosure is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the disclosure.

Additionally, while the following discussion may describe features associated with specific devices or embodiments, it is understood that additional devices and/or features can be used with the described systems and methods, and that the discussed devices and features are used to provide examples of possible embodiments, without being limited.

The present disclosure is directed to a system for adjusting one or more settings or conditions of a printhead in a printer. In some instances, the system may include one or more cammed components arranged to apply different levels of upward and/or downward force to the printhead (or to an apparatus retaining the printhead). A processor, controller, or other electronic component of the printer may be configured to alter the rotational position of the cammed components, thereby controlling the force applied to the printhead. In some instances, the system may be configured to adjust the nip force setting of the printhead, to lift the printhead, or to change other settings or conditions of the printhead.

Figure 2:
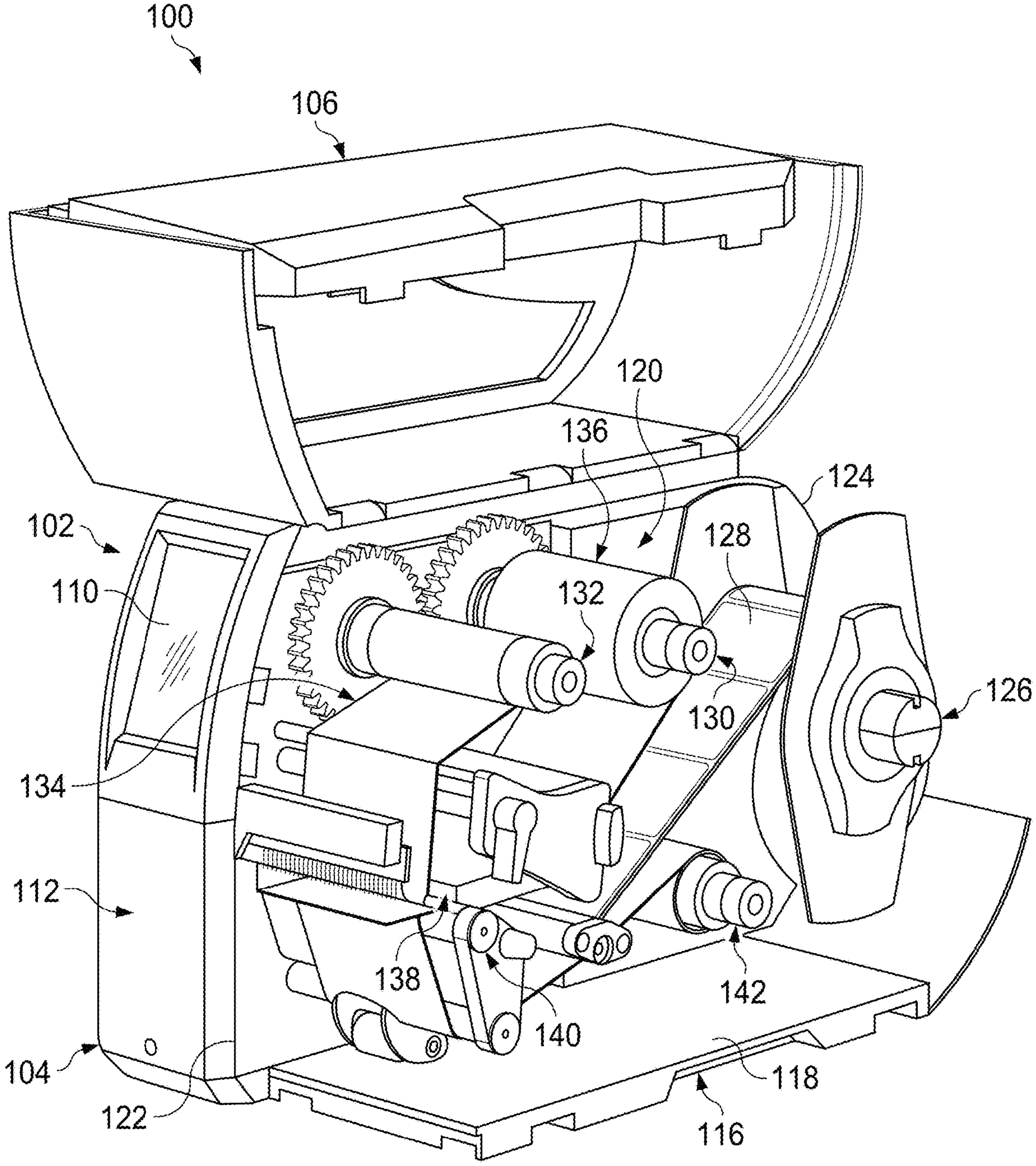
FIG. 2 illustrates a front, top, and right side isometric view of the printer of FIG. 1 in an open configuration.

Referring first to FIGS. 1 and 2, an exemplary thermal transfer printer 100 is provided in the form of a housing 102 defining a base portion 104 and an enclosure cover 106. The base portion 104 and the enclosure cover 106 may be hingedly attached or otherwise coupled to one another such that the enclosure cover 106 may be removably opened and/or attached to allow access to the internal components of the printer 100 and to allow for installation or maintenance of the internal parts. For example, the enclosure cover 106 may be coupled to the base portion 104 via a hinge 108.

A user interface 110 may be located on a front face 112 of the printer 100. The user interface 110 may allow users to operate, service, or otherwise interface with the printer 100. For example, the user interface 110 may enable users to alter certain settings or preferences with respect to one or more print jobs. Additionally, the printer 100 may include an exit slot 114 provided in the form of a rectilinear opening between the base portion 104 and the enclosure cover 106 disposed on the front face 112. The exit slot 114 may provide an aperture through which printed media produced by the printer 100 may exit the printer 100, e.g., to be retrieved by a user.

As shown in FIG. 2, the enclosure cover 106 of the printer 100 is designed to move into an open configuration. In some instances, the enclosure cover 106 may be rotatable about an axis of connection with the base portion 104 formed by the hinge 108. Thus, a user may place the printer 100 in the open configuration by lifting the enclosure cover 106 away from the base portion 104 and causing the enclosure cover 106 to rotate about the hinge, thereby exposing one or more internal components of the printer 100.

The base portion 104 may include a chassis 116 configured to support one or more internal components of the printer 100. The chassis 116 may be provided in the form of a floor 118 and a mounting wall 120 oriented in a plane that is substantially perpendicular to the floor 118. The mounting wall 120 may be formed integrally with or coupled to the floor 118 and extend upwardly therefrom. The mounting wall 120 may be defined by a front end 122 (the front end 122 corresponding to the front face 112 of the printer 100) and a rear end 124 opposing the front end 122. In some instances, the chassis 116 may be formed from cast aluminum. In other instances, the chassis 116 may be formed from any other suitable material.

Internal components of the printer 100 may be connected to the mounting wall 120 of the chassis 116. For example, a media holder 126 may be connected to the mounting wall 120 and may be positioned adjacent to the rear end 124 of the chassis 116. The media holder 126 is designed to retain and dispense a supply of printable media 128 (e.g., adhesive labels or any other suitable media) from a roll as the printer 100 operates. The media holder 126 may be configured to support printable media 128 of different sizes (e.g., labels having different widths).

The chassis 116 may also support a ribbon supply spindle 130 and a waste ribbon spindle 132 connected to the mounting wall 120. The ribbon supply spindle 130 may be positioned on the mounting wall 120 proximate to the media holder 126, and the waste ribbon spindle 132 may be positioned between the ribbon supply spindle 130 and the front end 122 of the mounting wall 120.

The ribbon supply spindle 130 may retain and dispense a supply of ribbon material 134 from a ribbon roll 136 (e.g., in a manner similar to the media holder 126) as the printer 100 operates. During the printing process, printable media 128 from the media holder 126 and ribbon material 134 from the ribbon supply spindle 130 may each be directed toward the front end 122 of the mounting wall 120. The printable media 128 and the ribbon material 134 may converge proximate to a printhead 138 and a platen roller 140. The printhead 138 and platen roller 140 may each be connected to the chassis 116 and positioned proximate to the front end 122 of the mounting wall 120. For example, the printhead

138 and platen roller 140 may be positioned on the mounting wall 120 so that the printhead 138 and platen roller 140 are positioned adjacent to the exit slot 114 when the enclosure cover 106 is placed in a closed configuration.

During printing, the printable media 128 and ribbon material 134 may pass between the printhead 138 and the platen roller 140. The printhead 138 may be configured to apply heat to the ribbon material 134 passing beneath the printhead 138, thereby causing ink from the ribbon material 134 to melt and adhere to an adjacent portion of the printable media 128. At the same time, the platen roller 140 may be arranged to provide a smooth support surface to the printable media 128 and ribbon material 134 as they pass beneath the printhead 138 and come into contact with one another. For example, the platen roller 140 may apply a pressure against the printable media 128 and the ribbon material 134, thereby ensuring that each engages firmly with the printhead 138 such that ink from the ribbon material 134 is effectively transferred to the printable media 128.

Once the ink from the ribbon material 134 has been applied to the printable media 128 by the printhead 138, the printable media 128 may exit the printer 100 via the exit slot 114 and the used ribbon material 134 may be directed to and collected on the waste ribbon spindle 132. In some instances, rather than exiting the printer 100 via the exit slot 114, the printable media 128 may be directed back toward the rear end 124 of the mounting wall 120 where the printable media 128 may be collected by a rewinder 142. In this way, the printer 100 may generate as an end product a roll of printed media (e.g., a roll of printed labels) to be later retrieved, or otherwise removed, by a user, rather than supplying the finished product directly to a user via the exit slot 114.

Figure 3:
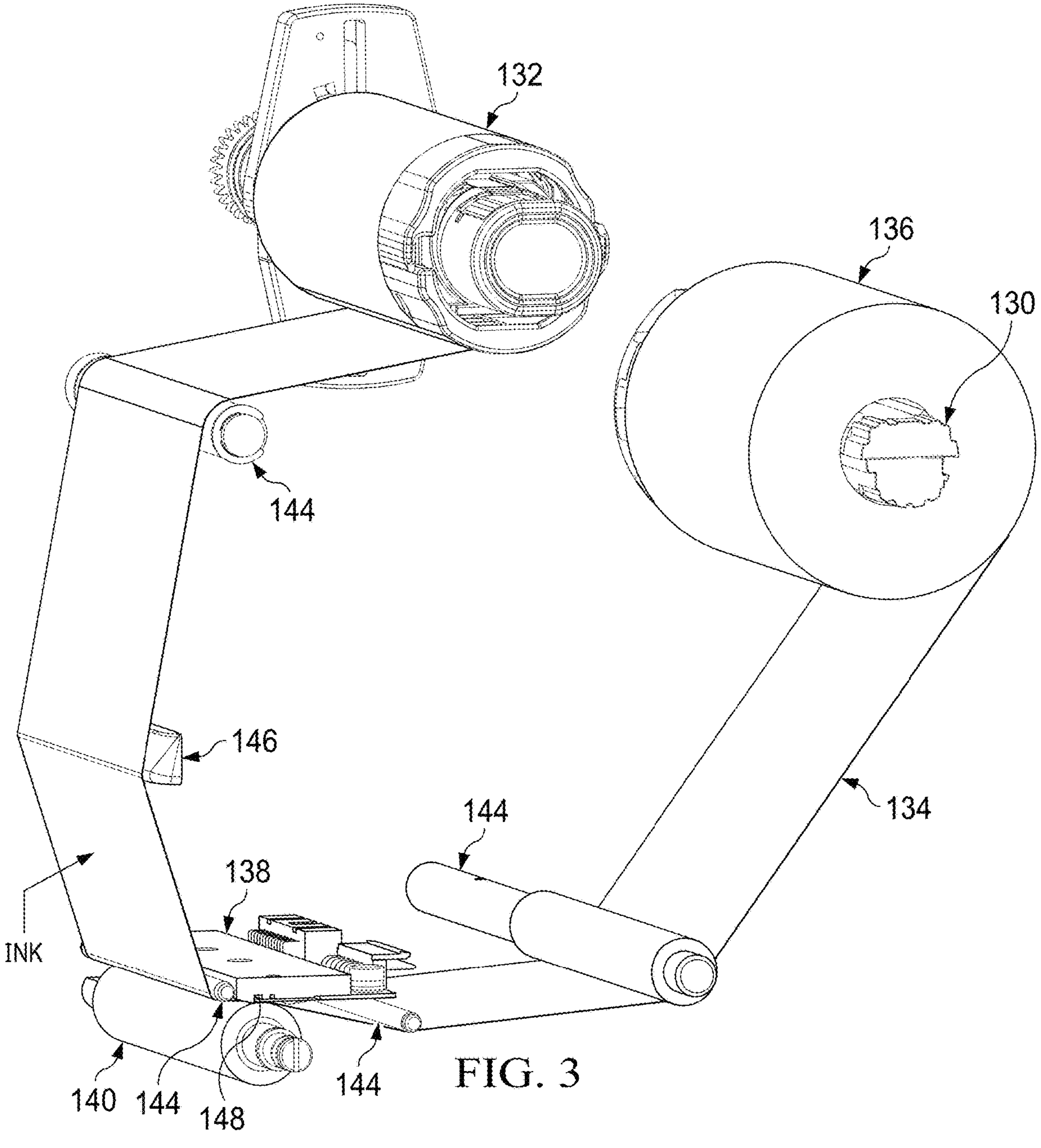
FIG. 3 illustrates a front, top, and left side isometric view of several components of the printer of FIGS. 1 and 2.

Turning to FIG. 3, the printer 100 may include one or more rollers 144 and/or one or more diverters 146 arranged to deflect or guide the ribbon material 134 along a desired ribbon path. In some instances, the printer 100 may include four rollers 144 and one diverter 146 as shown in FIG. 3. In other instances, the printer 100 may include any number of rollers 144 and/or diverters 146, and the rollers 144 and diverters 146 may be arranged to guide the ribbon material 134 along any suitable path. During operation (e.g., of the printer 100), unused ribbon material 134 may be unwound from the ribbon roll 136 installed on the ribbon supply spindle 130, the ribbon material 134 may be guided along a desired ribbon path that passes between the printhead 138 and the platen roller 140 such that the ribbon material 134 can be acted on by the printhead 138, and used ribbon material 134 may be collected on the waste ribbon spindle 132.

The ribbon path may guide the ribbon material 134 through a nip point 148 where the printhead 138 contacts or is positioned adjacent to the platen roller 140. In some instances, the ribbon material 134 (and the printable media 128 shown in FIG. 2) may be subject to a nip force at the nip point 148 (e.g., a pinching force applied by the printhead 138). Some types of printable media 128 may require a higher or lower nip force to achieve optimum print quality. Thus, in some instances, the nip force applied at the nip point 148 may need to be adjusted depending on the type of printing operation being performed or the type of printable media 128 being used.

Figure 4:
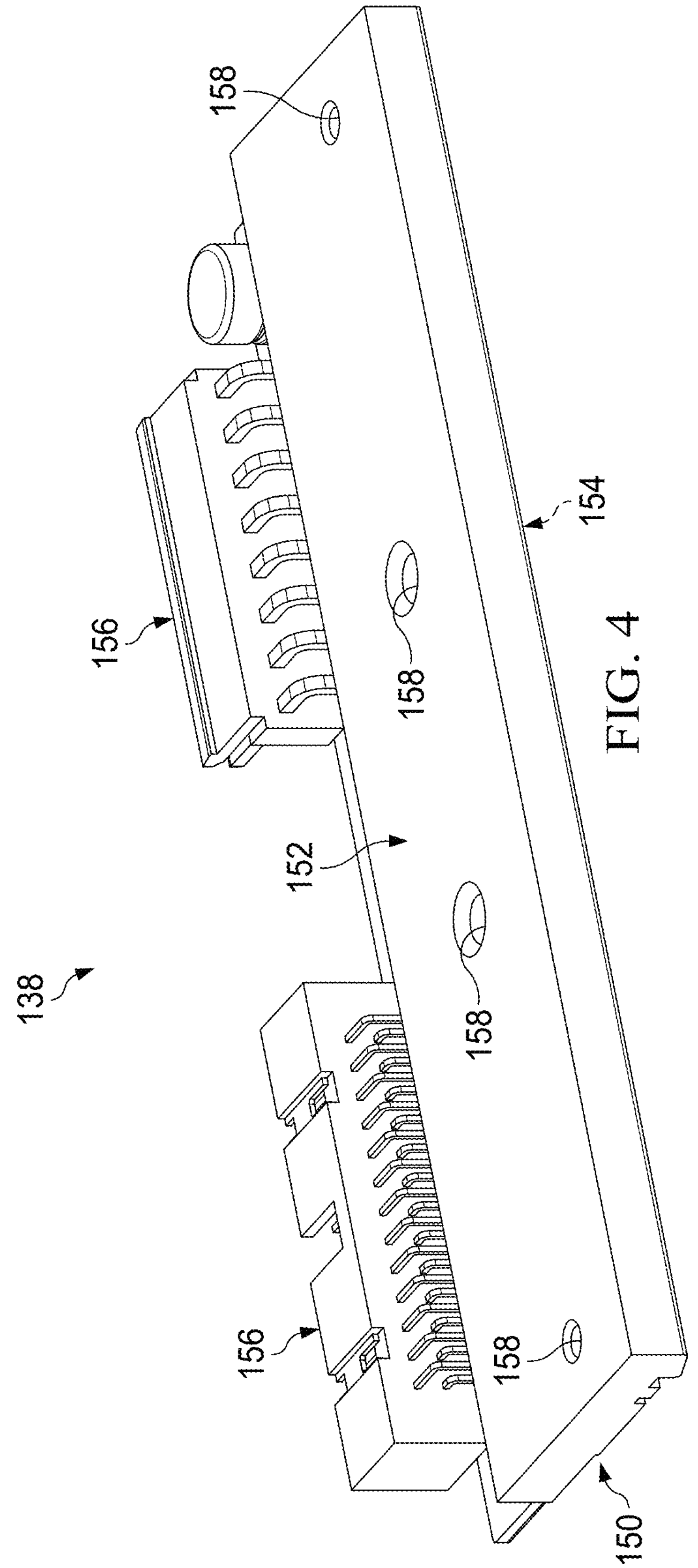
FIG. 4 illustrates a front, top, and left side isometric view of a printhead of the printer of FIGS. 1 and 2.

As best shown in FIG. 4, the printhead 138 may be provided in the form of a substantially rectilinear printhead body 150 defined by a substantially planar printhead attachment surface 152 and a substantially planar heating surface 154 (not shown) oriented parallel and positioned opposite with respect to the printhead attachment surface 152. The printhead 138 may include one or more heating modules 156 designed to provide heat to (e.g., by transmitting an electrical current to) one or more heating elements (not shown) positioned on the heating surface 154 and arranged to act on the ribbon material 134. One or more printhead connection holes 158 may be disposed along the printhead body 150 and extend entirely therethrough. For example, the printhead connection holes 158 may be arranged to facilitate a connection between the printhead 138 and one or more associated components (e.g., of a printhead assembly 200 shown in FIG. 5) by receiving a fastener (e.g., a screw, pin, or any other suitable fastener) therein.

Figure 5:
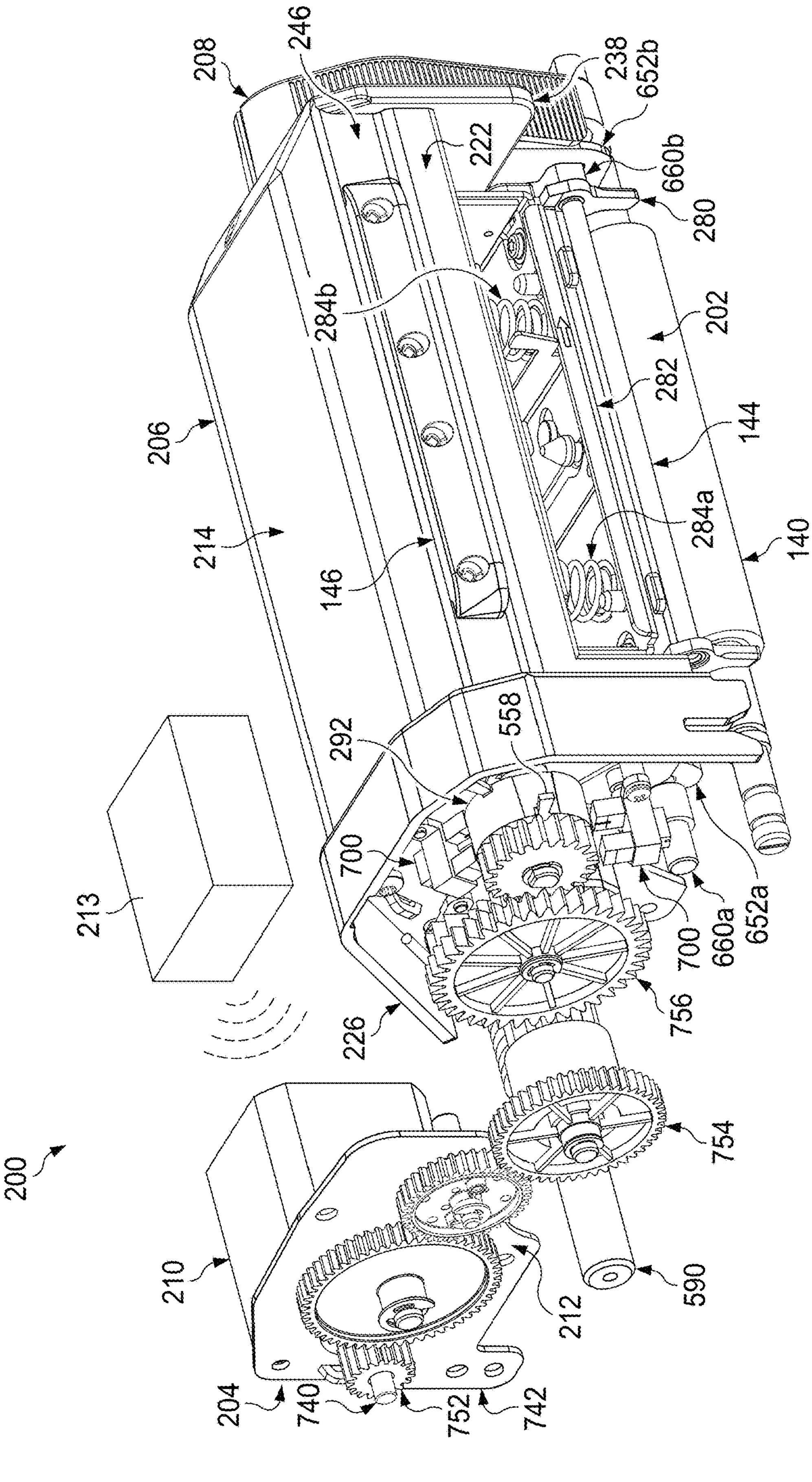
FIG. 5 illustrates a front, top, and left side isometric view of an exemplary printhead assembly constructed according to the principles of the present disclosure.

Turning to FIG. 5, the printhead assembly 200 may include a printhead module 202 operably engaged by a gear subassembly 204. A casing 206 may be provided to shelter, support, and/or retain various components of the printhead module 202 positioned therein. For example, the casing 206 may protect internal components of the printhead module 202 by preventing dust or other particles from accumulating thereon. A lever 208 adjacent to the casing 206 may be configured to facilitate opening of the printhead module 202, for example, by lifting or rotating the casing 206 when the lever 208 is engaged such that one or more components of the printhead module 202 may be viewed or accessed. In some instances, opening the printhead module 202 may be desirable or necessary to perform maintenance or cleaning, fix or replace the heating elements or other components of the printhead 138, clear jams (e.g., when ribbon material 134 is caught or tangled-up in the printhead assembly 200), or under other circumstances.

The gear subassembly 204 may be positioned proximate to the printhead module 202. In some instances, the gear subassembly 204 may be independently supported or installed within a printing device (e.g., connected to the mounting wall 120 of the printer 100) such that the gear subassembly 204 is positioned to engage the printhead module 202. The gear subassembly 204 may include a driver 210 configured to adjust a setting, condition, and/or position of the printhead 138 as described in detail below with reference to FIGS. 39 and 47. The gear subassembly 204 may be operably connected to or in communication with one or more components of the printhead module 202. For example, the driver 210 may generate rotational motion, and the rotational motion generated by the driver 210 may be transmitted to one or more components of the printhead module 202 via a gear train 212.

A controller 213 of a printing device (e.g., the printer 100) may be in communication with and may control or operate the driver 210 and/or other components of the printhead assembly 200. For example, the controller 213 may operate the gear subassembly 204 by powering the driver 210 on or off. In some instances, the controller 213 may communicate with the driver 210 and/or other components of the printhead assembly 200 via one or more wireless communication protocols (e.g., Wi-Fi, Bluetooth, Zigbee, Z-wave, or other wireless communication protocols known in the art). In other instances, the controller 213 may communicate with the driver 210 and/or other components of the printhead assembly 200 via one or more wires (not shown).

Figure 6:
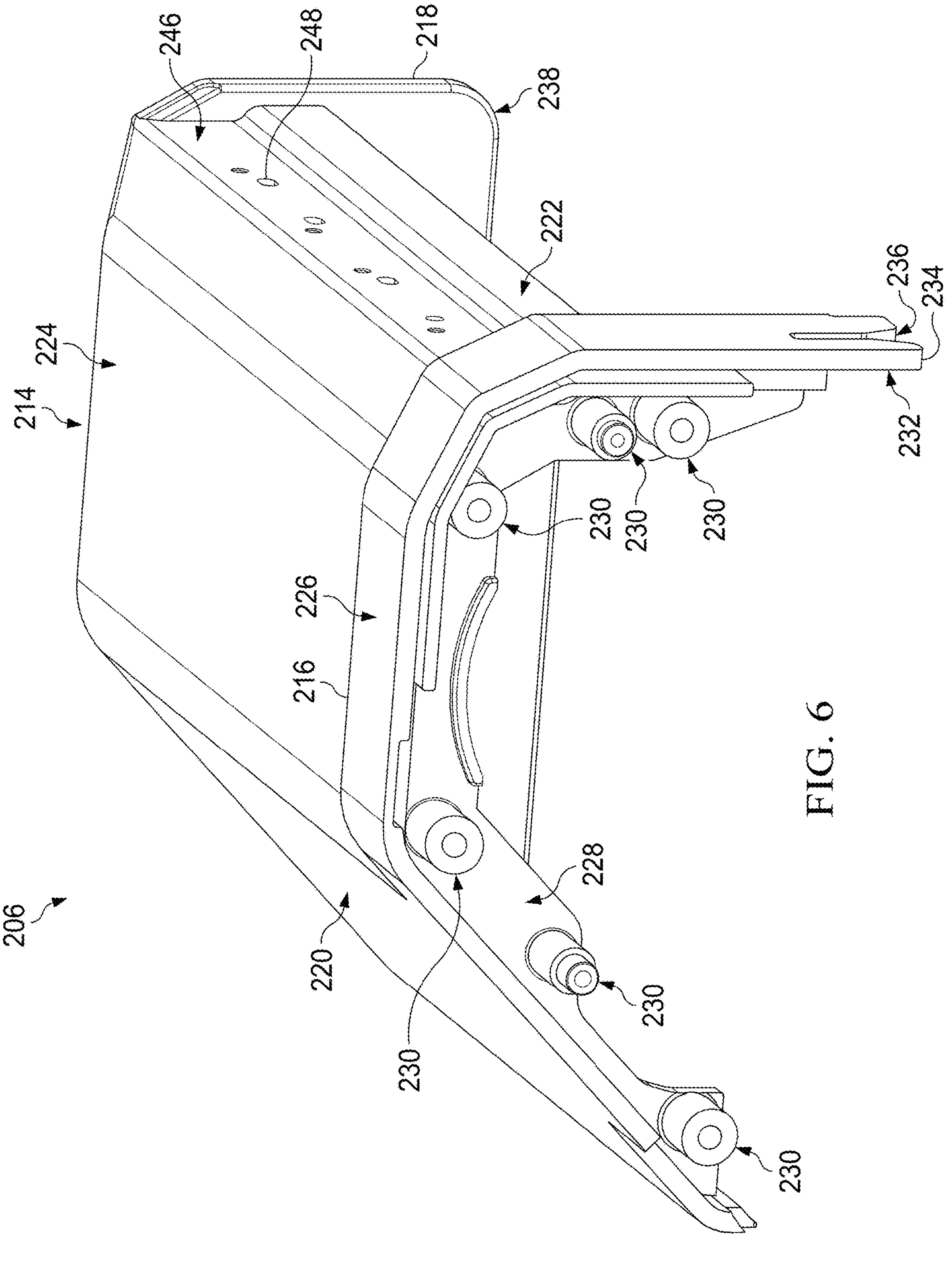
FIG. 6 illustrates a front, top, and left side isometric view of a casing of the printhead assembly of FIG. 5.

Turning to FIG. 6, the casing 206 may be provided in the form of a substantially rectilinear roof 214 extending between a casing first side 216 and a casing second side 218 opposing the casing first side 216. In some instances, the roof 214 may be defined by a slanted portion 220, a substantially vertical portion 222, and an upper panel 224 positioned between the slanted portion 220 and the vertical portion 222. In other instances, the casing 206 may be imparted with any suitable shape and structure. A substantially rectilinear overhang 226 may be positioned at the casing first side 216 and may be connected to at least a portion of the slanted portion 220, upper panel 224, and/or vertical portion 222. The overhang 226 may be substantially parallel with respect to the roof 214. In some instances, at least a portion of the overhang 226 may be elevated with respect to the roof 214 (see FIG. 7). In other instances, the overhang 226 may be substantially coplanar with the roof 214.

A substantially rectilinear casing lip 228 may be connected to the overhang 226 and extend downwardly therefrom. One or more casing mounting members 230 designed to support or engage one or more components of the printhead module 202, the gear subassembly 204, or other components of the printhead assembly 200 may be positioned on the casing lip 228. In some instances, six casing mounting members 230 may be connected to the casing lip 228 and extend outwardly therefrom. In other instances, the casing 206 may include any number of casing mounting members 230, and the casing mounting members 230 may be arranged on the casing lip 228 in any suitable configuration. The casing mounting members 230 may be provided in the form of substantially cylindrical or annular protrusions extending outwardly from the casing lip 228. For example, the casing mounting members 230 may be oriented substantially perpendicularly with respect to the casing lip 228. In some instances, each casing mounting member 230 may be provided in substantially the same form. In other instances, each casing mounting members 230 may be imparted with any suitable shape or structure provided that each casing mounting member 230 is configured to support or engage a desired component of the printhead assembly 200.

The overhang 226 may include a guide member 232 positioned at an overhang distal end 234. The guide member 232 may be configured to engage or receive an internal component of a printing device (e.g., the printer 100). In some instances, the guide member 232 may include a substantially linear cutout 236 designed to receive an internal component of a printing device and ensure a proper orientation or positioning of the casing 206 and/or the printhead assembly 200 overall with respect to the printing device.

Figure 7:
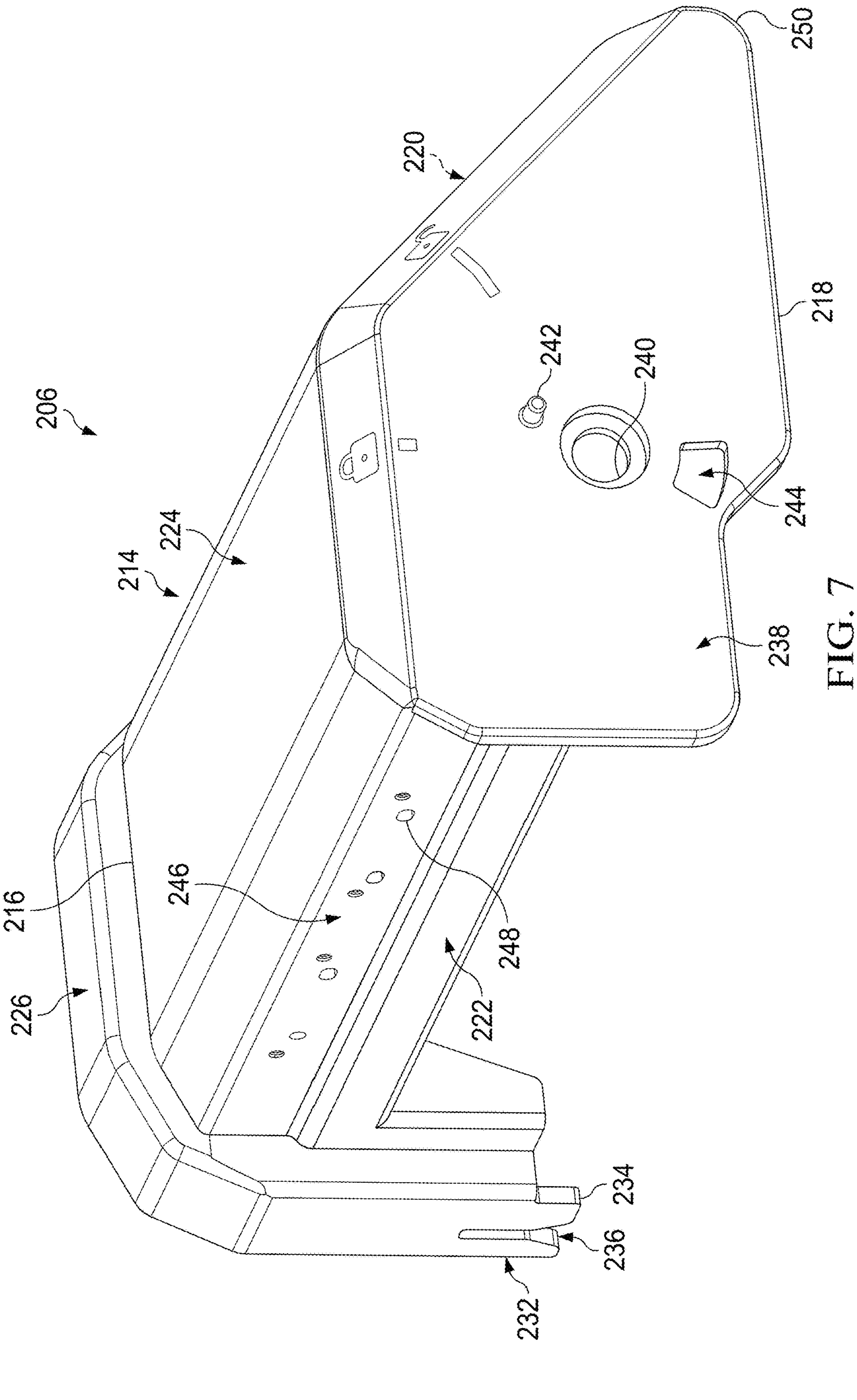
FIG. 7 illustrates a front, top, and right side isometric view of the casing of FIG. 6.

As best shown in FIG. 7, the casing 206 may include a casing sidewall 238 connected to the roof 214 and extending downwardly therefrom. The casing sidewall 238 may be positioned at the casing second side 218 and may be oriented in a plane substantially parallel to the casing lip 228. A casing lever shaft hole 240 may be provided in the form of a substantially circular opening positioned on the casing sidewall 238 and extending entirely therethrough. Additionally, in some instances, one or more casing protrusions 242 and one or more recessed surfaces 244 may be disposed on the casing sidewall 238. In some instances, the casing lever shaft hole 240, casing protrusions 242, and recessed surfaces 244 may be configured facilitate connection or engagement between the printhead module 202 and the lever 208.

In some instances, a diverter surface 246 may be positioned on or adjacent to the vertical portion 222 of the roof 214 with one or more diverter holes 248 positioned thereon and extending at least partially therethrough. In some instances, a diverter 146 may be coupled to the casing 206 via the diverter surface 246 (see FIG. 5). In other instances, the diverter 146 shown in FIG. 5 may be omitted. As shown in FIG. 7, the casing 206 may include a rear corner 250 positioned at a junction between the casing sidewall 238 and the slanted portion 220 of the roof 214.

Figure 8:
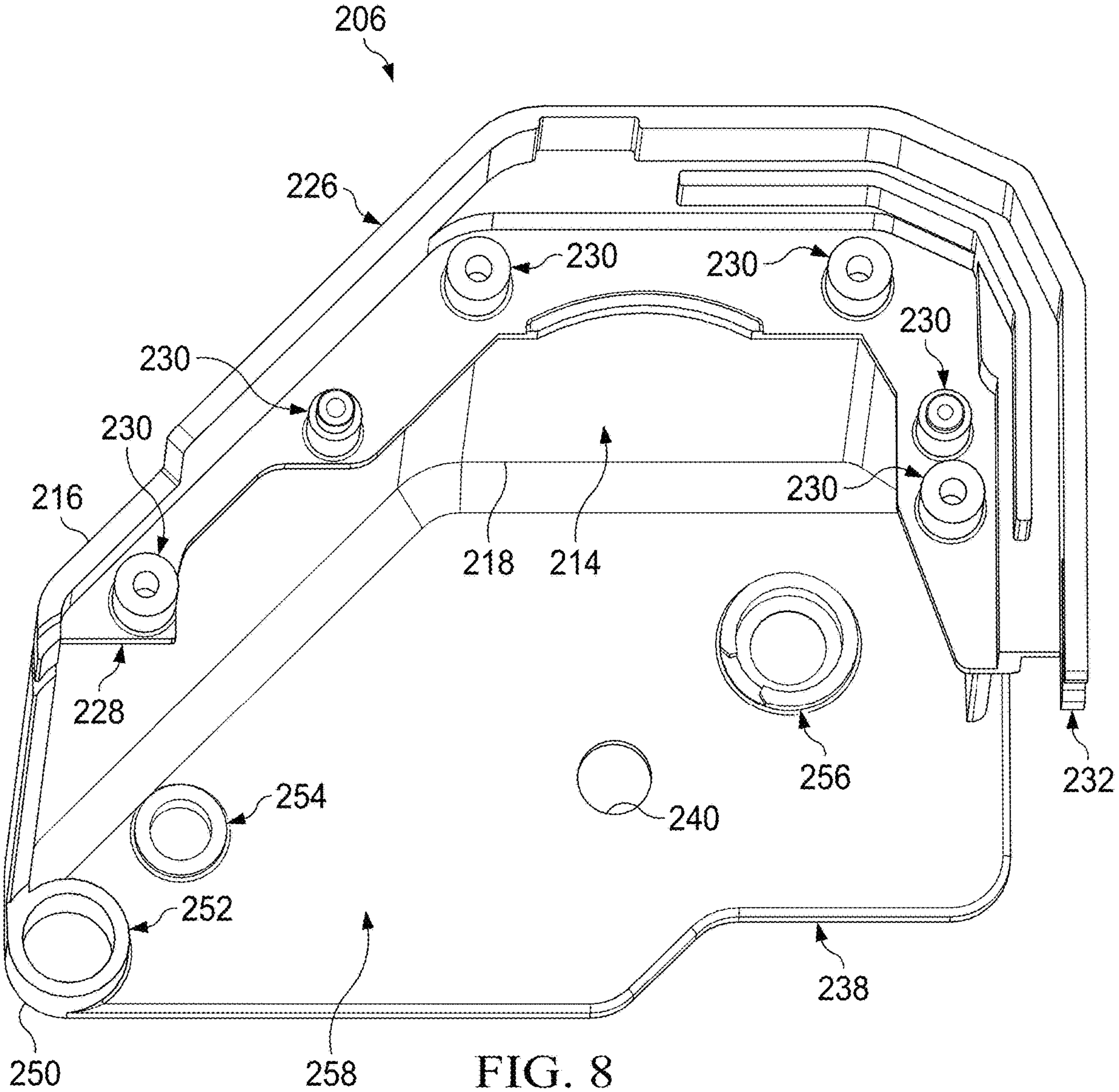
FIG. 8 illustrates a bottom and left side isometric view of the casing of FIG. 6.

Turning to FIG. 8, the casing sidewall 238 may be configured to receive and/or support one or more components of the printhead module 202. For example, in some instances, the casing 206 may include a support shaft seat 252, a linking shaft seat 254, and a cam shaft seat 256 positioned on a casing sidewall interior surface 258. In other instances, the casing 206 may include additional or alternative features designed to support various components of the printhead module 202 that are disposed at least partially within the casing 206. In some instances, the support shaft seat 252, linking shaft seat 254, and cam shaft seat 256 may each be provided in the form of substantially annular protrusions connected to the casing sidewall 238 and extending inwardly therefrom (e.g., toward the casing first side 216). In other instances, the support shaft seat 252, linking shaft seat 254, and cam shaft seat 256 may be provided in any suitable form.

Figure 9:
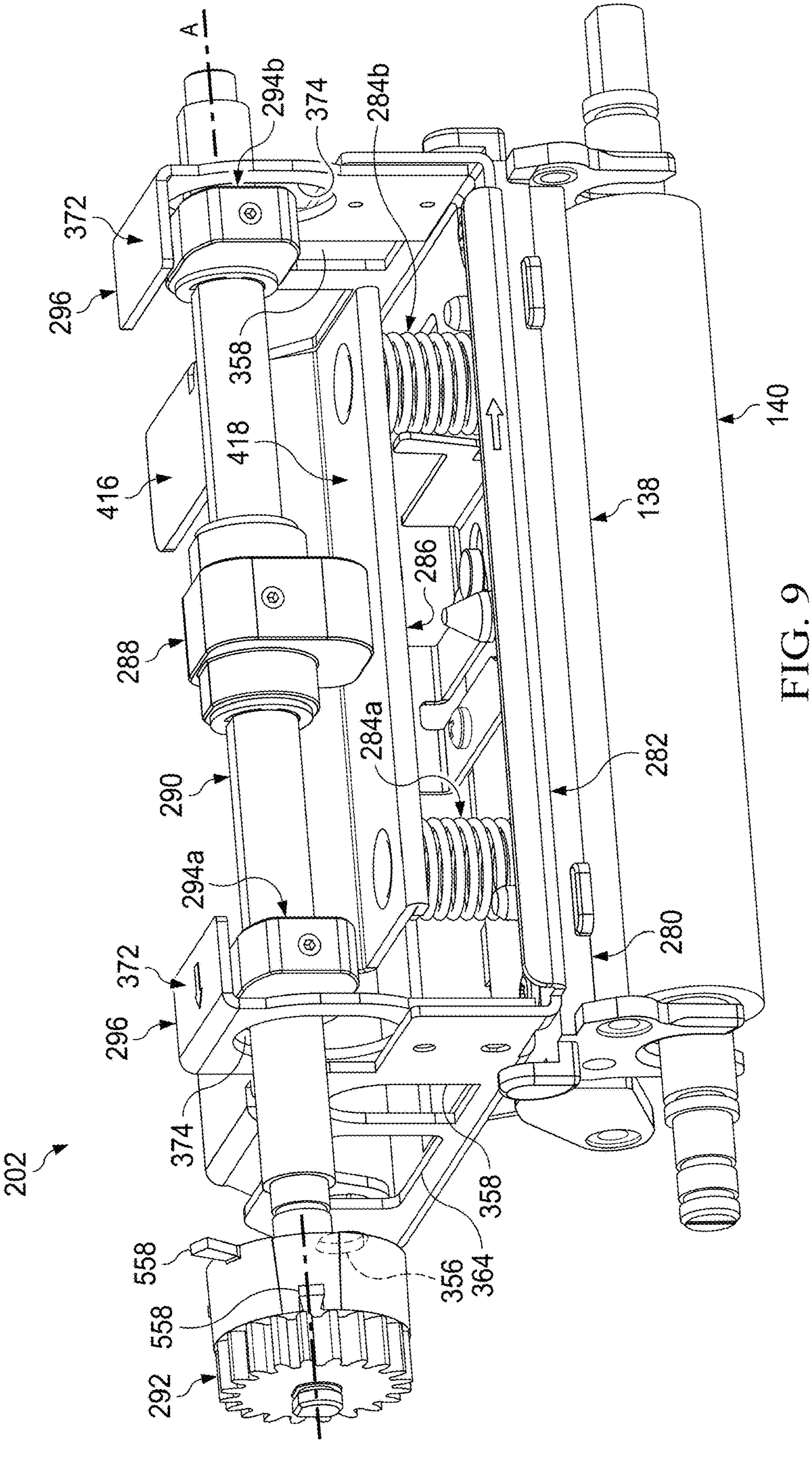
FIG. 9 illustrates a front, top, and left side isometric view of a printhead module of the printhead assembly of FIG. 5.

Turning to FIG. 9, in some instances, the printhead module 202 may be designed to adjust the nip force applied by the printhead 138 at the nip point 148 (see FIG. 3) and/or to facilitate lifting of the printhead 138 away from the platen roller 140 (e.g., to avoid applying a constant nip force to the ribbon material 134 and/or the printable media 128 during periods of non-use). The printhead 138 may be coupled to or retained by a docking plate 280. The docking plate 280 may in turn be connected to a printhead holder 282 designed to be engaged by one or more other components of the printhead module 202 and facilitate movement of the printhead 138. For example, the printhead holder 282 may be configured to impart a downward force on the printhead 138 (e.g., pressing the printhead 138 toward the platen roller 140) or to place the printhead 138 in a lifted position (e.g., moving the printhead 138 out of contact with the platen roller 140).

The printhead module 202 may include one or more springs 284 positioned between the printhead holder 282 and a push plate 286 positioned above the printhead holder 282. In some instances, the springs 284 are provided in the form of compression springs having a spring constant value or spring rate of at least about 2.9 Newtons per millimeter (or at least 2.9 Newtons per millimeter). In other instances, the springs 284 may be provided in any suitable form.

The springs 284 may be compressed between the printhead holder 282 and the push plate 286 such that the springs 284 store elastic potential energy and apply an outward force or pressure on the printhead holder 282 and the push plate 286. The outward force applied to the printhead holder 282 may be transmitted to the printhead 138 via the docking plate 280 such that the springs 284 cause the printhead 138 to exert a nip force on the platen roller 140. Thus, the nip force applied by the printhead 138 may be altered by altering the degree to which the springs 284 are compressed (e.g., by altering the distance at which the push plate 286 is retained from the printhead holder 282). In some instances, the printhead module 202 may include two springs 284, a first spring 284*a* and a second spring 284*b*. In other instances, the printhead module 202 may include any suitable number of springs 284.

A force cam 288 positioned along a cam shaft 290 may be configured to adjustably engage the push plate 286. As described in detail below with reference to FIGS. 28A-28C, in some instances, the printhead module 202 may be configured such that rotation of the force cam 288 alters the position of the push plate 286 relative to the printhead holder 282. Thus, rotation of the force cam 288 may cause compression or decompression of the springs 284, thereby adjusting the nip force applied by the printhead 138. The force cam 288 may be configured to rotate in unison with the cam shaft 290. In some instances, a cam adjustment gear 292 may be connected to the cam shaft 290 and positioned for engagement by one or more components of the printhead module 202 or of a printing device (e.g., the printer 100). For example, the driver 210 may be configured to drive rotation of the cam adjustment gear 292 as explained in detail below with reference to FIGS. 39 and 47.

Additionally, one or more lift cams 294 configured to move the printhead 138 into a lifted position (e.g., to move the printhead 138 out of contact with the platen roller 140) may be positioned along the cam shaft 290. The lift cams 294 may be configured to rotate in unison with the cam shaft 290 and may be arranged for engagement with an adjacent flange member 296 of the printhead holder 282. For example, in some instances, a first lift cam 294*a* and a second lift came 294*b* may be positioned proximate to opposing ends of the cam shaft 290, and the printhead holder 282 may include two flange members 296 including at least a portion thereof positioned adjacent to (e.g., above) the lift cams 294. As described in detail below with reference to FIG. 28D, the printhead module 202 may be configured to lift the printhead 138 away from the platen roller 140 such that no nip force is applied (e.g., during periods of non-use) by rotating the cam shaft 290 such that the lift cams 294 rotate into engagement with the flange members 296.

Figure 10:
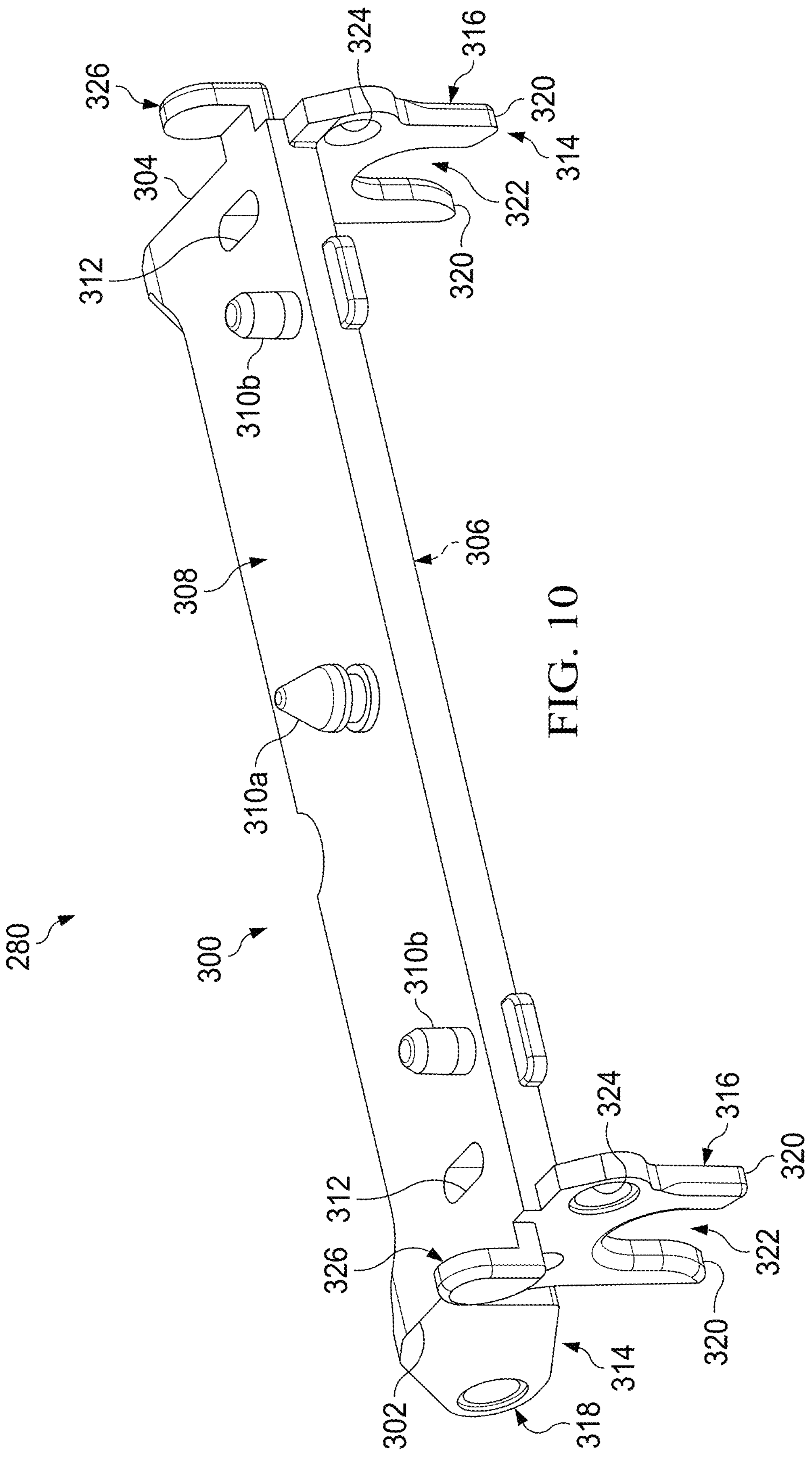
FIG. 10 illustrates a front, top, and left side isometric view of a docking plate of the printhead module of FIG. 9.

Turning to FIG. 10, the docking plate 280 may be provided in the form of a substantially rectilinear docking plate body 300 defined by a docking plate first end 302 and a docking plate second end 304 opposing the docking plate first end 302. The docking plate body 300 may include a first or lower docking plate surface 306 and a second or upper docking plate surface 308 each extending between the docking plate first end 302 and the docking plate second end 304. In some instances, the lower docking plate surface 306 and the upper docking plate surface 308 may be provided in the form of substantially planar surfaces oriented parallel with respect to one another. The printhead 138 may be connected to or installed on the docking plate 280 such that the printhead attachment surface 152 is positioned adjacent to, or flush with, the lower docking plate surface 306.

One or more dock pin members 310 may be positioned on the upper docking plate surface 308 and extend upwardly therefrom. In some instances, the docking plate 280 may include a first dock pin member 310*a* and two second dock pin members 310*b*. The first dock pin member 310*a* may be substantially conical or frustoconical in shape and may be positioned substantially centrally with respect to the docking plate first end 302 and the docking plate second end 304 (or substantially centrally with respect to the second dock pin members 310*b*). The second dock pin members 310*b* may be substantially cylindrical in shape and may be positioned proximate to the docking plate first end 302 and the docking plate second end 304, respectively. In other instances, the docking plate 280 may include any number of dock pin members 310, and the dock pin members 310 may be positioned in any suitable arrangement and imparted with any suitable structure. The dock pin members 310 are designed to facilitate coupling between the docking plate 280 and the printhead holder 282, the push plate 286, and/or other components of the printhead module 202.

One or more printhead docking holes 312 configured to facilitate coupling of the printhead 138 to the docking plate 280 and/or the printhead holder 282 may be positioned on the docking plate body 300 and extend entirely therethrough. For example, the one or more printhead docking holes 312 may be positioned on the docking plate 280 to align with one or more of the printhead connection holes 158 of the printhead 138 (see FIG. 4). In some instances, the printhead docking holes 312 may be provided in the form of rounded or elliptical-shaped openings extending entirely between the upper docking plate surface 308 and the lower docking plate surface 306. In some instances, the docking plate 280 may include two printhead docking holes 312 such that one of the printhead docking holes 312 is positioned proximate to the docking plate first end 302 and the other printhead docking hole 312 is positioned proximate to the docking plate second end 304. In other instances, the docking plate 280 may include any number of printhead docking holes 312 arranged in any suitable configuration, provided that the printhead docking holes 312 are configured to facilitate a connection between the printhead 138 and the docking plate 280.

Figure 11:
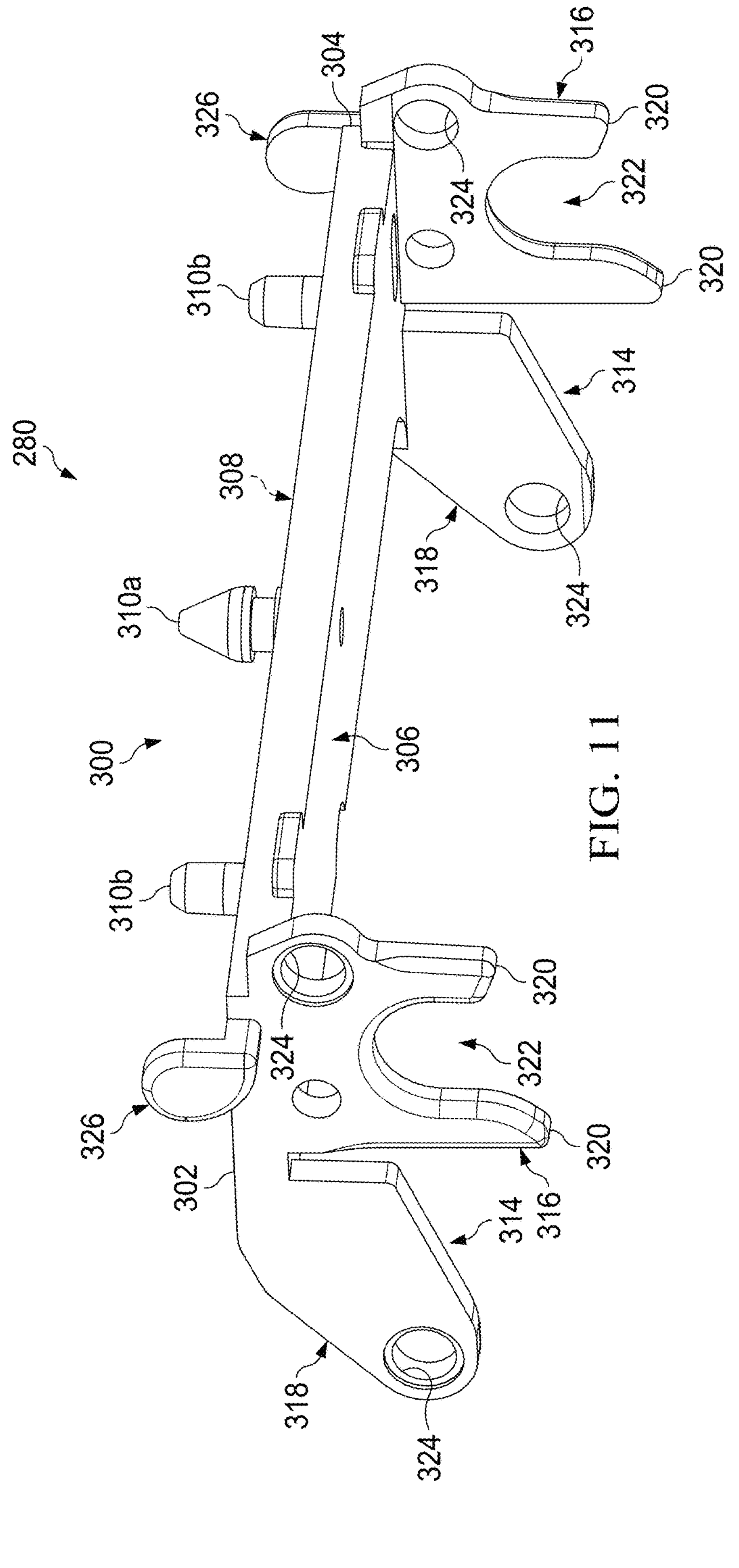
FIG. 11 illustrates a front, bottom, and left side isometric view of the docking plate of FIG. 10.

As best shown in FIG. 11, the docking plate 280 may include two docking plate sidewalls 314 connected to the docking plate body 300 at the docking plate first end 302 and the docking plate second end 304 and extending downwardly therefrom. The docking plate sidewalls 314 may be formed integrally with the docking plate body 300 or may be coupled thereto. Each of the docking plate sidewalls 314 may be provided in the form of an irregularly shaped panel oriented substantially perpendicularly with respect to the docking plate body 300 and may include a pronged member 316 and a rear leg 318 positioned adjacent to the pronged member 316. The pronged member 316 may include two prongs 320 defining a space 322 therebetween. In some instances, the pronged members 316 may be configured to orient the docking plate 280 within a printing device (e.g., the printer 100) by receiving a component of the printing device within the spaces 322.

The docking plate sidewalls 314 may include one or more roller holes 324 designed to support one or more rollers 144 extending between the docking plate sidewalls 314 (see FIG. 5). The roller holes 324 may be provided in the form of substantially circular openings extending entirely through the docking plate sidewalls 314. In some instances, the docking plate sidewalls 314 may each include one roller hole 324 positioned on the pronged member 316 and another roller hole 324 positioned on the rear leg 318. In other instances, the docking plate sidewalls 314 may include any number of roller holes 324 or other openings arranged in any suitable configuration. In some instances, the docking plate 280 may include vertical flaps 326 positioned at each of the docking plate first end 302 and the docking plate second end 304. For example, the vertical flaps 326 may be coupled to the pronged members 316 of the docking plate sidewalls 314 and extend outwardly and/or upwardly therefrom. The vertical flaps 326 may be substantially parallel with respect to the docking plate sidewalls 314 (e.g., perpendicular with respect to the docking plate body 300). In some instances, the vertical flaps 326 may facilitate proper positioning and/or alignment between the docking plate 280 and the printhead 138.

Figure 12:
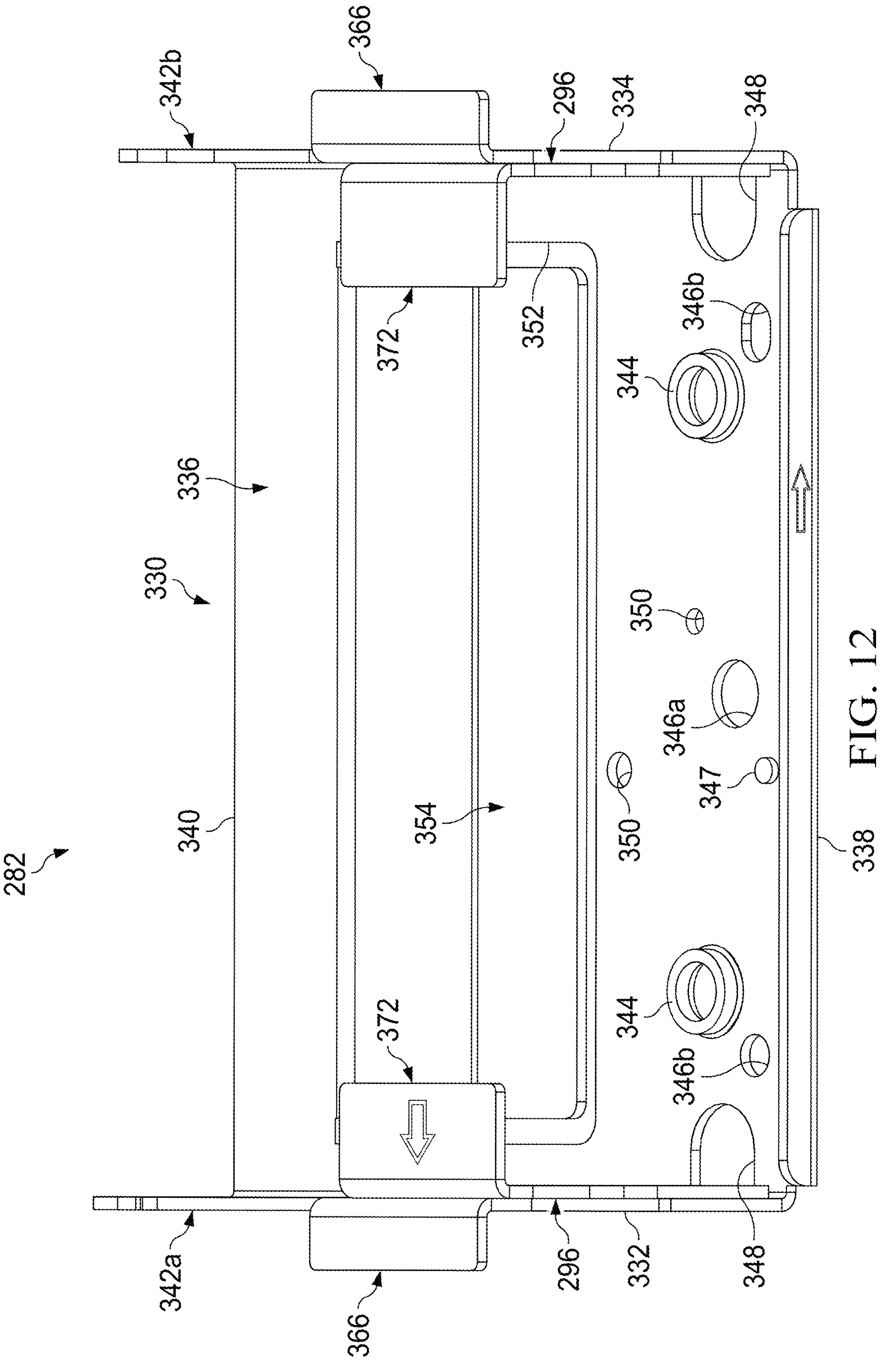
FIG. 12 illustrates a front and top isometric view of a printhead holder of the printhead module of FIG. 9.

Turning to FIG. 12, the printhead holder 282 may be provided in the form of a substantially rectilinear printhead holder body 330 defined by a printhead holder first side 332 and a printhead holder second side 334 opposing the printhead holder first side 332. The printhead holder 282 may include a base plate 336 extending between the printhead holder first side 332 and the printhead holder second side 334. The base plate 336 may be defined by a printhead holder front edge 338 and a printhead holder rear edge 340 opposing the printhead holder front edge 338. Printhead holder sidewalls 342 may be connected to the base plate 336 at the printhead holder first side 332 and the printhead holder second side 334 and extend upwardly therefrom. In some instances, the printhead holder sidewalls 342 may be provided in slightly different forms (see FIG. 13). For example, a first printhead holder sidewall 342*a* may be connected to the base plate 336 at the printhead holder first side 332 and a second printhead holder sidewall 342*b* may be connected to the base plate 336 at the printhead holder second side 334.

The printhead holder 282 may include one or more spring base members 344 positioned on the base plate 336 proximate to the printhead holder front edge 338. The spring base members 344 may be provided in the form of substantially annular protrusions positioned on the base plate 336 and extending upwardly therefrom. In some instances, the printhead holder 282 may include two spring base members 344 positioned proximate to the printhead holder first side 332 and the printhead holder second side 334. One or more printhead holder connection holes 346 may be provided in the form of substantially circular openings extending entirely through the base plate 336 and arranged to facilitate coupling between the printhead holder 282 and the docking plate 280. In some instances, the printhead holder 282 may include a first printhead holder connection hole 346*a* arranged to receive the first dock pin member 310*a* and two second printhead holder connection holes 346*b* arranged to receive the second dock pin members 310*b*. In some instances, a printhead holder peg 347 may be positioned proximate to the first printhead holder connection hole 346*a*.

Additionally, the printhead holder 282 may include one or more printhead holder fastener holes 348 configured to facilitate coupling between the printhead 138, the docking plate 280, and/or the printhead holder 282. For example, the printhead holder 282 may include two printhead holder fastener holes 348 provided in the form of rounded or arch shaped openings extending entirely through the base plate 336. The printhead holder fastener holes 348 may be configured to align with the printhead docking holes 312 of the docking plate 280 and one or more of the printhead connection holes 158 of the printhead 138. Thus, fasteners (not shown) may extend through the printhead holder fastener holes 348 and the printhead docking holes 312 and may be received by one or more of the printhead connection holes 158 (e.g., via engagement between a threaded exterior surface of the fastener and a threaded interior surface of the printhead connection holes 158).

The printhead holder 282 may include one or more printhead holder sockets 350 provided in the form of substantially circular openings extending entirely through the base plate 336. In some instances, a vent 352 may be provided in the form of a substantially rectangular opening extending entirely through the base plate 336. The printhead holder 282 may include a tray member 354 positioned within or beneath the vent 352 and configured to guide or support printable media 128 and/or ribbon material 134 passing beneath the printhead 138 while the printhead assembly 200 is in use. For example, the tray member 354 may be coupled to the base plate 336 along an edge of the vent 352 proximate to the printhead holder rear edge 340 and extend downwardly therefrom. In some instances, the vent 352 may facilitate a connection between the printhead 138 and one or more cables, connectors, or other components of a printing device (e.g., the printer 100) by providing an opening or passageway through which, for example, cables can be fed to connect to the printhead 138.

Figure 13:
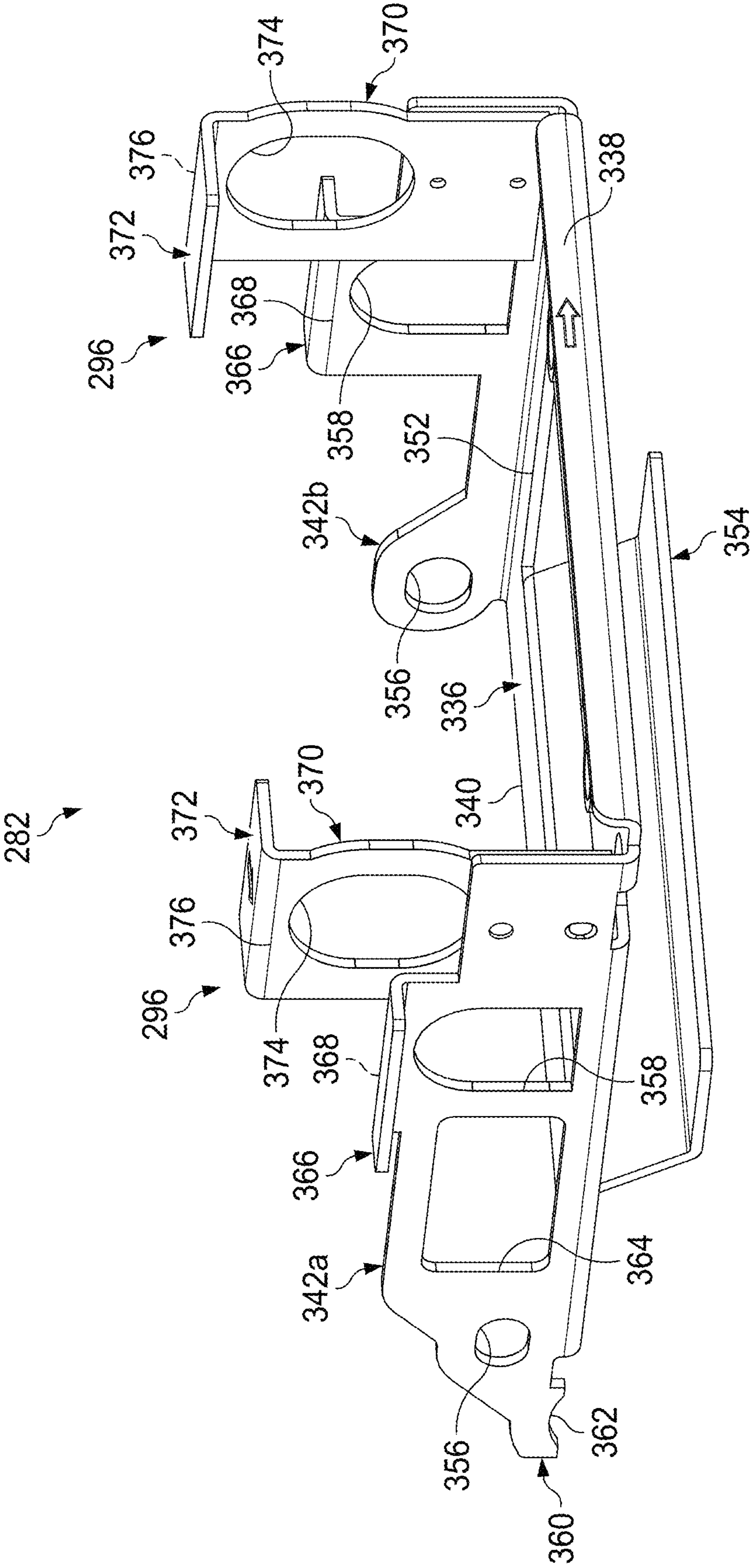
FIG. 13 illustrates a front and left side isometric view of the printhead holder of FIG. 12.

As best shown in FIG. 13, each of the printhead holder sidewalls 342*a*, 342*b* may include a first linking shaft opening 356 and a lever shaft opening 358. The first linking shaft opening 356 and lever shaft opening 358 of the first printhead holder sidewall 342*a* may be arranged to align with the first linking shaft opening 356 and lever shaft opening 358 of the second printhead holder sidewall 342*b*, respectively. In some instances, one of the printhead holder sidewalls 342 (e.g., the first printhead holder sidewall 342*a*) may further include a first orienting member 360 having a curved orienting surface 362 configured to be received by or engage another portion of the printhead assembly 200 (see FIG. 35). The first orienting member 360 may be positioned proximate to the printhead holder rear edge 340 and extend outwardly therefrom. Additionally, one of the printhead holder sidewalls 342 (e.g., the first printhead holder sidewall 342*a*) may include a substantially rectangular carveout 364 positioned between the first linking shaft opening 356 and the lever shaft opening 358.

Each of the printhead holder sidewalls 342*a*, 342*b* may include a lever impact surface 366 connected to a sidewall upper edge 368. In some instances, the lever impact surfaces 366 may be provided in the form of substantially rectilinear protrusions connected to the sidewall upper edge 368 and extending outwardly therefrom (e.g., the lever impact surface 366 of the first printhead holder sidewall 342*a* may extend away from the second printhead holder sidewall 342*b*, and vice versa). The lever impact surfaces 366 may be positioned above or adjacent to the lever shaft openings 358.

The printhead holder 282 may include two flange members 296 positioned adjacent to and coplanar with each of the printhead holder sidewalls 342*a*, 342*b*. Each flange member 296 may include a flange wall 370 and a flange impact surface 372. The flange wall 370 may include a cam shaft opening 374 provided in the form of a substantially circular, ovoid, or rounded opening extending entirely through the flange wall 370. The cam shaft opening 374 may be any size or shape suitable for the cam shaft 290 to pass through. In some instances, the cam shaft opening 374 may have a size suitable for the cam shaft 290 to move substantially vertically (e.g., up and down) as the force cam 288 and/or one or more of the lift cams 294 rotate about an axis A of the cam shaft 290 (see FIG. 9). The flange impact surface 372 may be positioned above or adjacent to the cam shaft opening 374 such that the flange impact surface 372 is positioned for engagement with one of the lift cams 294 as the lift cams 294 rotate about the axis A (see FIG. 9). In some instances, the flange impact surface 372 may be connected to the flange wall 370 at a flange upper edge 376 and extend inwardly therefrom (e.g., the flange impact surface 372 of the flange member 296 adjacent to the first printhead holder sidewall 342*a* may extend toward the second printhead holder sidewall 342*b*, and vice versa). The flange wall 370 may be substantially parallel to or coplanar with the associated printhead holder sidewall 342, and the flange impact surface 372 may be oriented substantially perpendicularly with respect to the flange wall 370.

Figure 14:
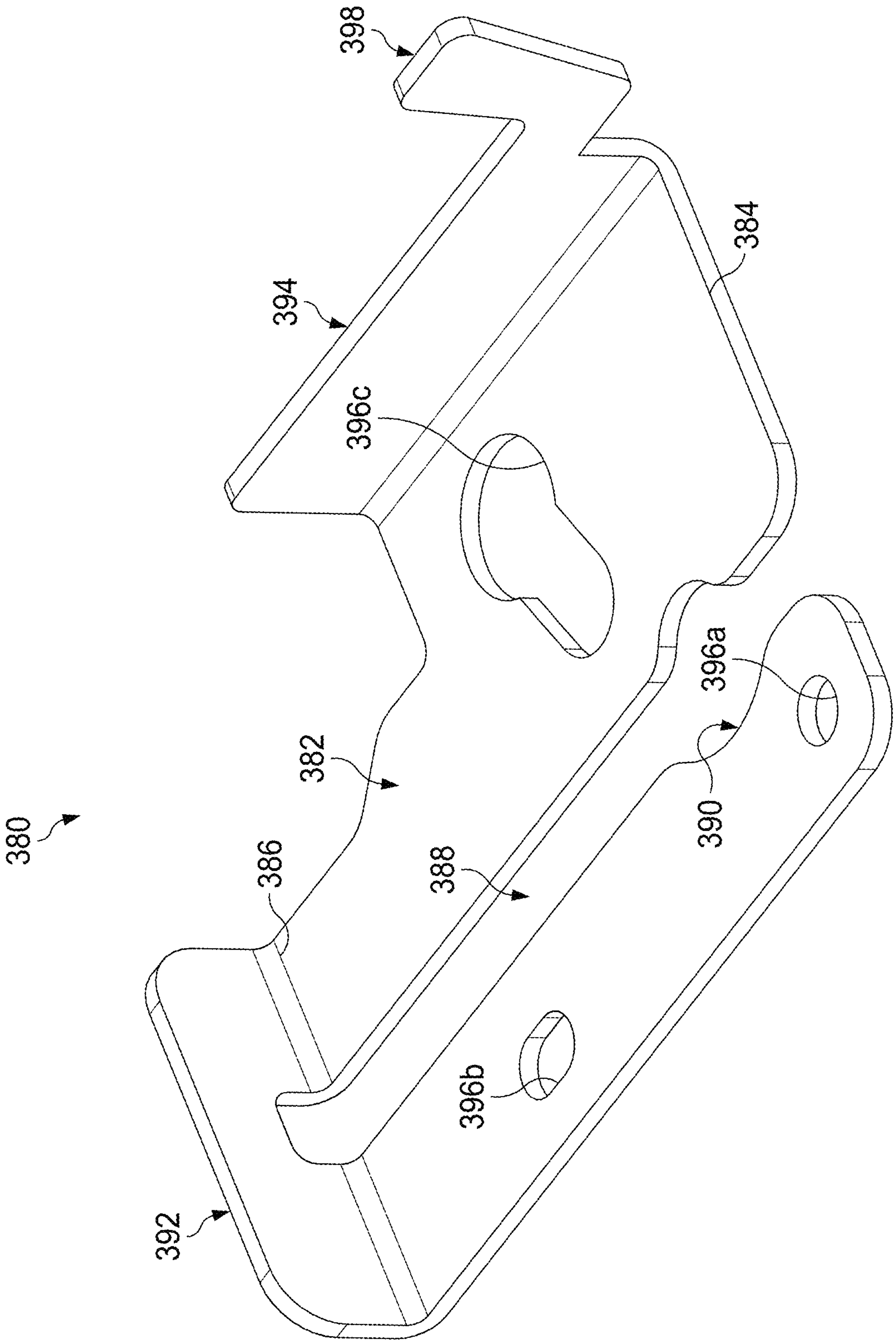
FIG. 14 illustrates a front, top, and left side isometric view of a connection plate of the printhead module of FIG. 9.

Turning to FIG. 14, a connection plate 380 may be provided in the form of a substantially planar connection plate body 382 defined by a connection plate first end 384 and a connection plate second end 386 opposing the connection plate first end 384. A substantially linear channel 388 including a rounded receiving region 390 may extend between the connection plate first end 384 and the connection plate second end 386. The connection plate 380 may include a first lip member 392 positioned at the connection plate second end 386 and a second lip member 394 positioned proximate to the connection plate first end 384 and extending partially toward the connection plate second end 386. The first and second lip members 392, 394 may be either formed integrally with or coupled to the connection plate body 382 and extend upwardly therefrom. For example, the first and second lip members 392, 394 may each be substantially perpendicular with respect to the connection plate body 382. Additionally, the first and second lip members 392, 394 may be substantially perpendicular with respect to one another. The first and second lip members 392, 394 may facilitate the coupling of the connection plate 380 with the printhead holder 282 and/or may provide additional structural support to the printhead holder 282. In some instances, the first lip member 392 may also prevent or reduce movement of the connection plate 380 with respect to the printhead holder 282 once coupled thereto.

One or more connection plate holes 396 may be provided in the form of openings extending entirely through the connection plate body 382. For example, the connection plate 380 may include a first connection plate hole 396*a* and a second connection plate hole 396*b* provided in the form of substantially circular openings positioned proximate to the channel 388. The connection plate 380 may also include a third connection plate hole 396*c* provided in the form of an irregular or key-shaped opening positioned between the channel 388 and the second lip member 394. In some instances, the connection plate 380 may include a post 398 connected to the second lip member 394 proximate to the connection plate first end 384 and extending upwardly and/or outwardly therefrom.

Figure 15:
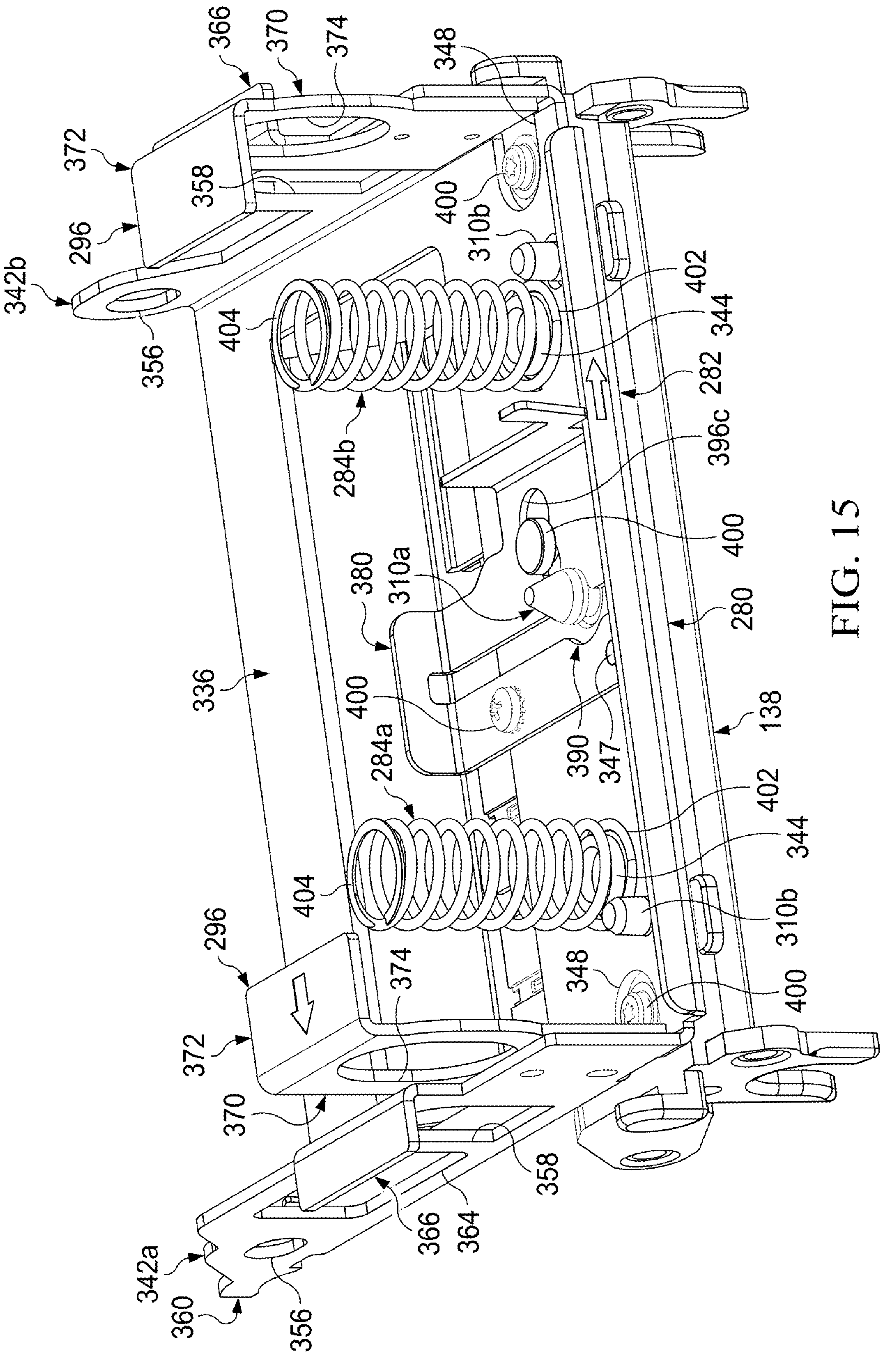
FIG. 15 illustrates a front, top, and left side isometric view of a partial assembly of the printhead module of FIG. 9 including the printhead of FIG. 4, the docking plate of FIG. 10, the printhead holder of FIG. 12, the connection plate of FIG. 14, and springs.

Turning now to FIG. 15, the printhead 138, docking plate 280, printhead holder 282, and connection plate 380 may be coupled to one another to form a partial assembly of the printhead module 202. In some instances, the printhead 138, docking plate 280, printhead holder 282, and docking plate 280 may be configured to move as a single unit when the printhead assembly 200 is in use. For example, the printhead 138 may be positioned adjacent to the docking plate 280 such that the printhead attachment surface 152 (see FIG. 4) abuts the lower docking plate surface 306 (see FIG. 11) and two printhead connection holes 158 align with the printhead docking holes 312 of the docking plate 280. The printhead holder 282 may be positioned on the docking plate 280 such that the dock pin members 310 are received by the printhead holder connection holes 346 (see FIG. 12). For example, the first printhead holder connection hole 346*a* may receive the first dock pin member 310*a* and the second printhead holder connection holes 346*b* may receive the second dock pin members 310*b*. Thus, fasteners 400 may extend through the printhead holder fastener holes 348 and the printhead docking holes 312 of the docking plate 280 and be received by the adjacent printhead connection holes 158. In this way, the fasteners 400 and the dock pin members 310 may facilitate coupling between the printhead 138, docking plate 280, and printhead holder 282.

The connection plate 380 may be positioned on or adjacent to the printhead holder 282 such that the first dock pin member 310*a* extends through the receiving region 390. The first connection plate hole 396*a* (see FIG. 14) may align with and receive the printhead holder peg 347 (e.g., in a press fit). The second connection plate hole 396*b* may align with one of the printhead holder sockets 350 (see FIG. 12) such that a fastener 400 may extend through the second connection plate hole 396*b* and be received by the printhead holder socket 350. The third connection plate hole 396*c* may align with the other of the printhead holder sockets 350 such that a fastener 400 may extend through the third connection plate hole 396*c* and be received by the printhead holder socket 350. Thus, the fasteners 400 may couple the connection plate 380 to the printhead holder 282 or restrict the movement of the connection plate 380 with respect to the printhead holder 282. The fasteners 400 may be provided in the form of a screw, pin, or any other suitable fastener configured to facilitate coupling between two parts via a press fit, interference fit, threaded engagement, or any other method known in the art.

The springs 284 may be positioned on the printhead holder 282 (e.g., in a decompressed state) such that they are available to be compressed by the push plate 286 when the printhead module 202 is fully assembled. For example, the first spring 284*a* and the second spring 284*b* may each have a first spring end 402 and a second spring end 404 opposing the first spring end 402. The first spring end 402 may be supported or received by the spring base members 344 of the printhead holder 282, leaving the second spring end 404 available for engagement with the push plate 286 (see FIG. 18).

Figure 16:
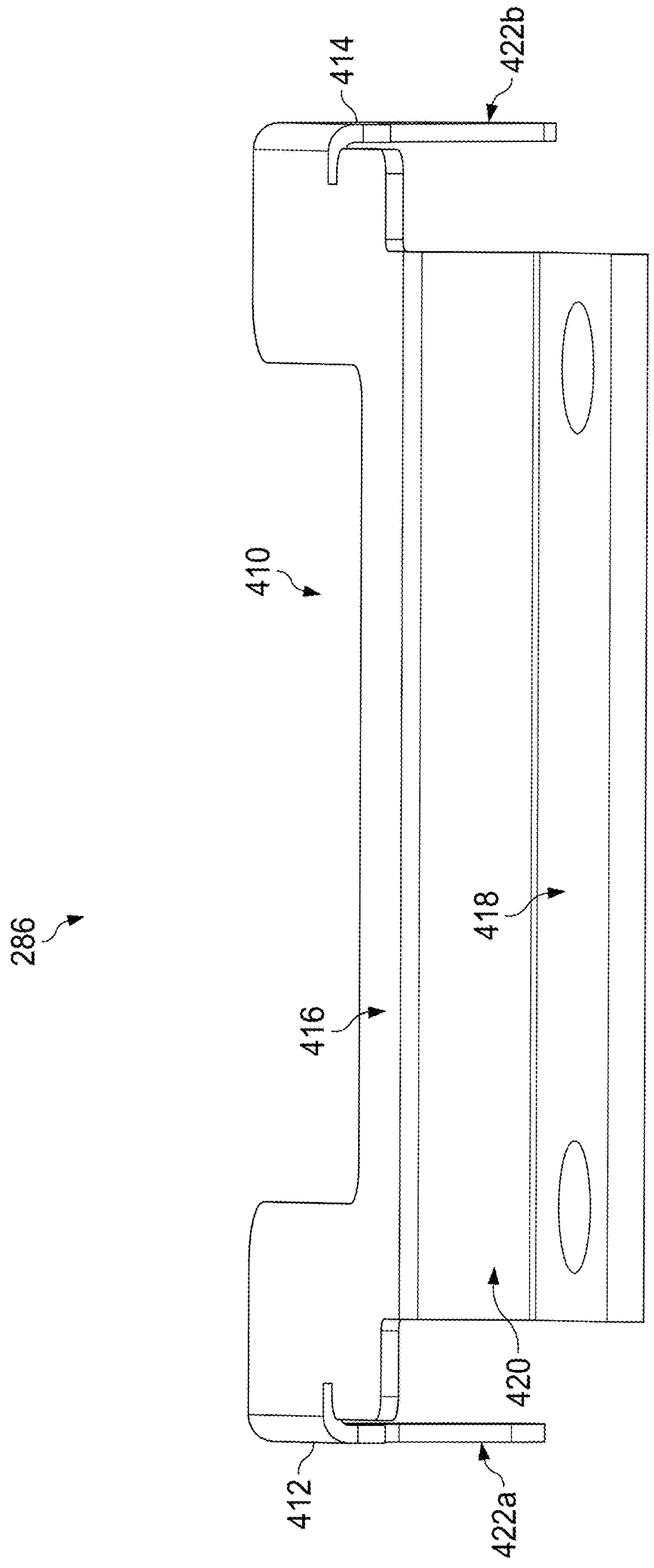
FIG. 16 illustrates a front and top isometric view of a push plate of the printhead module of FIG. 9.

Turning to FIG. 16, the push plate 286 may be provided in the form of a substantially rectilinear push plate body 410 defined by a push plate first side 412 and a push plate second side 414 opposing the push plate first side 412. The push plate body 410 may include an upper shelf 416 and a lower shelf 418. The upper shelf 416 may be vertically offset with respect to (e.g., positioned higher than) the lower shelf 418, and each of the upper shelf 416 and the lower shelf 418 may extend between the push plate first side 412 and the push plate second side 414. A slanted panel 420 may extend between and connect the upper shelf 416 and the lower shelf 418. For example, the upper shelf 416 and lower shelf 418 may be substantially parallel, and the slanted panel 420 may be oriented at an angle with respect to both the upper shelf 416 and the lower shelf 418. The push plate 286 may include two push plate sidewalls 422 connected to the upper shelf 416 and extending downwardly therefrom. For example, a first push plate sidewall 422*a* may be connected to the upper shelf 416 at the push plate first side 412, and a second push plate sidewall 422*b* may be connected to the upper shelf 416 at the push plate second side 414. The push plate sidewalls 422 may be formed integrally with the upper shelf 416 or may be connected thereto.

Figure 17:
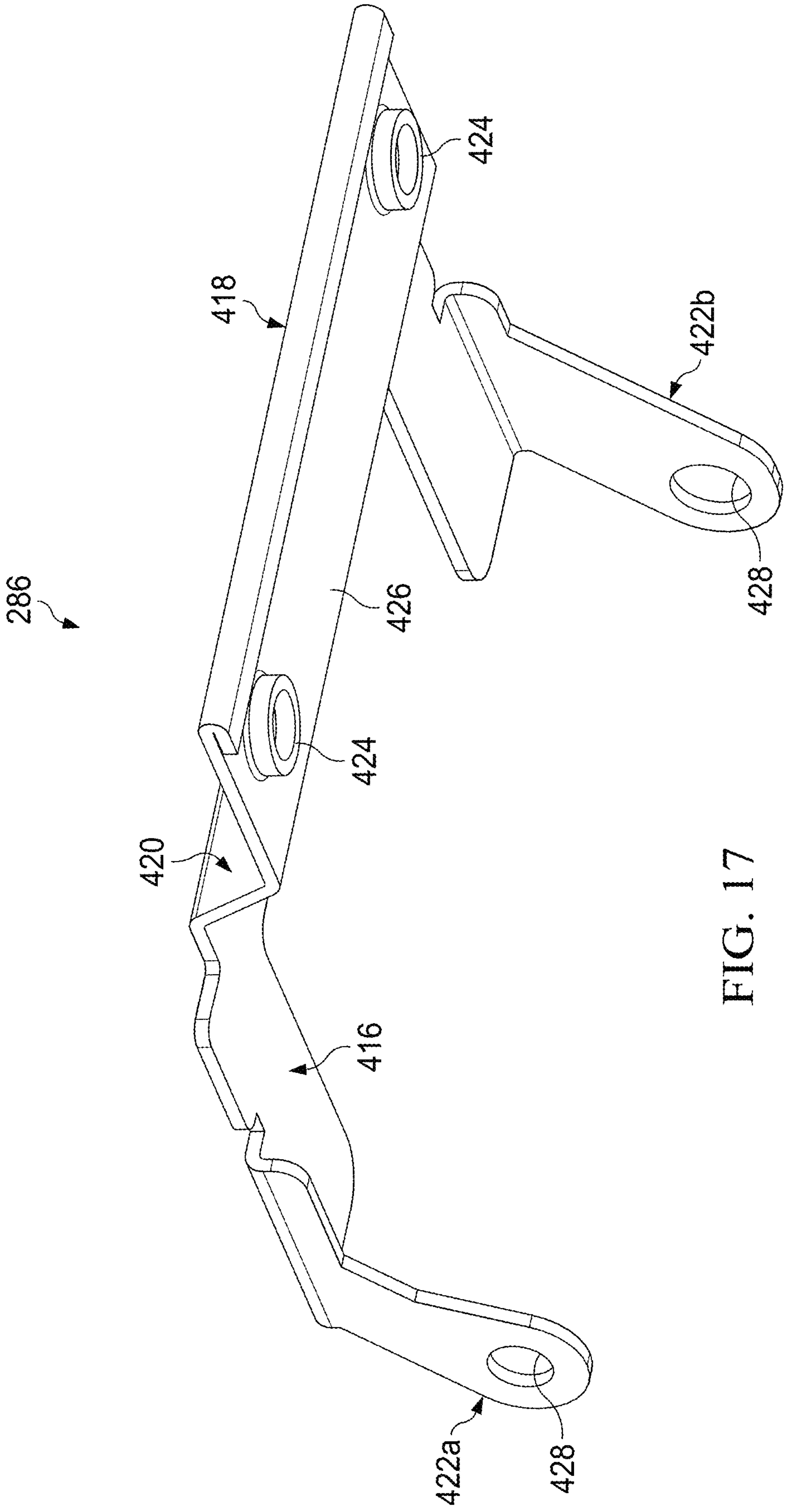
FIG. 17 illustrates a front, bottom, and left side isometric view of the push plate of FIG. 16.

As best shown in FIG. 17, one or more upper spring support members 424 may be connected to an underside 426 of the lower shelf 418 and extend downwardly therefrom. For example, the push plate 286 may include two upper spring support members 424 positioned to align with the spring base members 344 of the printhead holder 282 and receive the second spring end 404 of the springs 284*a*, 284*b* (see FIG. 15). Each of the push plate sidewalls 422*a*, 422*b* may include a second linking shaft opening 428 provided in the form of a substantially circular opening extending entirely through the push plate sidewalls 422*a*, 422*b*. For example, the second linking shaft openings 428 of the push plate sidewalls 422*a*, 422*b* may be positioned to align with the first linking shaft openings 356 of the printhead holder sidewalls 342*a*, 342*b*, respectively.

Figure 18:
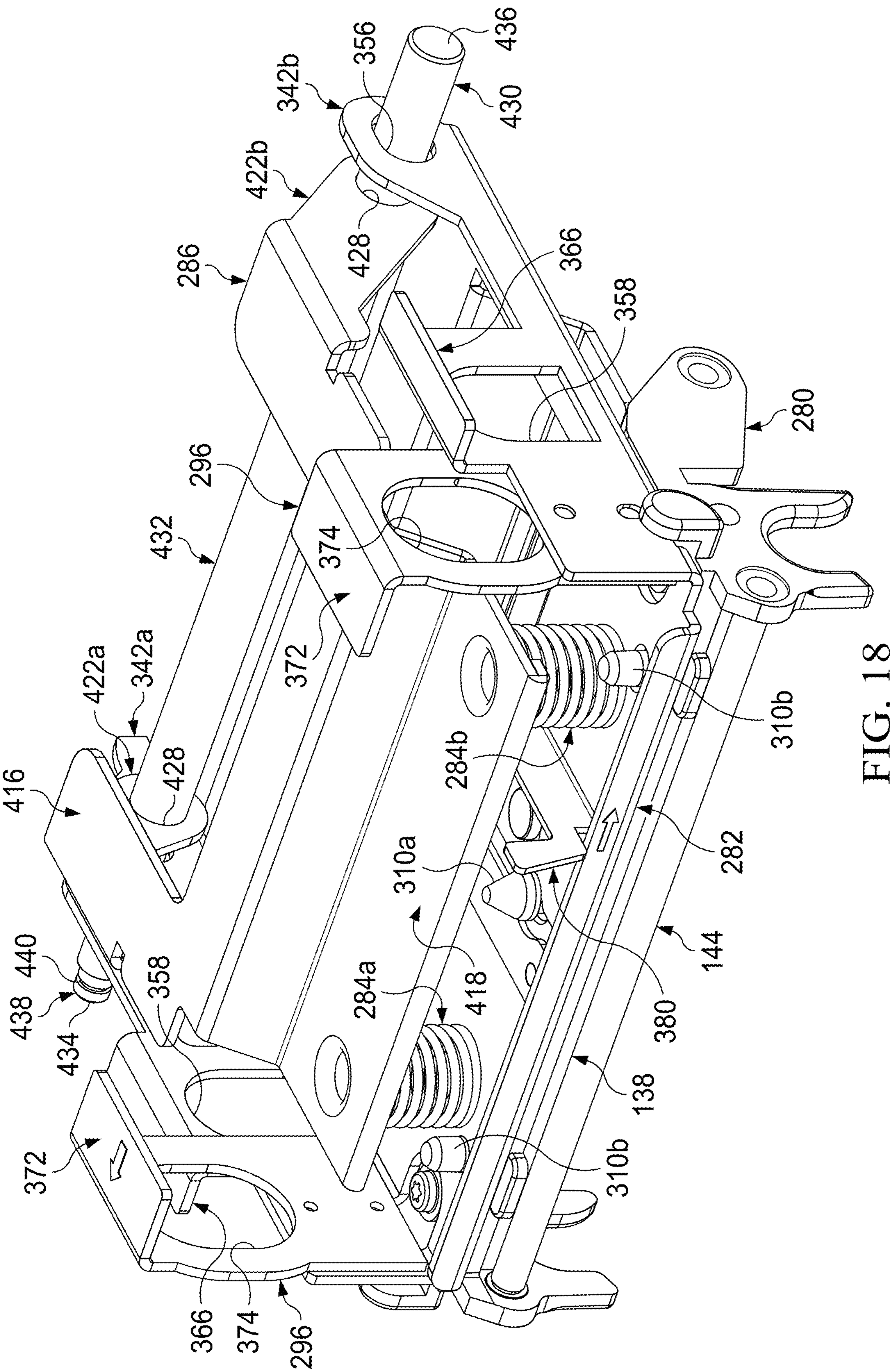
FIG. 18 illustrates a front, top, and right side isometric view of the partial assembly of FIG. 15 with the push plate of FIG. 16 and a linking shaft.

Turning to FIG. 18, the push plate 286 may be positioned proximate to (e.g., above) the printhead holder 282 such that the second linking shaft openings 428 of the push plate 286 align with the first linking shaft openings 356 of the printhead holder 282. Thus, a linking shaft 430 may extend through the first printhead holder sidewall 342*a*, the first push plate sidewall 422*a*, the second push plate sidewall 422*b*, and the second printhead holder sidewall 342*b* via the first and second linking shaft openings 356, 428. The linking shaft 430 may be provided in the form of a substantially cylindrical linking shaft body 432 defined by a linking shaft first end 434 and a linking shaft second end 436 opposing the linking shaft first end 434. In some instances, the linking shaft first end 434 may be positioned proximate to (e.g., outside of) the first printhead holder sidewall 342*a* and the first push plate sidewall 422*a*, and the linking shaft second end may be positioned proximate to (e.g., outside of) the second printhead holder sidewall 342*b* and the second push plate sidewall 422*b*. In some instances, the linking shaft 430 may include a notched segment 438 with a substantially circular groove 440 at the linking shaft first end 434.

In some instances, the linking shaft 430 may couple and/or maintain alignment between the printhead holder 282 and the push plate 286. The push plate 286 may be positioned such that the second spring ends 404 of the springs 284 (see FIG. 15) are received by the upper spring support members 424 positioned on the lower shelf 418 and extending downwardly therefrom. Thus, the springs 284 may be interposed between the push plate 286 and the printhead holder 282 and a pressure applied by the push plate 286 may compress the springs 284. In some instances, the push plate 286 may be held in place with respect to the printhead holder 282 such that the elastic potential energy stored in the compressed springs 284 may apply an upward force against the push plate 286 and a downward force against the printhead holder 282.

Figure 19:
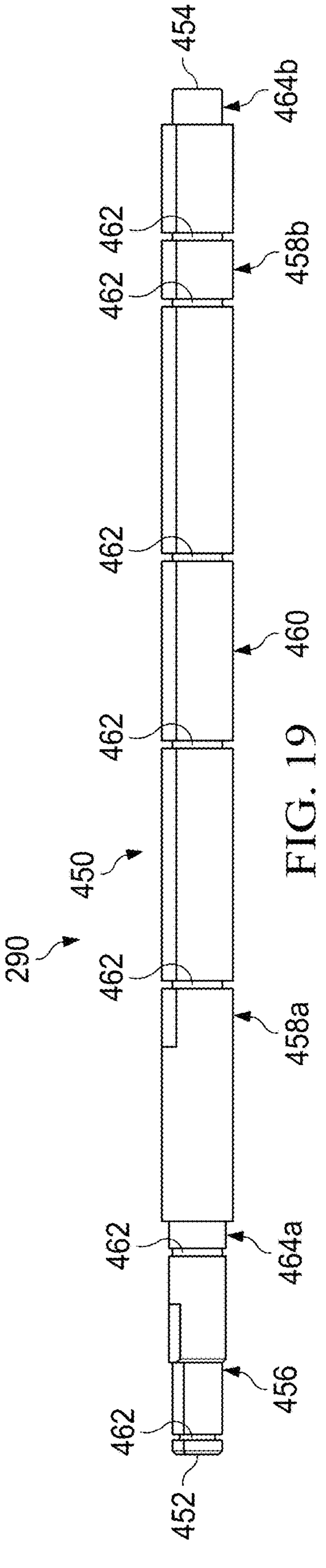
FIG. 19 illustrates a front elevational view of a cam shaft of the printhead module of FIG. 9.

Turning to FIG. 19, the cam shaft 290 may be provided in the form of a substantially cylindrical or linear cam shaft body 450 defined by a cam shaft first end 452 and a cam shaft second end 454 opposing the cam shaft first end 452. A gear region 456 adjacent to the cam shaft first end 452 may be configured to receive the cam adjustment gear 292 and support the cam adjustment gear 292 for rotation with the cam shaft 290. Two lift cam regions 458 may be configured to receive the lift cams 294 and support the lift cams 294 for rotation with the cam shaft 290. For example, a first lift cam region 458*a* arranged to receive the first lift cam 294*a* may be positioned adjacent to the gear region 456, and a second lift cam region 458*b* arranged to receive the second lift cam 294*b* may be positioned proximate to the cam shaft second end 454. In some instances, the first and second lift cam regions 458*a*, 458*b* may be positioned to align with the flange impact surfaces 372 of the printhead holder 282 (see FIG. 9) when the printhead module 202 is fully assembled.

A force cam region 460 positioned between the lift cam regions 458 may be configured to receive the force cam 288 and support the force cam 288 for rotation with the cam shaft 290. The cam shaft 290 may include one or more washer grooves 462 arranged on or adjacent to the gear region 456, lift cam regions 458, and/or force cam region 460. For example, the washer grooves 462 may be configured to receive a washer or other mechanical part designed to prevent unintentional tracking or movement of the cam adjustment gear 292, lift cams 294, and/or force cam 288 with respect to the cam shaft 290.

The cam shaft 290 may include one or more insert regions 464 configured to facilitate rotation of the cam shaft 290 when the printhead module 202 is fully assembled. For example, a first insert region 464*a* may be positioned proximate to the cam shaft first end 452 (e.g., between the gear region 456 and the first lift cam region 458*a*), and a second insert region 464*b* may be positioned at the cam shaft second end 454. In some instances, each of the insert regions 464*a*, 464*b* may be configured to receive and support a bearing (see FIG. 21) that facilitates rotation of the cam shaft 290 when the printhead module 202 is fully assembled.

Figure 20:
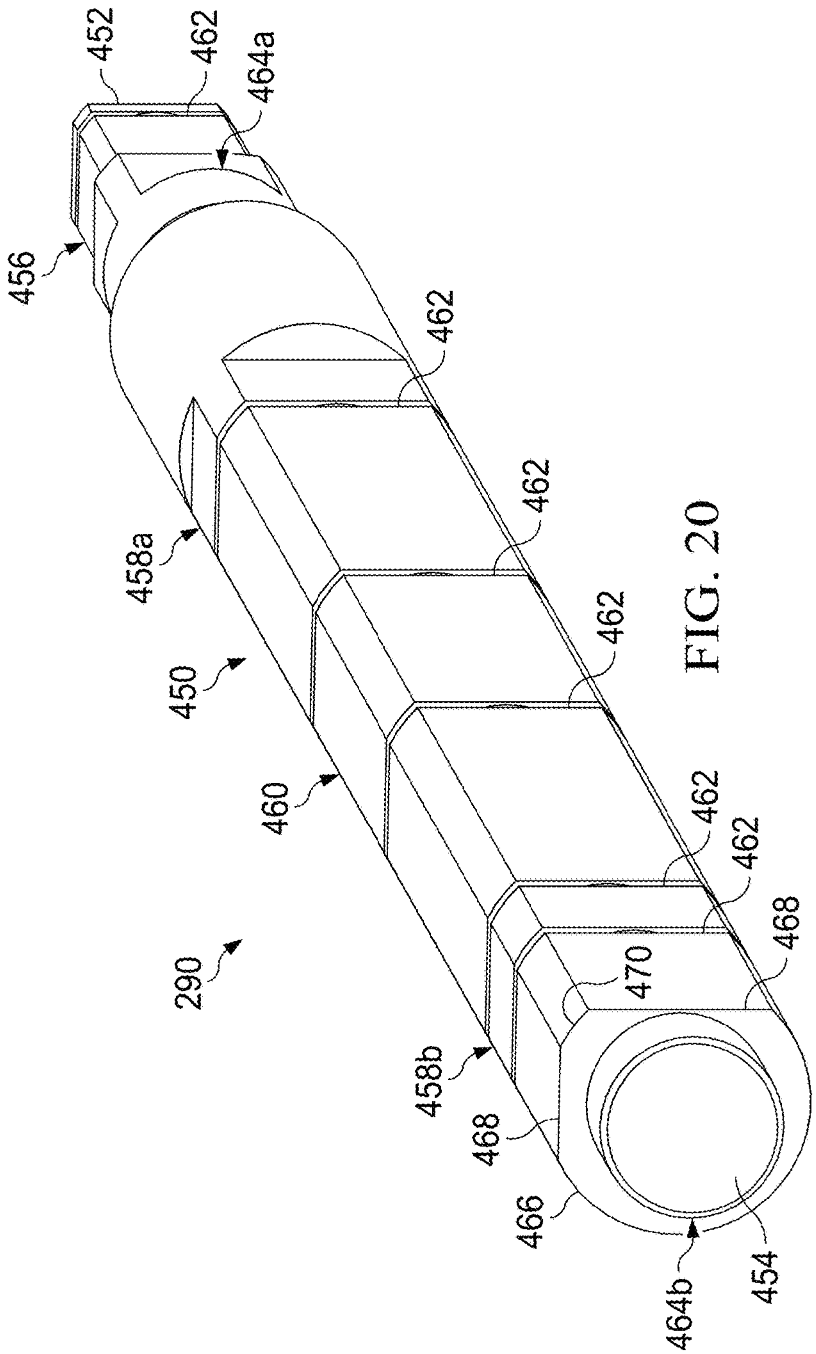
FIG. 20 illustrates a top and right side isometric view of the cam shaft of FIG. 19.

As best shown in FIG. 20, at least a portion of the cam shaft body 450 may be provided in the form of a partial cylinder. For example, in some instances, the gear region 456, first lift cam region 458*a*, second lift cam region 458*b*, and force cam region 460 may each include a semicircular edge 466, two substantially planar edges 468 connected to opposing ends of the semicircular edge 466, and a beveled edge 470 positioned at a juncture between the planar edges 468. In other instances, the gear region 456, lift cam regions 458*a*, 458*b*, and force cam region 460 may be provided in any suitable form provided that the gear region 456, lift cam regions 458*a*, 458*b*, and force cam region 460 are configured to inhibit rotation of the cam adjustment gear 292, lift cams 294, and force cam 288, respectively, with respect to the cam shaft 290. The insert regions 464*a*, 464*b* may be provided in the form of substantially cylindrical segments positioned along the cam shaft body 450 as described above with reference to FIG. 19.

Figure 21:
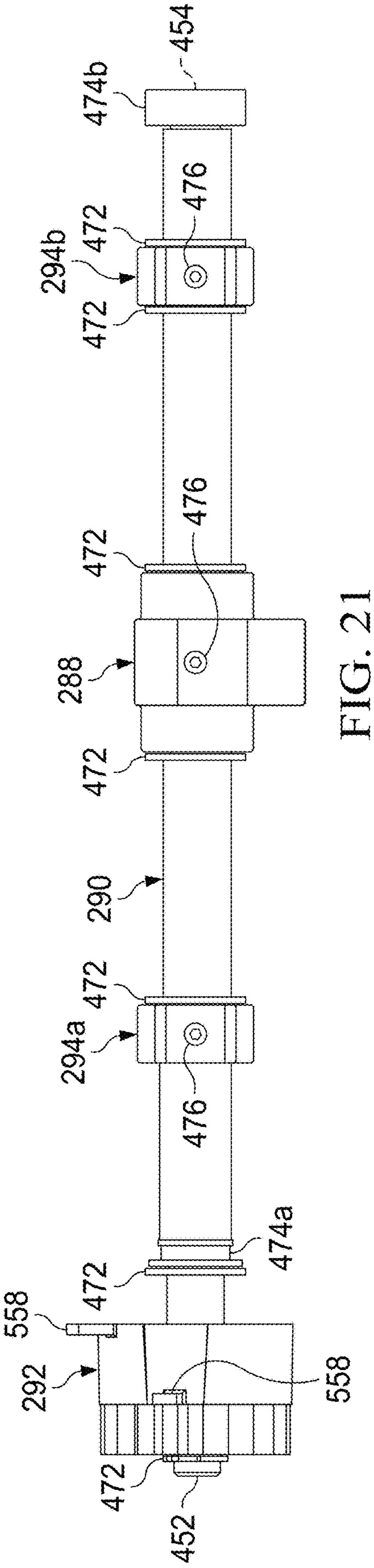
FIG. 21 illustrates the cam shaft of FIG. 19 with a cam adjustment gear, lift cams, and a force cam positioned thereon.

Turning to FIG. 21, the cam shaft 290 is depicted with the cam adjustment gear 292 positioned on the gear region 456, the first and second lift cams 294*a*, 294*b* positioned on the first and second lift cam regions 458*a*, 458*b*, respectively, and the force cam 288 positioned on the force cam region 460. In some instances, washers 472 may be installed on the washer grooves 462 (see FIG. 19) adjacent to the cam adjustment gear 292, the lift cams 294, and/or the force cam 288 to inhibit or eliminate unintentional tracking or movement along the cam shaft 290. One or more bearings 474 may be positioned along the cam shaft 290 (e.g., to facilitate rotation of the cam shaft 290 when the printhead module 202 is fully assembled). For example, a first bearing 474*a* may be positioned on the first insert region 464*a* and a second bearing 474*b* may be positioned on the second insert region 464*b*.

Figure 22:
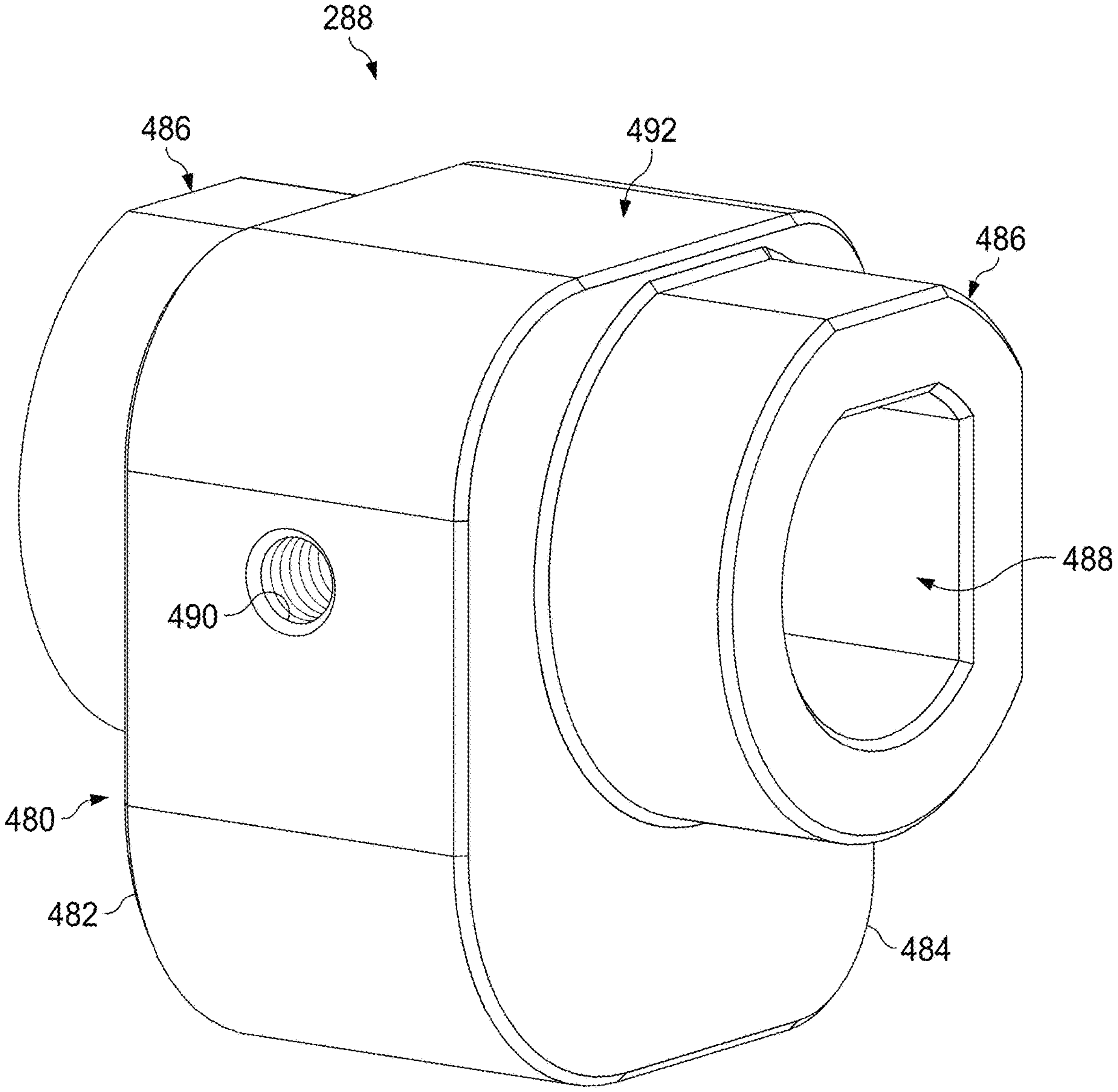
FIG. 22 illustrates a front, top, and right side isometric view of the force cam of FIG. 21.

Turning now to FIG. 22, the force cam 288 may be provided in the form of a substantially rectilinear force cam body 480 defined by a force cam first side 482 and a force cam second side 484 opposing the force cam first side 482. A substantially annular collar 486 may be connected to each of the force cam first side 482 and the force cam second side 484 and extend outwardly therefrom. The collars 486 may be arranged to be aligned with respect to the force cam body 480 such that a force cam opening 488 may extend entirely through the force cam body 480 and both collars 486. In some instances, a force cam connection hole 490 may be positioned on the force cam body 480 and extend entirely therethrough. For example, the force cam connection hole 490 may be provided in the form of a substantially circular opening extending entirely between a force cam exterior surface 492 and the force cam opening 488. In some instances, the force cam connection hole 490 may include a threaded interior surface and may be substantially perpendicular with respect to the force cam opening 488. Thus, a screw member 476 may extend through the force cam connection hole 490 (e.g., engaging a threaded inner surface of the force cam connection hole 490) and aid in securing the force cam 288 with respect to the cam shaft 290 (see FIG. 21). In other instances, the force cam connection hole 490 may be any suitable size and shape to receive a screw, pin, or other fastener known in the art.

Figure 23:
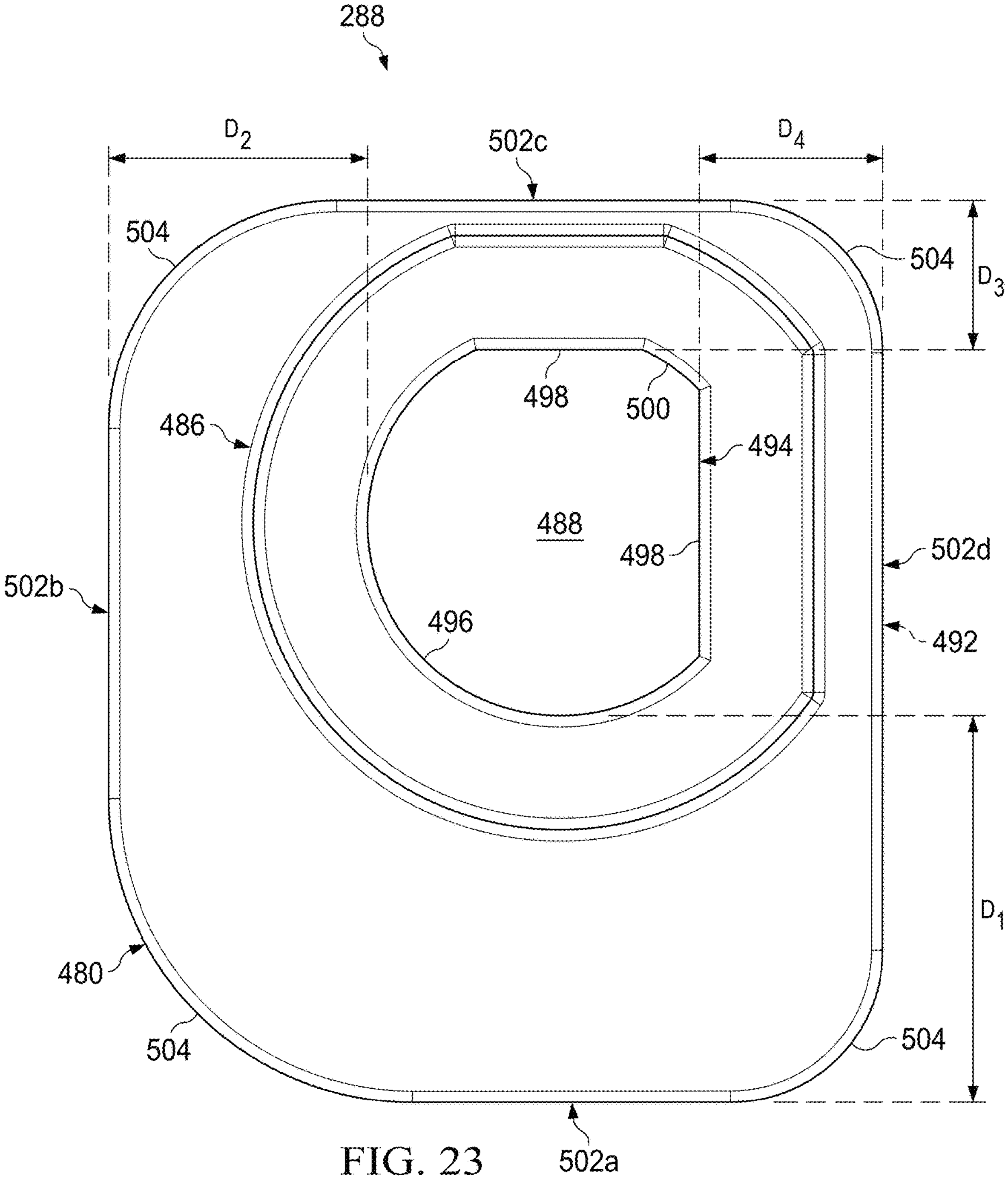
FIG. 23 illustrates a right side elevational view of the force cam of FIG. 21.

As best shown in FIG. 23, a force cam interior surface 494 may define the force cam opening 488 such that the geometry of the force cam opening 488 mirrors or complements the geometry of the cam shaft 290 at the force cam region 460 (see FIG. 20). For example, in some instances, the force cam interior surface 494 may include a force cam semicircular edge 496, two force cam planar edges 498 connected to opposing ends of the force cam semicircular edge 496, and a force cam beveled edge 500 positioned at a juncture between the force cam planar edges 498. Thus, the force cam planar edges 498 and the force cam beveled edge 500 may engage the planar edges 468 and beveled edge 470, respectively, of the cam shaft 290 when the force cam 288 is installed (e.g., when the force cam opening 488 receives the force cam region 460 of the cam shaft 290). In this way, the force cam 288 may be prevented or restricted from rotating with respect to the cam shaft 290 when the printhead assembly 200 is in use. In other words, the force cam 288 may be configured to rotate in unison with the cam shaft 290 when the printhead assembly 200 is in use.

In some instances, the force cam exterior surface 492 may be substantially rectangular and may include four force cam quadrants 502*a*, 502*b*, 502*c*, 502*d* provided in the form of substantially planar segments of the force cam exterior surface 492. Curved corner portions 504 provided in the form of rounded segments of the force cam exterior surface 492 may be positioned between each adjacent pair of the force cam quadrants 502*a*-502*d* (e.g., 502*a* and 502*b*; 502*b* and 502*c*; 502*c* and 502*d*; and/or 502*d* and 502*a*). The force cam quadrants 502*a*-502*d* may correspond to different settings or conditions of the printhead 138.

For example, the force cam quadrants 502*a*-502*d* may be separated from the force cam opening 488 by varying distances. In some instances, the first force cam quadrant 502*a* may be separated from the nearest point along the force cam interior surface 494 by a first distance $D_1$, the second force cam quadrant 502*b* may be separated from the nearest point along the force cam interior surface 494 by a second distance $D_2$, the third force cam quadrant 502*c* may be separated from the nearest point along the force cam interior surface 494 by a third distance $D_3$, and the fourth force cam quadrant 502*d* may be separated from the nearest point along the force cam interior surface 494 by a fourth distance $D_4$. In some instances, the first distance $D_1$ may be greater than the second distance $D_2$, the third distance $D_3$, and the fourth distance $D_4$. The second distance $D_2$ may be greater than the third distance $D_3$ and the fourth distance $D_4$. The third distance $D_3$ may be greater than the fourth distance $D_4$, the fourth distance $D_4$ may be substantially equal to the third distance $D_3$, or the fourth distance $D_4$ may be greater than the third distance $D_3$.

In some instances, the first, second, and third force cam quadrants 502*a*, 502*b*, 502*c* may be active quadrants of the force cam 288. For example, the first, second, and third force cam quadrants 502*a*, 502*b*, 502*c* may be arranged to alter the nip force applied by the printhead 138 by altering a force applied to the push plate 286 while the printhead 138 is in a lowered position with respect to the platen roller 140 (see FIGS. 28A, 28B, and 28C). In some instances, the fourth force cam quadrant 502*d* may be an idle quadrant of the force cam 288 arranged to impact the push plate 286 when the printhead 138 is in the lifted position with respect to the platen roller 140. For example, the fourth force cam quadrant 502*d* may be arranged to contact the push plate 286 when the lift cams 294 are rotated into engagement with the flange members 296, thereby lifting the printhead 138 out of engagement with the platen roller 140 (see FIG. 28D).

Figure 24:
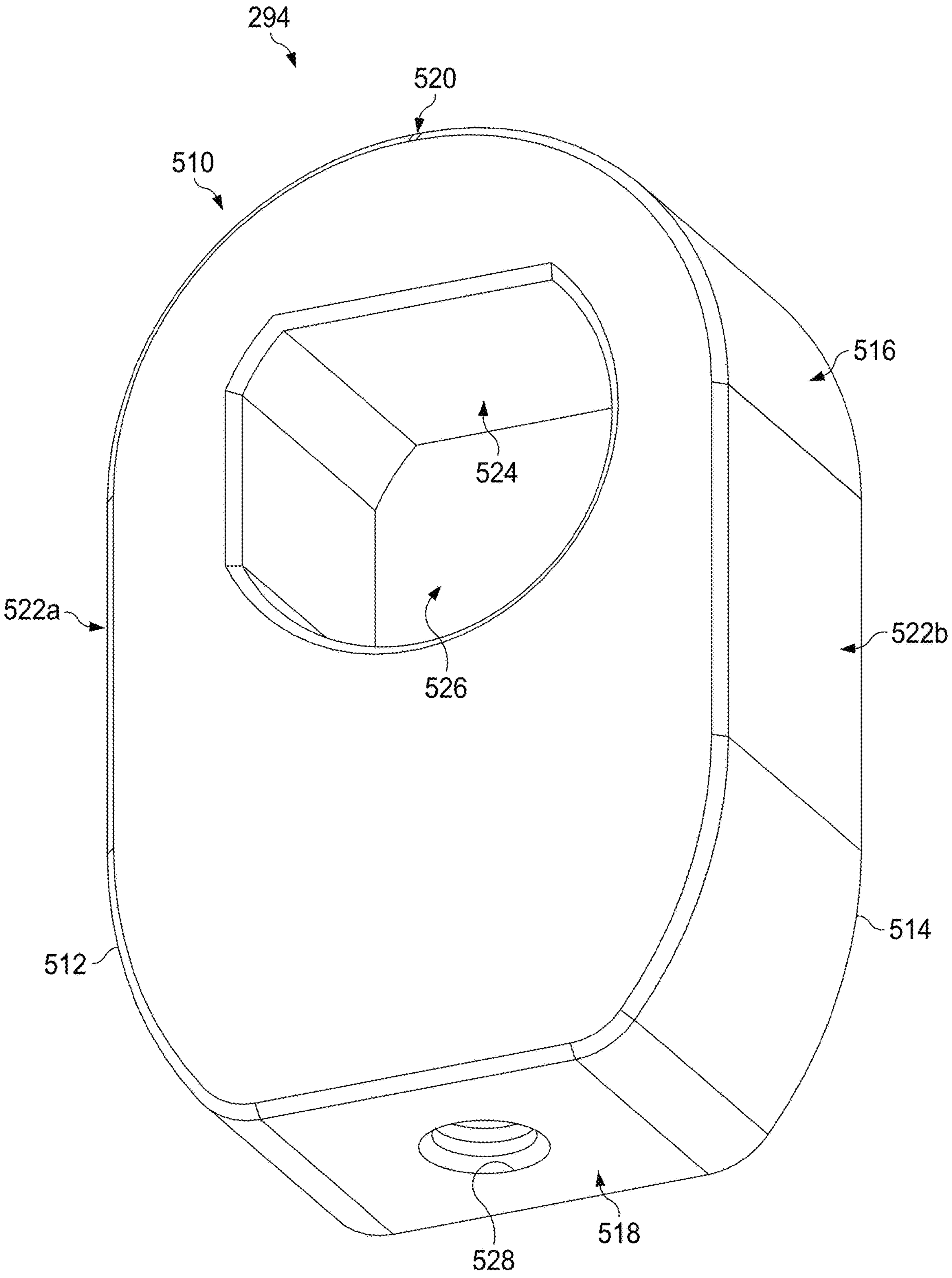
FIG. 24 illustrates a front, bottom, and left side isometric view of the lift cam of FIG. 21.

Turning to FIG. 24, the first lift cam 294*a* and the second lift cam 294*b* may each be provided in the form of a substantially rectangular or rounded lift cam body 510 defined by a lift cam first side 512 and a lift cam second side 514 opposing the lift cam first side 512. The lift cams 294 may include a lift cam exterior surface 516 extending around a perimeter of the lift cam body 510. The lift cam exterior surface 516 may include a substantially planar lift cam impact surface 518, a rounded lift cam apex 520, a first lift cam sidewall 522*a* extending between the lift cam impact surface 518 and the lift cam apex 520, and a second lift cam sidewall 522*b* opposing the first lift cam sidewall 522*a* and extending between the lift cam impact surface 518 and the lift cam apex 520. A lift cam interior surface 524 may define a lift cam opening 526 extending entirely through the lift cam body 510.

In some instances, a lift cam connection hole 528 may be positioned on the lift cam body 510 and extend entirely therethrough. For example, the lift cam connection hole 528 may be provided in the form of a substantially circular opening extending entirely between the lift cam impact surface 518 and the lift cam interior surface 524. In some instances, the lift cam connection hole 528 may include a threaded interior surface and may be substantially perpendicular with respect to the lift cam opening 526. Thus, a screw member 476 may extend through the lift cam connection hole 528 (e.g., engaging a threaded inner surface of the lift cam connection hole 528) and aid in securing the lift cam 294 with respect to the cam shaft 290 (see FIG. 21). In other instances, the lift cam connection hole 528 may be any suitable size or shape to receive a fastener such as a pin or other coupling mechanism known in the art.

Figure 25:
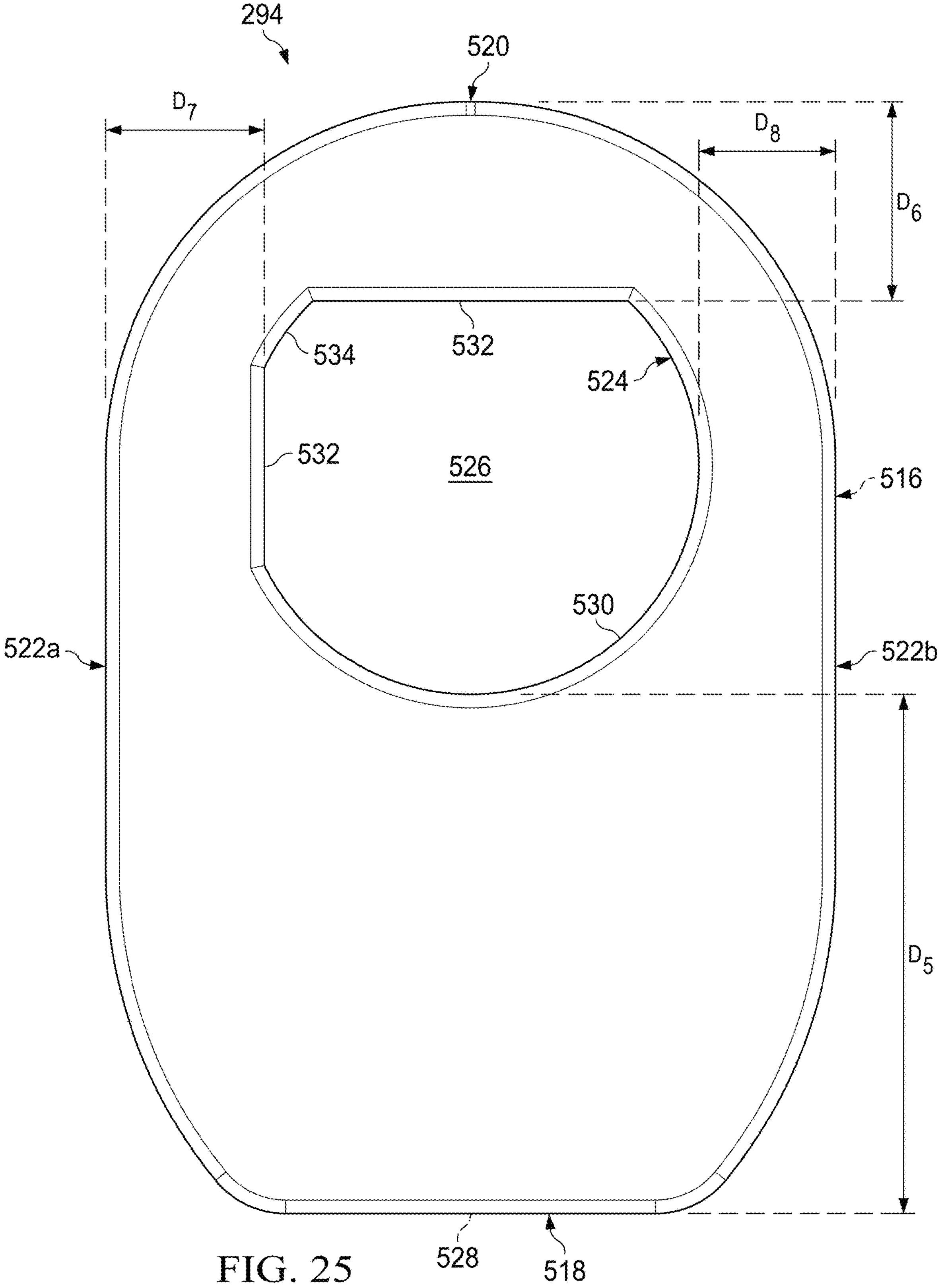
FIG. 25 illustrates a left side elevational view of the lift cam of FIG. 21.

As best shown in FIG. 25, the lift cam interior surface 524 may define the lift cam opening 526 such that the geometry of the lift cam opening 526 mirrors or complements the geometry of the cam shaft 290 at the lift cam regions 458 (see FIG. 20). For example, in some instances, the lift cam interior surface 524 may include a lift cam semicircular edge 530, two lift cam planar edges 532 connected to opposing ends of the lift cam semicircular edge 530, and a lift cam beveled edge 534 positioned at a juncture between the lift cam planar edges 532. Thus, the lift cam planar edges 532 and the lift cam beveled edge 534 may engage the planar edges 468 and beveled edge 470, respectively, of the cam shaft 290 when the lift cam 294 is installed (e.g., when the lift cam opening 526 receives the associated lift cam region 458 of the cam shaft 290). In this way, the lift cams 294 may be prevented or restricted from rotating with respect to the cam shaft 290 when the printhead assembly 200 is in use. In other words, the lift cams 294 may be configured to rotate in unison with the cam shaft 290 when the printhead assembly 200 is in use.

The lift cam impact surface 518, lift cam apex 520, and lift cam sidewalls 522 may be separated from the lift cam opening 526 by varying distances. For example, the lift cam impact surface 518 may be separated from the nearest point along the lift cam interior surface 524 by a fifth distance $D_5$, the lift cam apex 520 may be separated from the nearest point along the lift cam interior surface 524 by a sixth distance $D_6$, the first lift cam sidewall 522*a* may be separated from the nearest point along the lift cam interior surface 524 by a seventh distance $D_7$, and the second lift cam sidewall 522*b* may be separated from the nearest point along the lift cam interior surface 524 by an eighth distance $D_8$. In some instances, the fifth distance $D_5$ may be greater than the sixth distance $D_6$, the seventh distance $D_7$, and the eighth distance $D_8$. The sixth distance $D_6$, the seventh distance $D_7$, and the eighth distance $D_8$ may be substantially equal or may vary with respect to one another.

In some instances, the lift cam apex 520 and the lift cam sidewalls 522 may be idle portions of the lift cam exterior surface 516. For example, the lift cam apex 520 and the lift cam sidewalls 522 may be arranged to be positioned adjacent to, but not to engage, the associated flange member 296 when the active quadrants of the force cam 288 (e.g., the first, second, and third force cam quadrants 502*a*, 502*b*,

502*c*) engage the push plate 286 (see FIG. 9). The lift cam impact surface 518 may be an active portion of the lift cam exterior surface 516. For example, the lift cam impact surface 518 may be arranged to engage the associated flange member 296, thereby lifting the printhead 138 away from the platen roller 140, when the idle quadrant of the force cam 288 (e.g., the fourth force cam quadrant 502*d*) engages the push plate 286 (see FIG. 28D).

Thus, the lift cams 294 may not engage the flange members 296 while printing is in process so that the printhead 138 is maintained in the lowered position while the active force cam quadrants (e.g., the first, second, and third force cam quadrants 502*a*, 502*b*, 502*c*) engage the push plate 286. During periods of non-use, the lift cams 294 may be rotated into engagement with the flange members 296 to place the printhead 138 in the lifted condition while the idle force cam quadrant (e.g., the fourth force cam quadrant 502*d*) engages the push plate 286.

Figure 26:
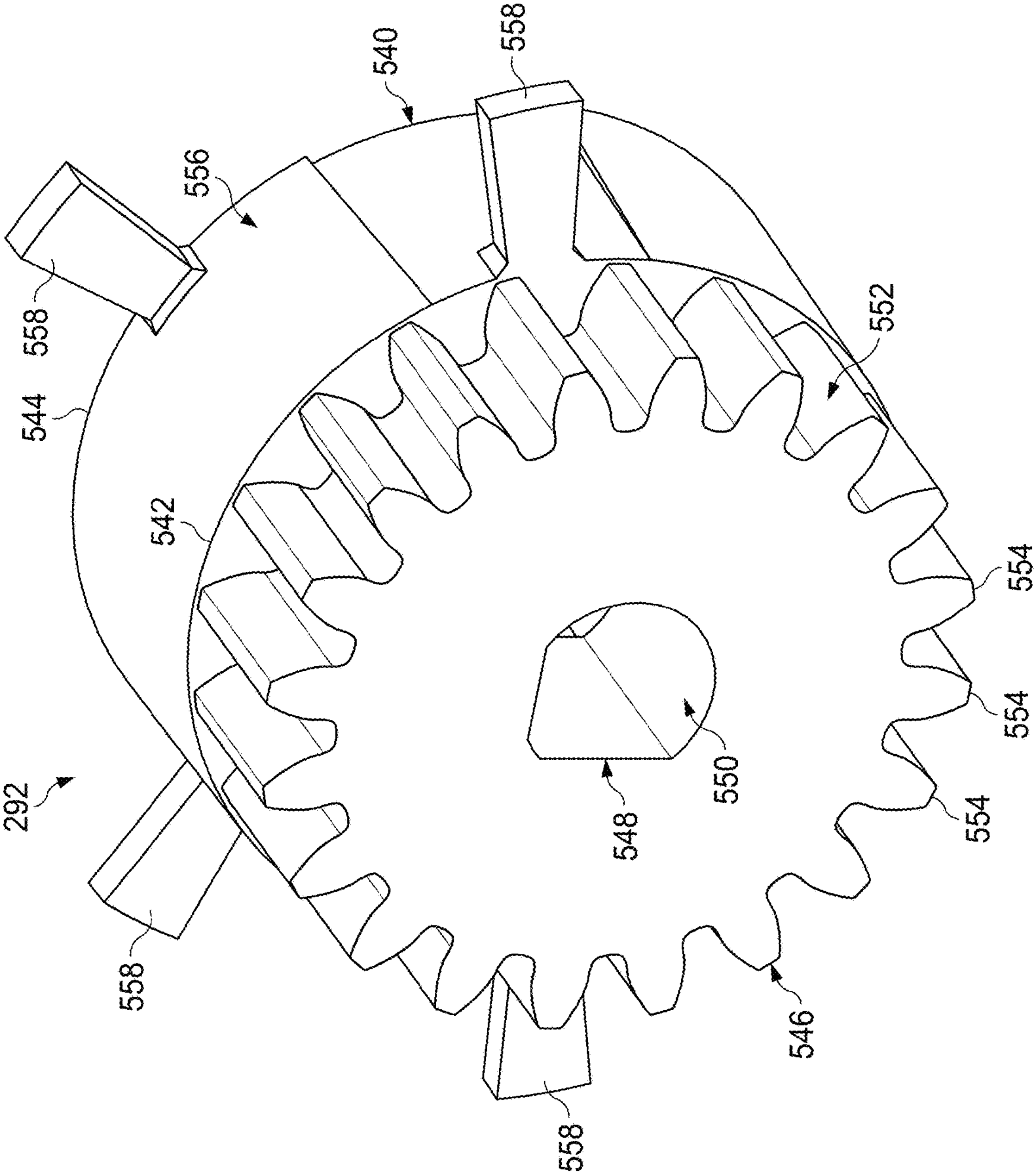
FIG. 26 illustrates a front, top, and left side isometric view of the cam adjustment gear of FIG. 21.

Turning to FIG. 26, the cam adjustment gear 292 may be provided in the form of a substantially annular adjustment gear hub 540 defined by a hub first end 542 and a hub second end 544 opposing the hub first end 542 and an adjustment gear member 546 connected to the adjustment gear hub 540 at the hub first end 542. An adjustment gear interior surface 548 may define an adjustment gear opening 550 extending entirely through the adjustment gear member 546 and the adjustment gear hub 540. The adjustment gear member 546 may include an adjustment gear member exterior surface 552 with a plurality of adjustment gear teeth 554 circumscribing the gear member exterior surface 552 and spaced evenly radially apart from one another. The adjustment gear hub 540 may include a substantially smooth hub exterior surface 556 extending between the hub first end 542 and the hub second end 544.

The cam adjustment gear 292 may include one or more sensor flags 558 positioned on the hub exterior surface 556 and extend outwardly therefrom. For example, the sensor flags 558 may be provided in the form of substantially rectangular or rectilinear protrusions connected to the hub exterior surface 556 and extending radially away from the adjustment gear hub 540. In some instances, one or more sensor flags 558 may be positioned at the hub first end 542 and one or more sensor flags 558 may be positioned at the hub second end 544. For example, as shown in the example of FIG. 26, the cam adjustment gear 292 may include two sensor flags 558 positioned at the hub first end 542 and two sensor flags 558 positioned at the hub second end 544. In other instances, the cam adjustment gear 292 may include any number of sensor flags 558, and the sensor flags 558 may be provided in any suitable form and arranged in any suitable configuration. In some instances, the sensor flags 558 may be configured to indicate the rotational position of the cam shaft 290 to a controller 213 (see FIG. 5) or other electronic component of a printing device (e.g., the printer 100), as described in detail below with reference to FIG. 36.

Figure 27:
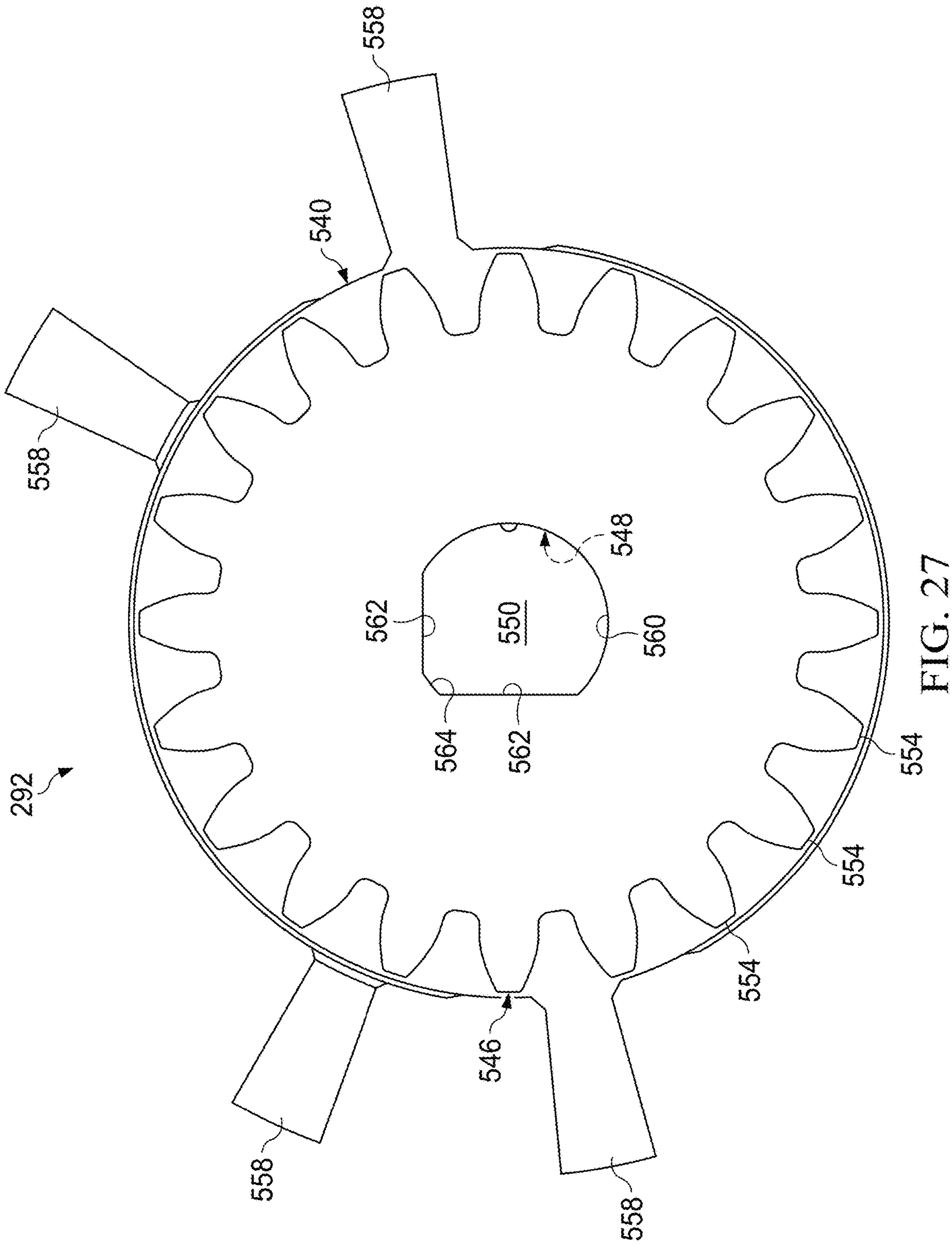
FIG. 27 illustrates a left side elevational view of the cam adjustment gear of FIG. 21.

As best shown in FIG. 27, the adjustment gear interior surface 548 may define the adjustment gear opening 550 such that the geometry of the adjustment gear opening 550 mirrors or complements the geometry of the cam shaft 290 at the gear region 456 (see FIG. 20). For example, in some instances, the adjustment gear interior surface 548 may include an adjustment gear semicircular edge 560, two adjustment gear planar edges 562 connected to opposing ends of the adjustment gear semicircular edge 560, and an adjustment gear beveled edge 564 positioned at a juncture between the adjustment gear planar edges 562. Thus, the adjustment gear planar edges 562 and the adjustment gear beveled edge 564 may engage the planar edges 468 and beveled edge 470, respectively, of the cam shaft 290 when the cam adjustment gear 292 is installed (e.g., when the adjustment gear opening 550 receives the gear region 456 of the cam shaft 290). In this way, the cam adjustment gear 292 may be prevented or restricted from rotating with respect to the cam shaft 290 when the printhead assembly 200 is in use. In other words, the cam adjustment gear 292 may be configured to rotate in unison with the cam shaft 290 when the printhead assembly 200 is in use.

Turning to FIGS. 28A-28D, in some instances, the cam shaft 290 may be configured to rotate into or occupy one of four rotational positions when the printhead assembly 200 is in use. For example, in some instances, the cam shaft 290 may rotate into or occupy a first rotational position 566*a*, a second rotational position 566*b*, a third rotational position 566*c*, or a fourth rotational position 566*d*. In some instances, the nip force may be altered depending on the rotational position of the cam shaft 290 due to the variability between the first, second, and third distances $D_1$, $D_2$, $D_3$ separating the first, second, and third force cam quadrants 502*a*, 502*b*, 502*c*, respectively, from the force cam opening 488 (see FIG. 23). Additionally, in some instances, the printhead 138 may move between the lifted position and the lowered position depending on the rotational position of the cam shaft 290 due to the difference between the fifth distance $D_5$ separating the lift cam impact surface 518 from the lift cam opening 526 and the sixth, seventh, and eighth distances $D_6$, $D_7$, $D_8$ separating the lift cam apex 520 and lift cam sidewalls 522*a*, 522*b* from the lift cam opening 526 (see FIG. 25).

Figure 28A:
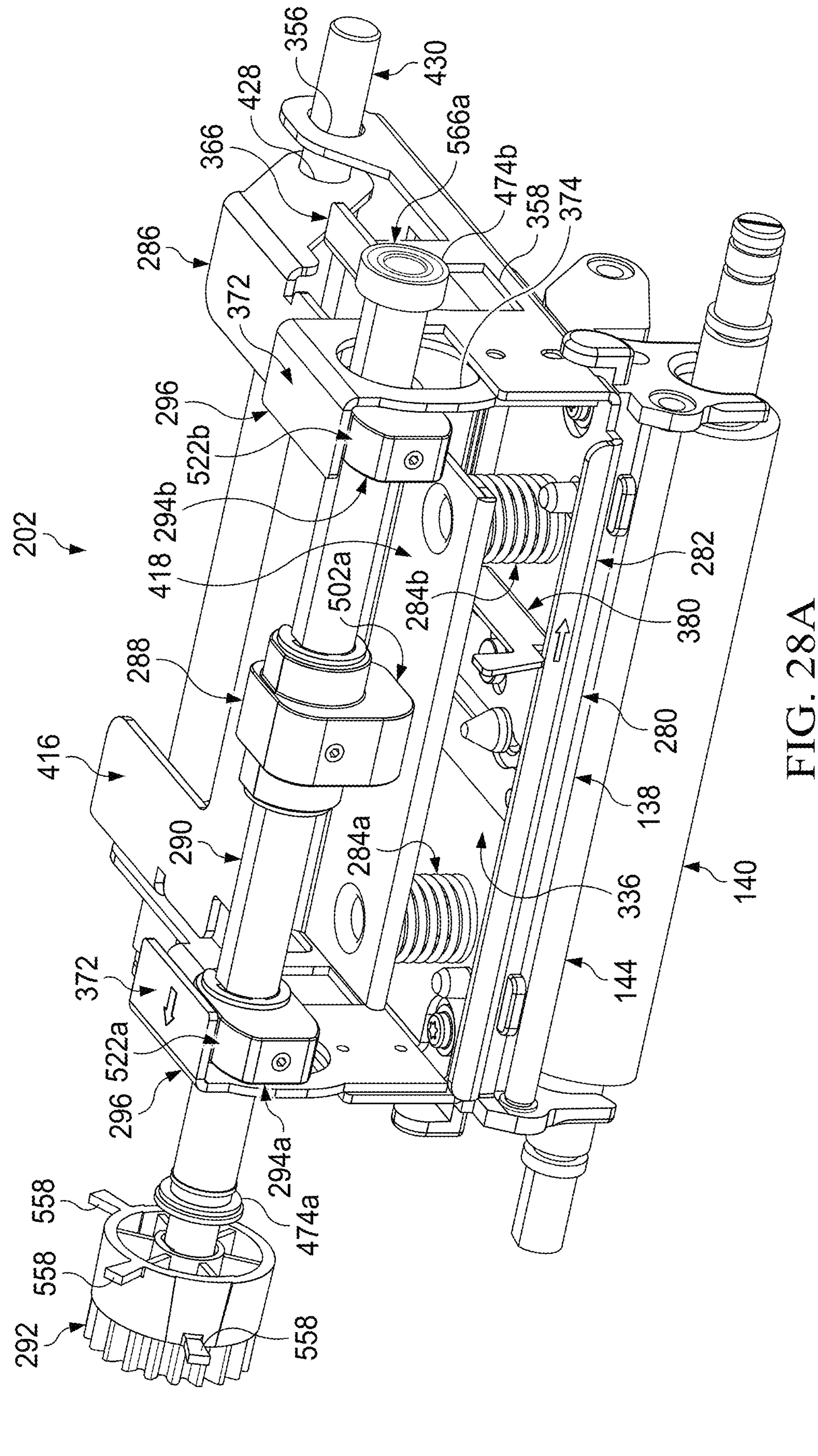
FIG. 28A illustrates a front, top, and right side isometric view of the printhead module of FIG. 9 in a first configuration.

Referring first to FIG. 28A, in some instances, the first rotational position 566*a* of the cam shaft 290 may correspond to a first nip force setting of the printhead assembly 200. For example, when the cam shaft 290 is in the first rotational position 566*a*, the first force cam quadrant 502*a* may contact or engage the lower shelf 418 of the push plate 286. Thus, the push plate 286 may be maintained in a first position with respect to the printhead holder 282 and the springs 284 may be compressed between the lower shelf 418 of the push plate 286 and the base plate 336 of the printhead holder 282. In some instances, the outward pressure exerted by one or more of the springs 284 when the cam shaft 290 is in the first rotational position 566*a* may cause the printhead 138 to apply a nip force having a first strength to the platen roller 140. In some instances, the first strength may be imparted with a value of at least about 80 Newtons (or at least 80 Newtons). The lift cams 294 may not engage the flange impact surface 372 of the flange members 296 when the cam shaft 290 is in the first rotational position 566*a*. For example, in some instances, one of the lift cam sidewalls 522*a*, 522*b* may be positioned adjacent to, but may not contact, the flange impact surface 372 of the adjacent flange member 296 when the cam shaft 290 is in the first rotational position 566*a*. In addition, the cam adjustment gear 292 and the sensor flags 558 connected thereto may be imparted with a first orientation when the cam shaft 290 is in the first rotational position 566*a*, as shown in FIG. 28A.

Figure 28B:
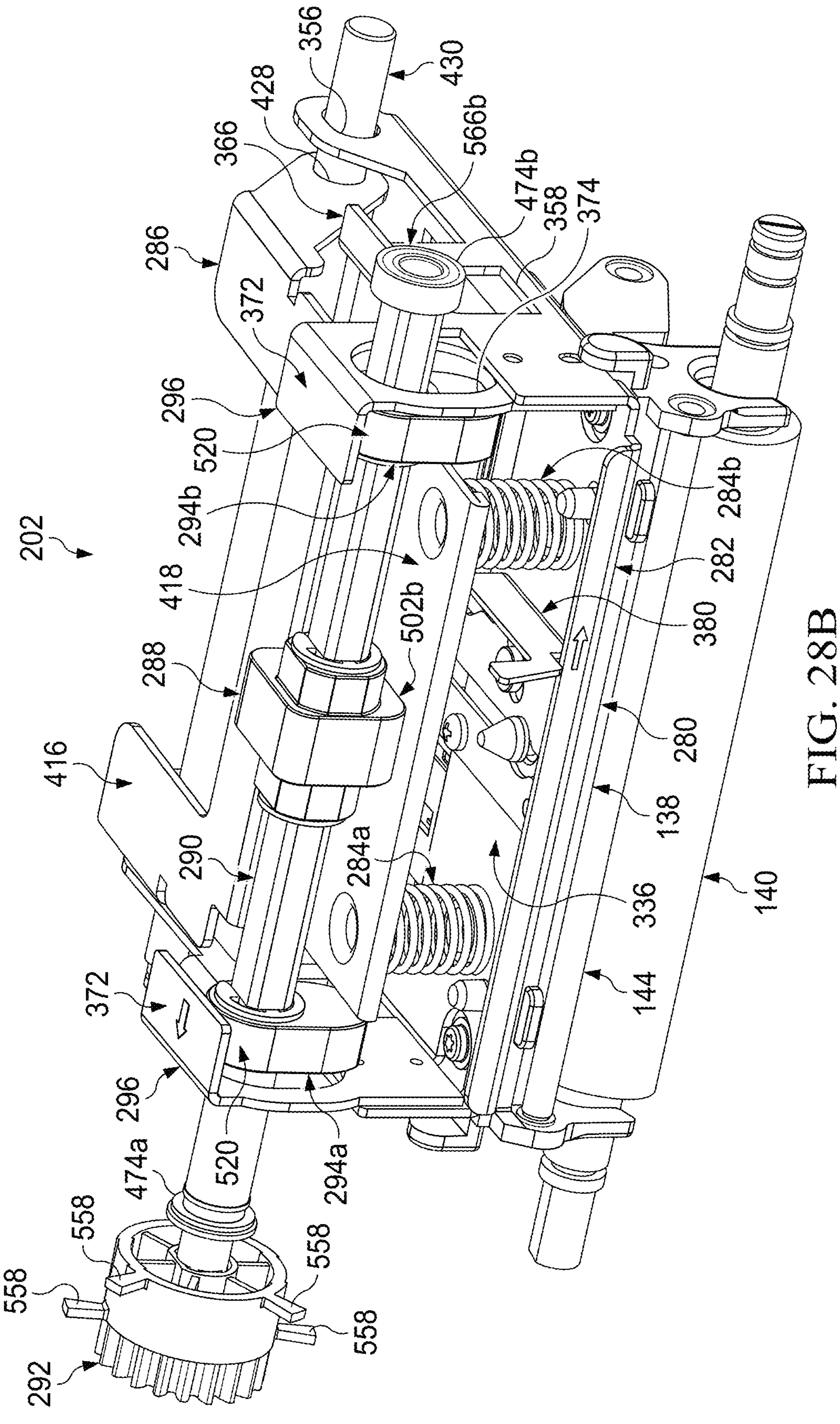
FIG. 28B illustrates a front, top, and right side isometric view of the printhead module of FIG. 9 in a second configuration.

Turning to FIG. 28B, in some instances, the second rotational position 566*b* of the cam shaft 290 may correspond to a second nip force setting of the printhead assembly 200. For example, when the cam shaft 290 is in the second rotational position 566*b*, the second force cam quadrant 502*b* may contact or engage the lower shelf 418 of the push plate 286. Thus, the push plate 286 may be maintained in a second position with respect to the printhead holder 282 (e.g., farther away than when the cam shaft 290 is in the first rotational position 566*a*), and the springs 284 may be compressed between the lower shelf 418 of the push plate 286 and the base plate 336 of the printhead holder 282 to a lesser degree than when the cam shaft 290 is in the first rotational position 566*a*. In some instances, the outward pressure exerted by one or more of the springs 284 when the cam shaft 290 is in the second rotational position 566*b* may cause the printhead 138 to apply a nip force having a second strength to the platen roller 140. The second strength may be less than the first strength associated with the cam shaft 290 in the first rotational position 566*a*. In some instances, the second strength may be imparted with a value of at least about 60 Newtons (or at least 60 Newtons). The lift cams 294 may not engage the flange impact surface 372 of the flange members 296 when the cam shaft 290 is in the second rotational position 566*b*. For example, in some instances, the lift cam apex 520 may be positioned adjacent to, but may not contact, the flange impact surface 372 of the adjacent flange member 296 when the cam shaft 290 is in the second rotational position 566*b*. The cam adjustment gear 292 and the sensor flags 558 connected thereto may be imparted with a second orientation when the cam shaft 290 is in the second rotational position 566*b*, as shown in FIG. 28B.

Figure 28C:
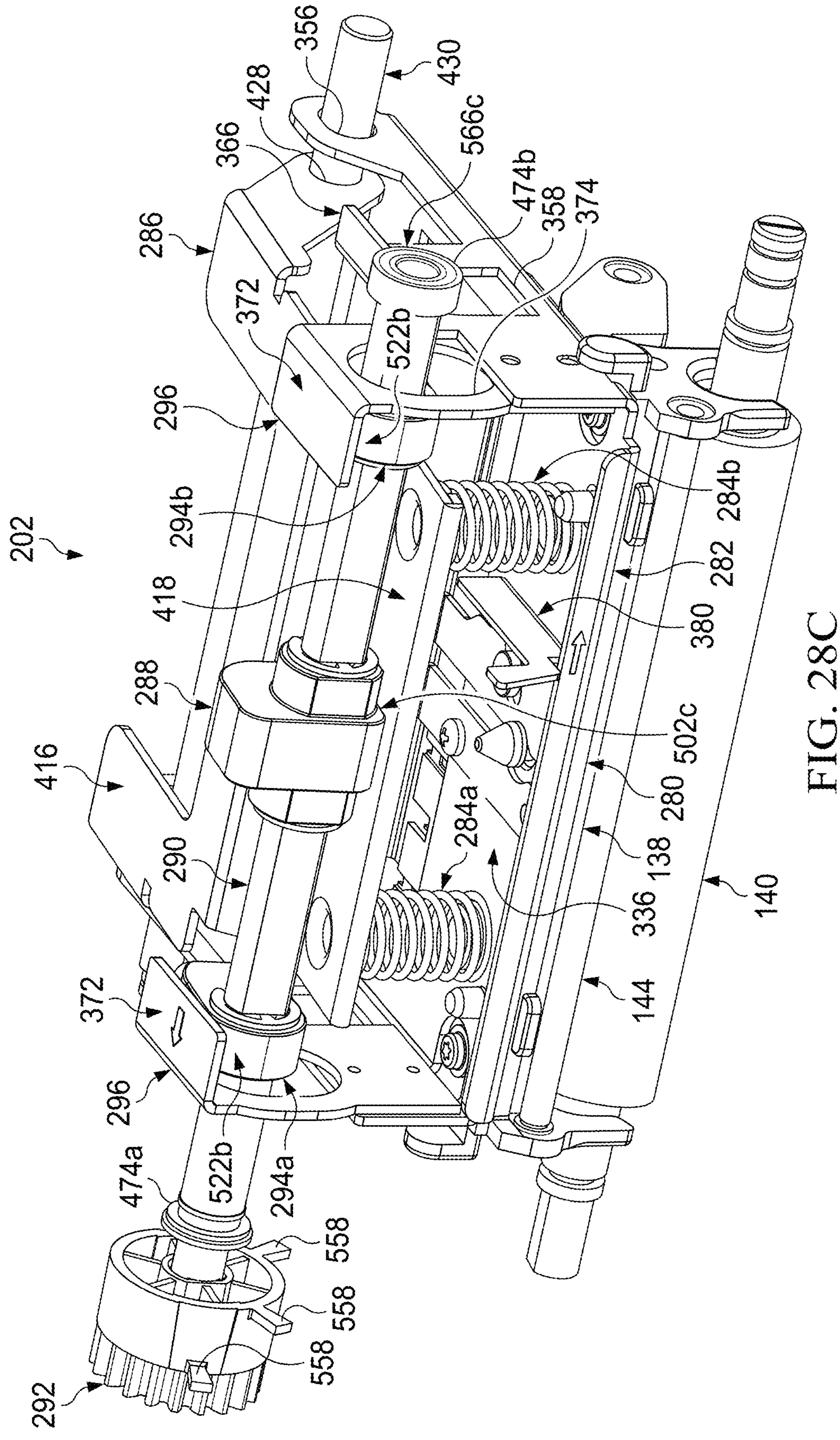
FIG. 28C illustrates a front, top, and right side isometric view of the printhead module of FIG. 9 in a third configuration.

Turning to FIG. 28C, in some instances, the third rotational position 566*c* of the cam shaft 290 may correspond to a third nip force setting of the printhead assembly 200. For example, when the cam shaft 290 is in the third rotational position 566*c*, the third force cam quadrant 502*c* of the force cam 288 may contact or engage the lower shelf 418 of the push plate 286. Thus, the push plate 286 may be maintained in a third position with respect to the printhead holder 282 (e.g., farther away than when the cam shaft 290 is in the first rotational position 566*a* and the second rotational position 566*b*), and the springs 284 may be compressed between the lower shelf 418 of the push plate 286 and the base plate 336 of the printhead holder 282 to a lesser degree than when the cam shaft 290 is in the first rotational position 566*a* and the second rotational position 566*b*. In some instances, the outward pressure exerted by one or more of the springs 284 when the cam shaft 290 is in the third rotational position 566*c* may cause the printhead 138 to apply a nip force having a third strength to the platen roller 140. The third strength may be less than the first and second strengths associated with the cam shaft 290 in the first and second rotational positions 566*a*, 566*b*. In some instances, the third strength may be imparted with a value of at least about 40 Newtons (or at least 40 Newtons). The lift cams 294 may not engage the flange impact surface 372 of the flange members 296 when the cam shaft 290 is in the third rotational position 566*c*. For example, in some instances, one of the lift cam sidewalls 522*a*, 522*b* may be positioned adjacent to, but may not contact, the flange impact surface 372 of the adjacent flange member 296 when the cam shaft 290 is in the third rotational position 566*c*. The cam adjustment gear 292 and the sensor flags 558 connected thereto may be imparted with a third orientation when the cam shaft 290 is in the third rotational position 566*c*, as shown in FIG. 28C.

Figure 28D:
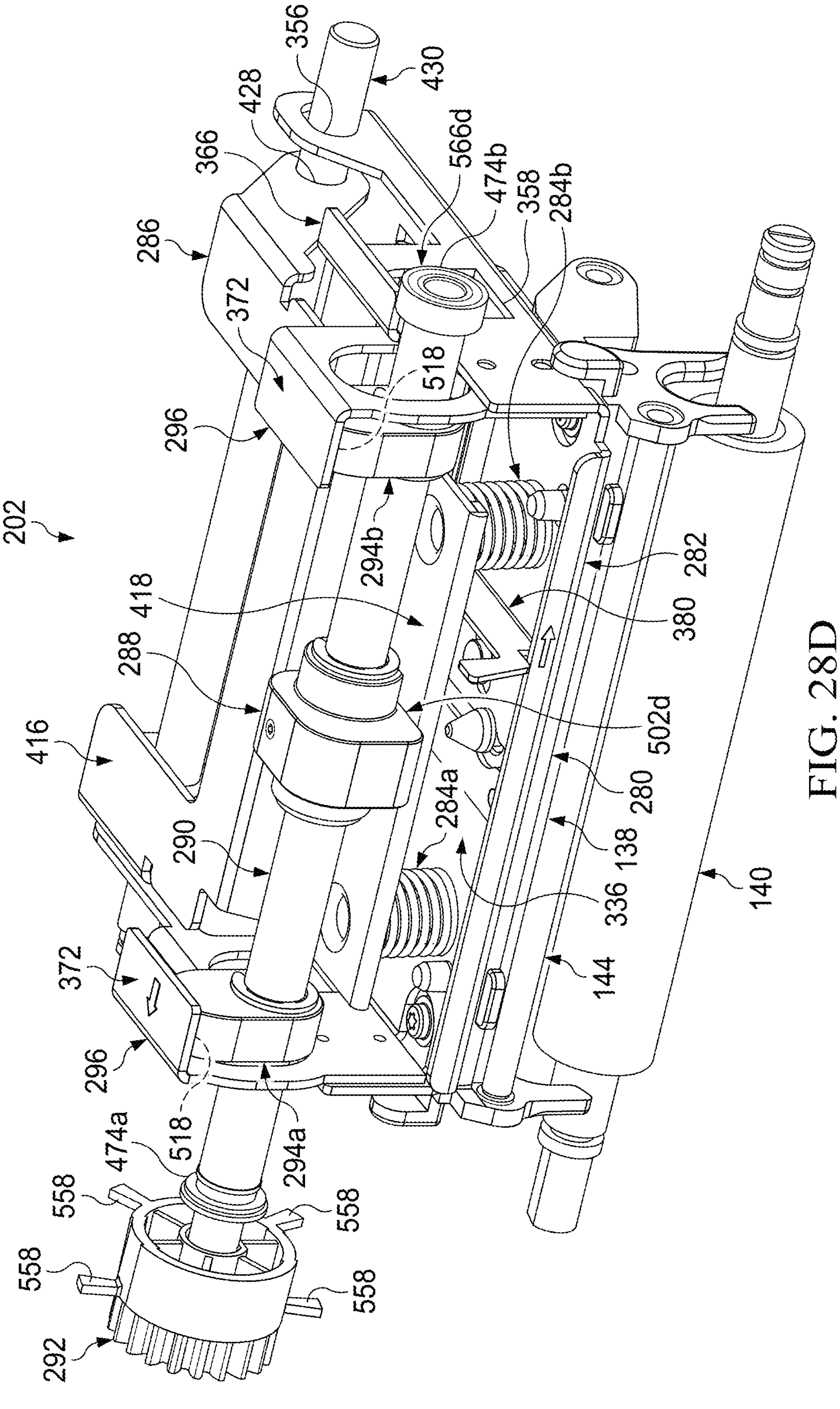
FIG. 28D illustrates a front, top, and right side isometric view of the printhead module of FIG. 9 in a fourth configuration.

Turning to FIG. 28D, the fourth rotational position 566*d* of the cam shaft 290 may correspond to a printhead lift setting of the printhead assembly 200. For example, when the cam shaft 290 is in the fourth rotational position 566*d*, the fourth force cam quadrant 502*d* of the force cam 288 may contact or engage the lower shelf 418 of the push plate 286. However, while the springs 284 may be compressed between the push plate 286 and the printhead holder 282, the printhead 138 may be incapable of applying a nip force to the platen roller 140 when the cam shaft 290 is in the fourth rotational position 566*d* due to engagement between the lift cams 294 and the flange members 296. For example, the lift cam impact surface 518 of the lift cams 294 may be positioned adjacent to and may engage the flange impact surface 372 of the flange members 296 when the cam shaft 290 is in the fourth rotational position 566*d*. Engagement between the lift cams 294 and the flange impact surfaces 372 may lift or elevate the printhead 138, docking plate 280, printhead holder 282, and push plate 286 such that the printhead 138 occupies a lifted position (i.e., the printhead 138 is moved out of contact or engagement with the platen roller 140). Thus, the nip force may be reduced to zero when the cam shaft 290 is in the fourth rotational position 566*d*. The cam adjustment gear 292 and the sensor flags 558 connected thereto may be imparted with a fourth orientation when the cam shaft 290 is in the fourth rotational position 566*d*, as shown in FIG. 28D.

Figure 29:
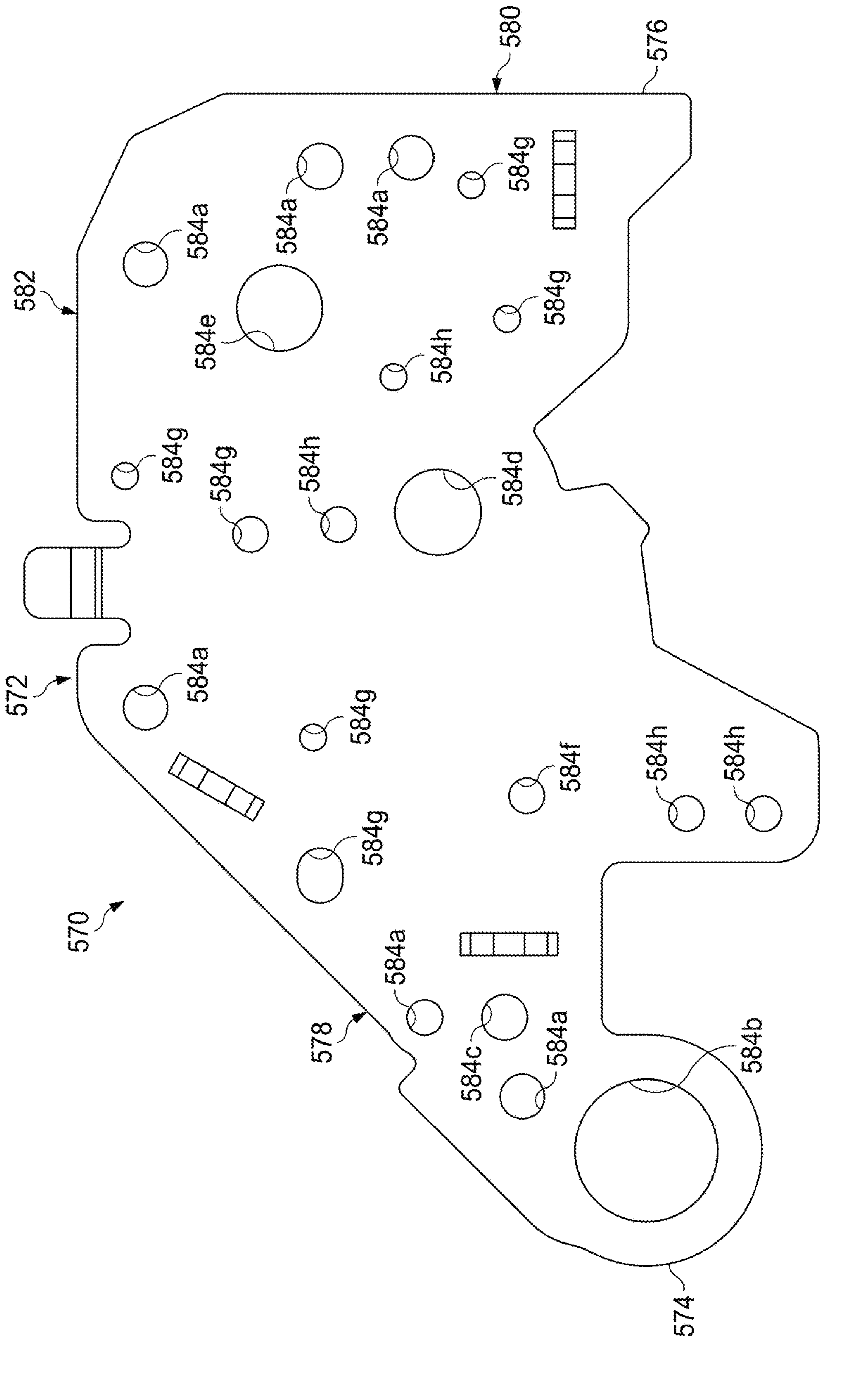
FIG. 29 illustrates a left side elevational view of a side plate of the printhead assembly of FIG. 5.

Turning now to FIG. 29, a side plate 570 may be configured to be coupled to the casing lip 228 of the casing 206 and be oriented parallel with respect to the casing sidewall 238 (see, e.g., FIG. 6) such that the side plate 570 is positioned to support or retain various components of the printhead assembly 200. The side plate 570 may be provided in the form of a substantially planar side plate body 572 defined by a side plate first end 574 and a side plate second end 576 opposing the side plate first end 574. In some instances, the side plate 570 may be designed to mirror the shape of the casing 206 and/or the casing sidewall 238. For example, the side plate 570 may have a side plate slanted edge 578 proximate to the side plate first end 574 (e.g., arranged to align with the slanted portion 220 of the casing 206), a side plate vertical edge 580 proximate to the side plate second end 576 (e.g., arranged to align with the vertical portion 222 of the casing 206), and a side plate upper edge 582 (e.g., arranged to align with the upper panel 224 of the casing 206).

The side plate 570 may include a plurality of side plate holes 584 provided in the form of substantially circular or rounded openings extending entirely through the side plate body 572. The side plate holes 584 may be arranged to receive or support various components of the printhead assembly 200. For example, in some instances, the side plate holes 584 may include one or more side plate mounting holes 584*a*, a side plate support shaft hole 584*b*, a side plate linking shaft hole 584*c*, a side plate lever shaft hole 584*d*, a side plate cam shaft hole 584*e*, a side plate stopper hole 584*f*, one or more side plate sensor holes 584*g*, and one or more side plate pin holes 584*h*. In other instances, the side plate 570 may include any number of side plate holes 584 configured in any suitable arrangement.

In the example of FIG. 29, the side plate mounting holes 584*a* may be arranged to align with the casing mounting members 230 positioned on the casing lip 228 (see FIG. 8), the side plate support shaft hole 584*b* may be arranged to align with the support shaft seat 252 (see FIG. 8) and to receive a portion of the support shaft 590, the side plate linking shaft hole 584*c* may be arranged to align with the first linking shaft openings 356 of the printhead holder 282 (see FIG. 13) and the second linking shaft openings 428 of the push plate 286 (see FIG. 17) and to receive a portion of the linking shaft 430, the side plate lever shaft hole 584*d* may be arranged to align with the casing lever shaft hole 240 (see FIG. 8), the side plate cam shaft hole 584*e* may be arranged to align with the cam shaft seat 256 (see FIG. 8) and receive a portion of the cam shaft 290.

Figure 30:
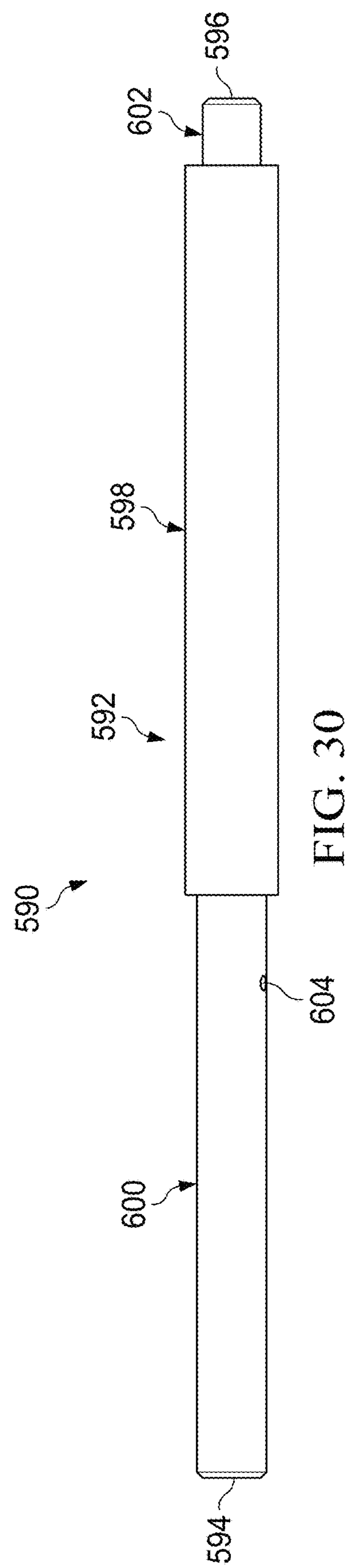
FIG. 30 illustrates a front elevational view of a support shaft of the printhead assembly of FIG. 5.

Turning to FIG. 30, in some instances, a support shaft 590 may support or orient one or more components of the printhead assembly 200 and may facilitate a connection between the printhead module 202 and the casing 206. The support shaft 590 may be provided in the form of a substantially cylindrical support shaft body 592 defined by a support shaft first end 594 and a support shaft second end 596 opposing the support shaft first end 594. The support shaft 590 may include a main body portion 598 proximate to the support shaft second end 596 and a protruding portion 600 positioned between the main body portion 598 and the support shaft first end 594. A stud member 602 may be connected to the main body portion 598 proximate to the support shaft second end 596 and extend outwardly therefrom. A support shaft connection hole 604 provided in the form of a substantially circular opening extending at least partially through the support shaft body 592 may be positioned on the protruding portion 600 proximate to the main body portion 598.

Figure 31:
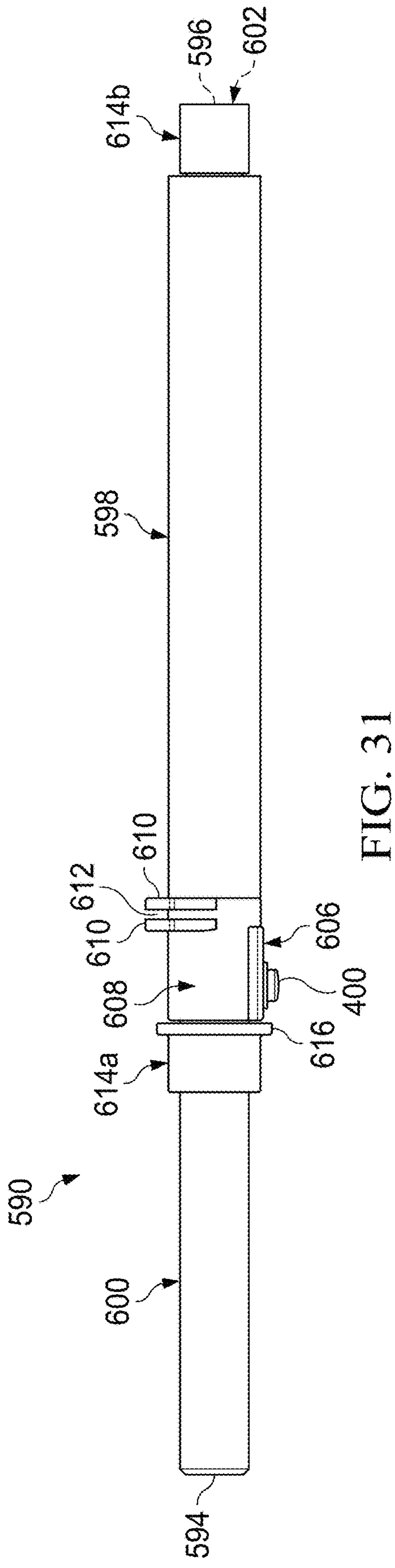
FIG. 31 illustrates a front elevational view of the support shaft of FIG. 30 with an orienting member and bushings positioned thereon.

As shown in FIG. 31, a second orienting member 606 provided in the form of a substantially annular orienting member body 608 may be positioned on the protruding portion 600 adjacent to the main body portion 598 of the support shaft 590 and be coupled thereto. For example, the second orienting member 606 may include an opening (not shown) configured to align with the support shaft connection hole 604. Thus, a fastener 400 may extend through the opening in the second orienting member and be received by the support shaft connection hole 604 (e.g., via a threaded engagement between the fastener 400 and an interior surface of the support shaft connection hole 604), thereby coupling the second orienting member 606 to the support shaft 590.

In some instances, the second orienting member 606 may include two orienting ridges 610 connected to the orienting member body 608 and extending upwardly therefrom. The orienting ridges 610 may be provided in the form of substantially planar protrusions oriented parallel with respect to one another such that an orienting slot 612 is defined therebetween. For example, the orienting slot 612 of the second orienting member 606 may be arranged to receive the orienting surface 362 positioned on the first orienting member 360 of the printhead holder 282 (see FIG. 13). Thus, in some instances, the second orienting member 606 may be configured to maintain a proper positioning and orientation (e.g., with respect to the casing 206) of the printhead 138, docking plate 280, printhead holder 282, and/or push plate 286 when the printhead assembly 200 is in use.

One or more bushings 614 may be positioned along the support shaft 590. In some instances, a first bushing **614*a* may be positioned on the protruding portion 600 adjacent to the second orienting member 606 and a second bushing 614*b* may be positioned on the stud member 602. The first bushing 614*a* may include a bushing lip 616 provided in the form of an annular protrusion extending outwardly from the first bushing 614*a* and positioned proximate to the second orienting member 606. The first bushing 614*a* may be positioned to align with or be received by the side plate support shaft hole 584*b* (see FIG. 29) and facilitate rotation of the support shaft 590 therein while the printhead assembly 200 is in use. The second bushing 614*b* may be positioned to align with or be received within the support shaft seat 252 of the casing 206 (see FIG. 8) and facilitate rotation of the support shaft 590 therein while the printhead assembly 200** is in use.

Figure 32:
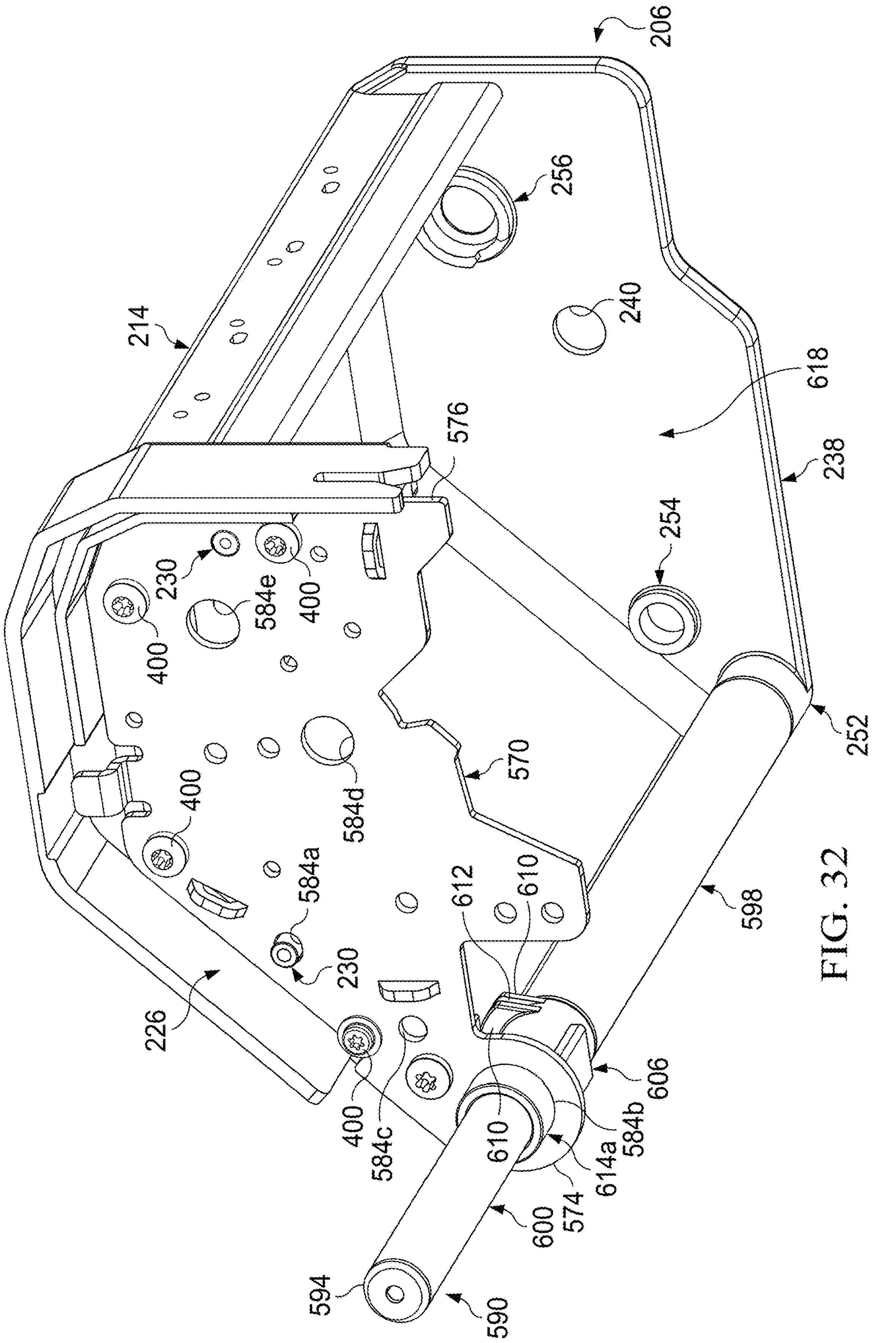
FIG. 32 illustrates a front, bottom, and left side isometric view of the side plate of FIG. 29 and the support shaft of FIG. 30 coupled to the casing of FIG. 6.

Turning to FIG. 32, the side plate 570 may be coupled to the casing 206 to form an enclosure 618 where one or more components of the printhead module 202 may be positioned or retained. For example, fasteners 400 may extend through one or more of the side plate mounting holes **584*a* and be received by adjacent casing mounting members 230, and/or one or more of the side plate mounting holes 584*a* may receive an adjacent casing mounting member 230 (e.g., in a press fit). In some instances, the enclosure 618 may be defined by the side plate 570, the roof 214 of the casing 206, and the casing sidewall 238. As shown, the side plate cam shaft hole 584*e* may align with the cam shaft seat 256 such that the cam shaft 290 may be securely positioned within the enclosure 618. The side plate linking shaft hole 584*c* may align with the linking shaft seat 254 such that the linking shaft 430 may be securely positioned within the enclosure 618. For example, the linking shaft second end 436 may be received by the linking shaft seat 254 and the notched segment 438 at the linking shaft first end 434 may extend beyond the side plate 570 via the side plate linking shaft hole 584*c*. The side plate lever shaft hole 584*d* may align with the casing lever shaft hole 240**.

The support shaft 590 may extend through the side plate support shaft hole **584*b* such that the stud member 602 at the support shaft second end 596 is received by the support shaft seat 252, the main body portion 598 is positioned within or adjacent to the enclosure 618, and the protruding portion 600 extends beyond the side plate 570. The second orienting member 606 may be positioned within the enclosure 618 adjacent to the side plate first end 574 (e.g., in a rear corner of the enclosure 618) such that the orienting ridges 610 (see FIG. 31) extend toward the roof 214 and are available to receive the first orienting member 360 (see FIG. 13) within the orienting slot 612**.

The first bushing **614*a* may surround the portion of the support shaft 590 received by the side plate support shaft hole 584*b* and facilitate rotation of the support shaft 590 therein. In some instances, the bushing lip 616 may engage the side plate 570 and prevent the first bushing 614*a* from tracking along the support shaft 590 (e.g., sliding out of the side plate support shaft hole 584*b*). The second bushing 614*b* may surround the portion of the support shaft 590 received by the support shaft seat 252 (e.g., the stud member 602) and facilitate rotation of the support shaft 590** therein.

Figure 33:
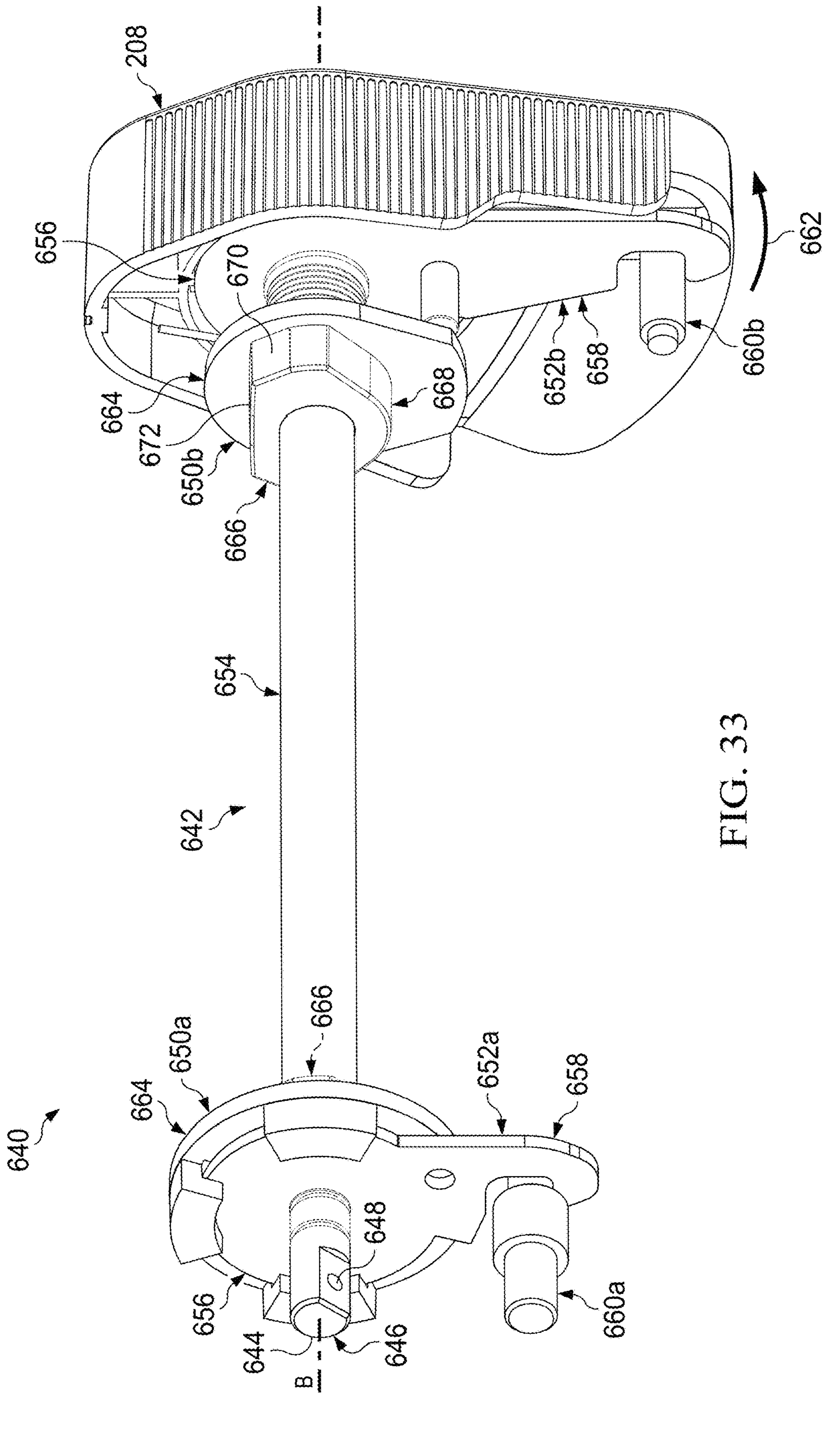
FIG. 33 illustrates a front and left side isometric view of a lever subassembly of the printhead assembly of FIG. 5.

Turning to FIG. 33, a lever subassembly 640 may be at least partially disposed within the enclosure 618 and may be operably engaged by the lever 208. In some instances, the lever subassembly 640 may be operable to open the printhead module 202 (e.g., to provide access to one or more internal components thereof for cleaning, maintenance, or other purposes). The lever subassembly 640 may include a lever shaft 642 with a lever shaft first end 644 and a lever shaft second end (not shown) received by or positioned adjacent to the lever 208. A lever shaft notched region 646 may be positioned at the lever shaft first end 644. A lever shaft connection hole 648 provided in the form of a substantially circular opening extending at least partially through the lever shaft notched region 646 may be positioned proximate to the lever shaft first end 644.

A lift member 650 and a lock member 652 may be positioned proximate to each of the opposing ends of the lever shaft 642. For example, a first lift member **650*a* and a first lock member 652*a* may be positioned proximate to the lever shaft first end 644, and a second lift member 650*b* and a second lock member 652*b* may be positioned proximate to the lever 208. A lever shaft main body portion 654 may extend between the first and second lift members 650*a*, 650*b*. In some instances, opposing ends of the main body portion 654 may be received by lever shaft openings 358 of the printhead holder 282 (see FIG. 13) when the printhead assembly 200 is assembled. The lever 208, lever shaft 642, first lift member 650***a*, second lift member 650*b*, first lock member 652*a*, and second lock member 652*b* may rotate about an axis B.

The first and second lock members 652*a*, 652*b* may each include a lock body 656 and a hook member 658 connected to the lock body 656 and extending downwardly therefrom. For example, the hook members 658 may engage an associated locking pin 660 when the lever subassembly 640 is in the default position (depicted in FIGS. 33 and 34). The locking pins 660 may be coupled to or formed integrally with an internal component of a printing device (e.g., the printer 100) such that locking pins 660 occupy a fixed position therein. Thus, engagement between the hook members 658 and the locking pins 660 may prevent the lever subassembly 640 from moving away from the locking pins 660 (e.g., maintaining the printhead module 202 in a closed configuration).

The lever subassembly 640 (e.g., including the lever shaft 642, first and second lift members 650*a*, 650*b*, and first and second lock members 652*a*, 652*b*) may be configured to rotate in unison. Additionally, the lever 208 may engage the second lock member 652*b* and/or the lever shaft second end such that rotation of the lever 208 may be transmitted to the lever subassembly 640. In some instances, a user may disengage the hook members 658 from the locking pins 660 by rotating the lever 208 in the direction of an arrow 662 when the lever subassembly 640 is in the default position such that the hook members 658 of the first and second lock members 652*a*, 652*b* rotate away from and disengage the locking pins 660. In this way, the lever subassembly 640 may become movable (e.g., permitting the printhead module 202 to be converted from the closed configuration to an open configuration).

Figure 34:
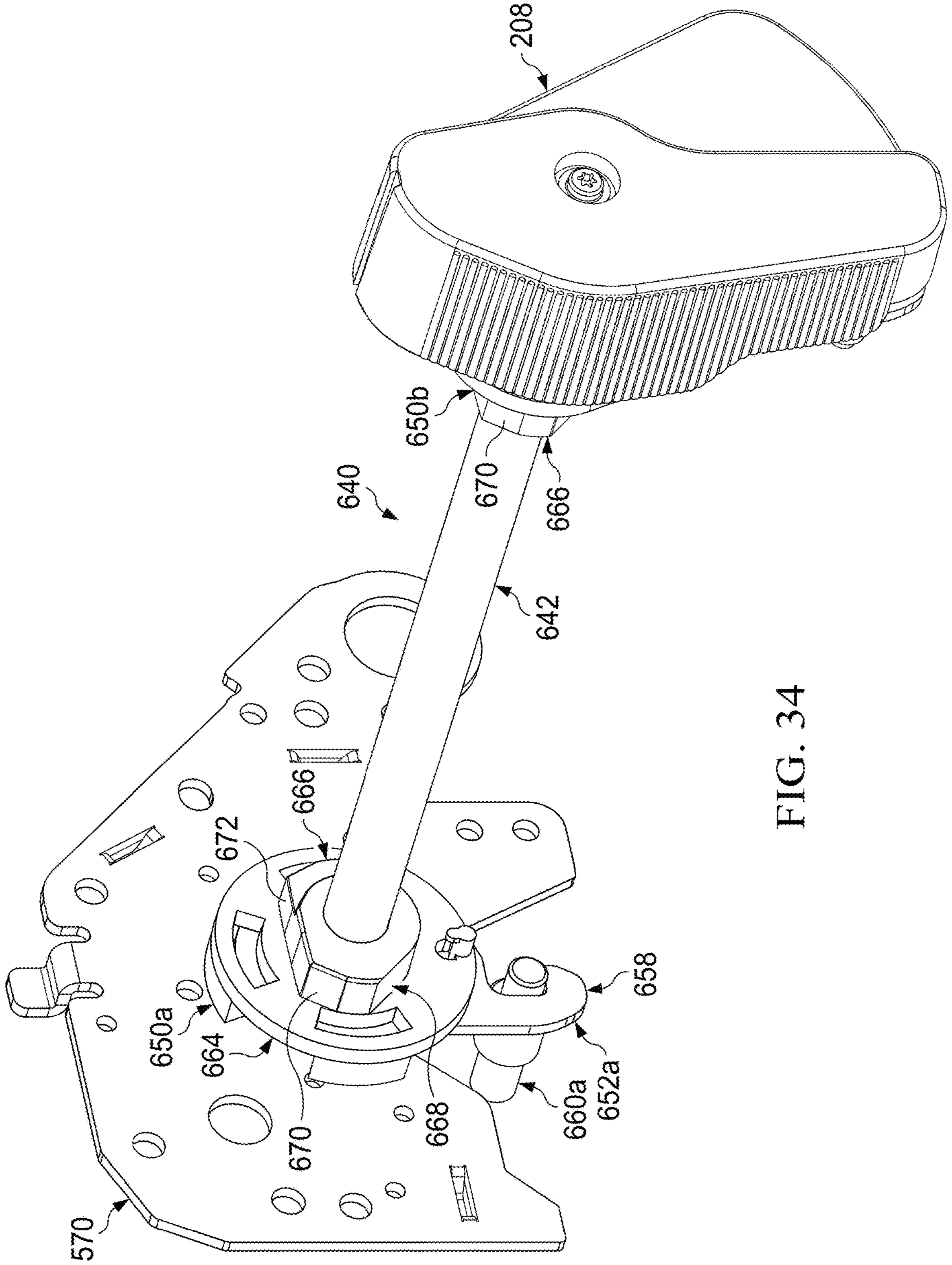
FIG. 34 illustrates a front and right side isometric view of the lever subassembly of FIG. 33.

As shown in FIGS. 33 and 34, the first and second lift member 650*a*, 650*b* may each include a lift member body 664 and a lever cam 666 connected to the lift member body 664 and extending inwardly therefrom (e.g., the lever cam 666 of the first lift member 650*a* may extend away from the lift member body 664 in the direction of the second lift member 650*b*, and vice versa). The lever cams 666 may each include a lever cam exterior surface 668 with a lever cam impact surface 670 and a lever cam idle surface 672 each disposed along the lever cam exterior surface 668. In some instances, the lever cam impact surface 670 may be arranged to protrude from the lever shaft 642 by a greater distance than the lever cam idle surface 672.

Figure 35:
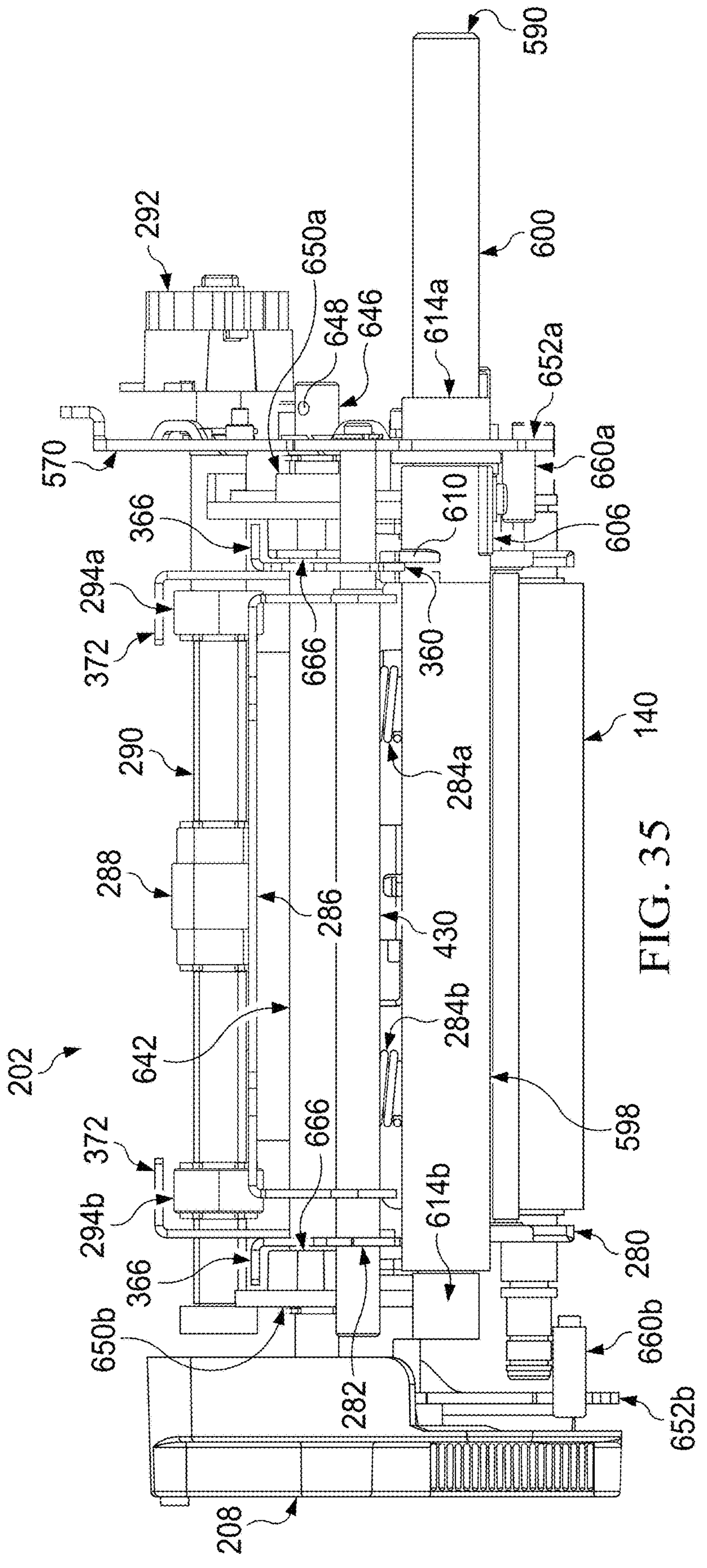
FIG. 35 illustrates a rear elevational view of a partial assembly of the printhead assembly of FIG. 5 including the printhead module of FIG. 9 and the lever subassembly of FIG. 34.

Turning to FIG. 35, the lever cams 666 may be positioned adjacent to (e.g., beneath) the lever impact surfaces 366 of the printhead holder 282 with the lever cam idle surface 672 positioned adjacent to (but not engaging) the adjacent lever impact surface 366. Thus, when the lever subassembly 640 is rotated in the direction of the arrow 662 shown in FIG. 33, the lever cams 666 may rotate into engagement with lever impact surfaces 366 such that the lever cam impact surfaces 670 impact and elevate the printhead holder 282. The linking shaft 430 may connect or couple the printhead holder 282 and the push plate 286 as described above with reference to FIG. 18, and the printhead holder 282 may be coupled to the docking plate 280 (and thus to the printhead 138) as described above with reference to FIG. 15. Thus, when the lever cams 666 engage the lever impact surfaces 366, the printhead 138, docking plate 280, printhead holder 282, push plate 286, and/or other components of the printhead module 202 connected thereto may be elevated as a unit (e.g., away from the platen roller 140). In this way, the lever cams 666 may be configured to move the printhead 138 from the lowered position (e.g., in contact with the platen roller 140) to the lifted position (e.g., retained at a distance from the platen roller 140) when a user engages the lever 208 to open the printhead module 202. In some instances, moving the printhead 138 to the lifted position may mitigate or reduce a resistance applied by the printhead module 202, thereby reducing the force required for a user to transition the printhead module 202 between the open and closed configurations using the lever 208 and the lever subassembly 640.

Figure 36:
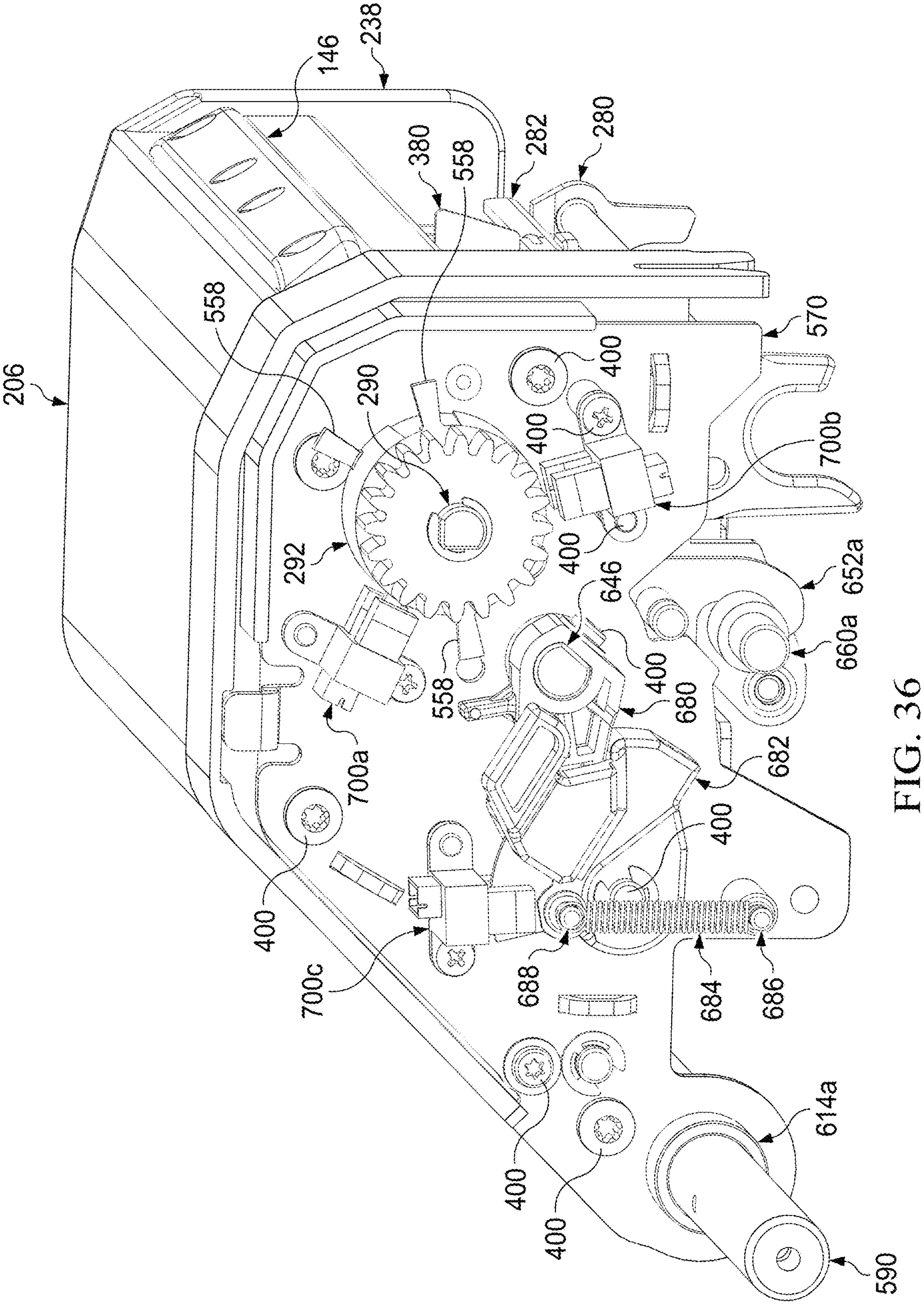
FIG. 36 illustrates a front, top, and left side isometric view of the partial assembly of FIG. 35 coupled to the casing of FIG. 6 and sensors coupled to the side plate of FIG. 29.

As shown in FIG. 35, the lever shaft notched region 646 may extend beyond the side plate 570 when the printhead module 202 is assembled. Turning to FIG. 36, in some instances, the printhead assembly 200 may include a lever shaft appendage 680 coupled to the lever shaft notched region 646 and a stopper 682 rotatably connected to the side plate 570 and arranged to receive and be engaged by the lever shaft appendage 680. In some instances, a fastener 400 may extend through a hole (not shown) in the lever shaft appendage 680 and be received by the lever shaft connection hole 648 (see FIGS. 33 and 35), and another fastener 400 may extend through a hole (not shown) in the stopper 682 and be received by the side plate stopper hole 584*f* (see FIG. 29). Thus, the lever shaft appendage 680 may be configured to rotate in unison with the lever subassembly 640 (e.g., counterclockwise from the perspective of FIG. 36). The stopper 682 may receive and be engaged by a portion of the lever shaft appendage 680 such that the stopper 682 rotates (e.g., clockwise from the perspective of FIG. 36) in response to rotation of the lever shaft appendage 680.

In some instances, a stopper spring 684 may extend between a fixed spring pin 686 connected to the side plate 570 and a stopper pin 688 connected to the stopper 682. For example, the stopper spring 684 may be configured to move into or occupy an expanded state while connected to the spring pin 686 and stopper pin 688 such that the stopper spring 684 applies a downward force to the stopper 682 (e.g., biasing the stopper 682 toward rotation away from the lever shaft appendage 680, or counterclockwise from the perspective of FIG. 36). In this way, the stopper spring 684 may apply a return force to the stopper 682 when the stopper 682 rotates in response to engagement by the lever shaft appendage 680.

In some instances, the stopper spring 684 may apply a preload tension to the lever subassembly 640 that biases the lever subassembly 640 toward the default position (see FIGS. 33 and 34). Thus, the stopper spring 684 may reduce or eliminate the likelihood that the lever subassembly 640 will rotate out of the default position unintentionally while the printhead assembly 200 is in use. Additionally, in some instances, the preload tension applied by the stopper spring 684 may require a user to overcome a resistance when rotating the lever 208 in the direction of the arrow 662 to disengage the hook members 658 from the locking pins 660 (see FIG. 33).

Referring still to FIG. 36, the printhead assembly 200 may include one or more sensors 700 positioned to detect the state or position of one or more components of the printhead assembly 200. The sensors 700 may be coupled to the side plate 570 by fasteners 400 received by the side plate sensor holes 584*g*. In some instances, the printhead assembly 200 may include a first cam shaft sensor 700*a* and a second cam shaft sensor 700*b* positioned proximate to the cam adjustment gear 292 (e.g., positioned adjacent to different locations along the hub exterior surface 556 of the cam adjustment gear 292). The first cam shaft sensor 700*a* may be arranged to abut or be adjacent to the side plate 570, whereas the second cam shaft sensor 700*b* may be offset or retained at a distance from the side plate 570 by one or more sensor pins 702. Thus, the first cam shaft sensor 700*a* may be positioned to detect the sensor flags 558 connected to the hub second end 544 (see FIG. 26) and the second cam shaft sensor 700*b* may be positioned to detect the sensor flags 558 connected to the hub first end 542, as described below with reference to FIGS. 37 and 38.

In some instances, the printhead assembly may include a stopper sensor 700*c* positioned proximate to the stopper 682. The stopper sensor 700*c* may be provided in the same form as the cam shaft sensors 700*a*, 700*b* and may be positioned to detect a portion of the stopper 682, as described below with reference to FIGS. 37 and 38. For example, the stopper sensor 700*c* may be configured to detect when the printhead module 202 transitions between the open configuration and the closed configuration.

Figure 37:
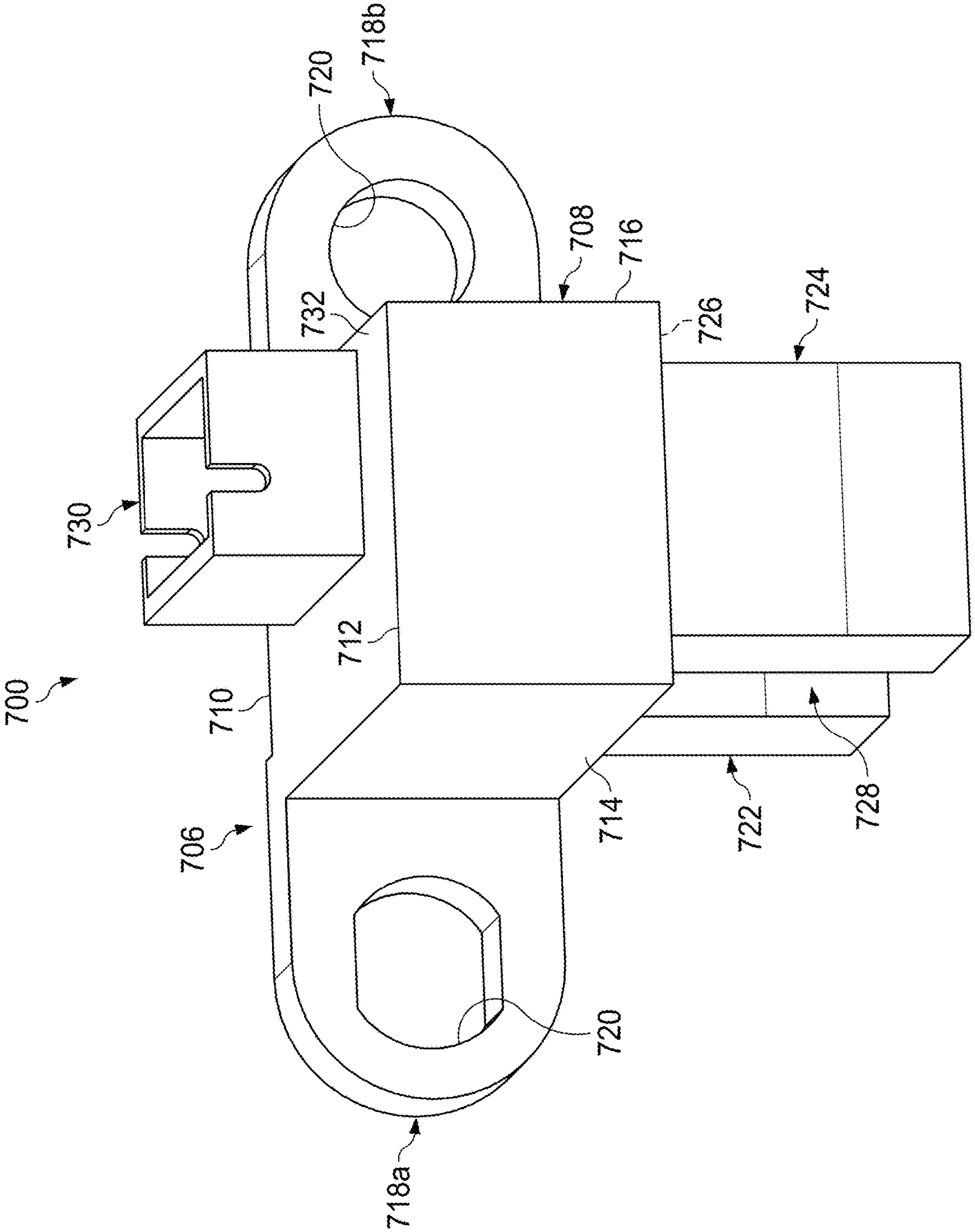
FIG. 37 illustrates a front, top, and left side isometric view of the sensor of FIG. 36.

Turning now to FIG. 37, the sensors 700 may each be provided in the form of a substantially rectilinear sensor body 706 including a rectangular sensor base member 708 defined by a sensor first end 710, a sensor second end 712 opposing the sensor first end 710, a sensor first side 714 extending between the sensor first end 710 and the sensor second end 712, and a sensor second side 716 extending between the sensor first end 710 and the sensor second end 712 and opposite the sensor first side 714. In other instances, the sensor body 706 and/or the sensor base member 708 may be imparted with a rounded shape or any other suitable shape.

The sensor 700 may include a first wing 718*a* and a second wing 718*b* configured to facilitate attachment between the sensor 700 and the side plate 570. The first and second wings 718*a*, 718*b* may be formed integrally with the sensor base member 708 or may be coupled thereto. The first wing 718*a* may be connected to the sensor base member 708 proximate to the junction between the sensor first end 710 and the sensor first side 714 and extend outwardly therefrom. The second wing 718*b* may be connected to the sensor base member 708 proximate to the junction between the sensor first end 710 and the sensor second side 716 and extend outwardly therefrom. The first and second wings 718*a*, 718*b* may each include a sensor connection hole 720 configured to align with the side plate sensor holes 584*g* and facilitate coupling the sensor 700 to the side plate 570 (e.g., via a press fit, snap fit, threaded engagement, or other mechanism known in the art).

Figure 38:
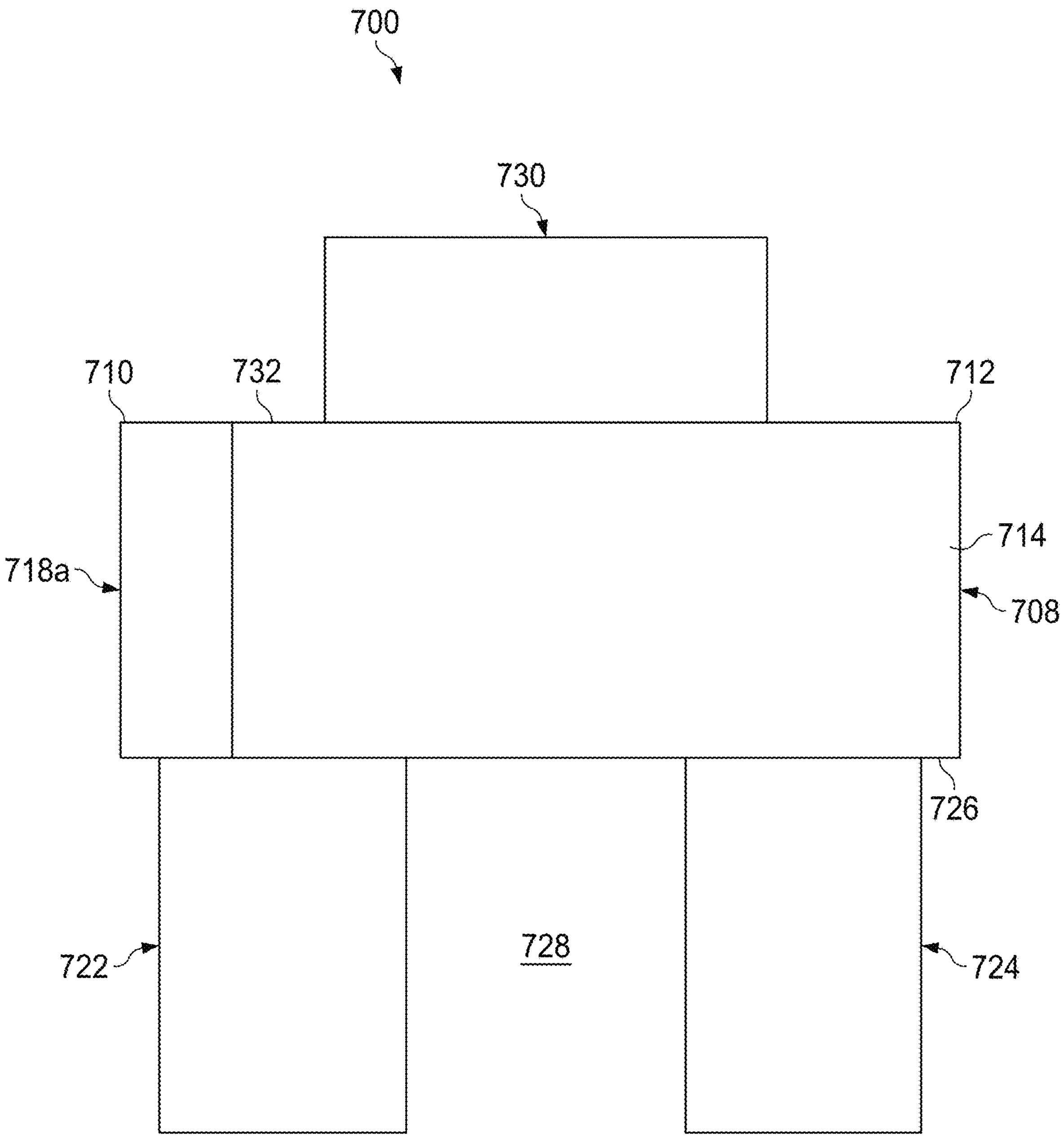
FIG. 38 illustrates a left side elevational view of the sensor of FIG. 36.

As best shown in FIG. 38, the sensor 700 may include a first sensor leg 722 and a second sensor leg 724 connected to a bottom side 726 of the sensor base member 708 and extending downwardly therefrom. The first sensor leg 722 may be provided in the form of a substantially rectangular protrusion positioned proximate to the sensor first end 710, and the second sensor leg 724 may be provided in the form of a substantially rectangular protrusion positioned proximate to the sensor second end 712. The first and second sensor legs 722, 724 may be oriented parallel with respect to one another such that an opening or passageway 728 is positioned between the first sensor leg 722 and the second sensor leg 724. Additionally, in some instances, the sensor 700 may include a port 730 provided in the form of a substantially rectilinear protrusion connected to a top side 732 of the sensor base member 708 and extending upwardly therefrom. For example, the port 730 may be a mating portion of the sensor 700 configured to receive a connector (not shown) such that the sensor 700 may be in communication with the controller 213 (see FIG. 5) or other electronic component of a printing device (e.g., the printer 100).

In some instances, the sensor 700 may be provided in the form of an optical sensor (e.g., a photointerrupter). For example, one of the first and second sensor legs 722, 724 may be equipped with an emitter (not shown) configured to emit a light beam across the passageway 728. The other of the first and second sensor legs 722, 724 may be equipped with a receiver (not shown) positioned opposite the emitter and configured to receive the light beam. Thus, the sensor 700 may at any given moment occupy or detect either a blocked state or an unblocked state. If the light beam from the emitter is able to traverse the passageway 728 and reach the receiver, the sensor 700 may generate a signal indicating that the sensor 700 is in the unblocked state. If the light beam from the emitter is prevented from traversing the passageway 728 and reaching the receiver, the sensor 700 may generate a signal indicating that the sensor 700 is in the blocked state.

Thus, with reference to FIG. 36, the first cam shaft sensor 700*a* and the second cam shaft sensor 700*b* may be positioned on the side plate 570 such that the sensor flags 558 move through the passageways 728 as the cam adjustment gear 292 rotates. Depending on the positioning of the sensor flags 558, the first cam shaft sensor 700*a* may occupy or detect the blocked state at one or more points along the rotational path of the cam adjustment gear 292, and the second cam shaft sensor 700*b* may occupy or detect the blocked state at one or more points along the rotational path of the cam adjustment gear 292. For example, FIG. 36 depicts a configuration where the cam shaft 290 is in the first rotational position and the cam adjustment gear 292 and sensor flags 558 are imparted with the first orientation, as described above with reference to FIG. 28A. In some instances, the first cam shaft sensor 700*a* is in the blocked state (i.e., one of the sensor flags 558 connected to the hub second end 544 is positioned in the passageway 728), and the second cam shaft sensor 700*b* is in the unblocked state when the cam shaft 290 is in the first rotational position.

In this way, the first cam shaft sensor 700*a* and the second cam shaft sensor 700*b* may together form a system capable of generating multiple unique signals indicative of multiple rotational positions of the cam shaft 290 corresponding to multiple settings of the printhead assembly 200 (e.g., the first, second, and third nip force settings and the printhead lift setting described above with reference to FIGS. 28A-28D).

In some instances, the first and second cam shaft sensors 700*a*, 700*b* may be configured to generate (i) a first signal when the first cam shaft sensor 700*a* is in or detects the blocked state and the second cam shaft sensor 700*b* is in or detects the unblocked state, (ii) a second signal when the first cam shaft sensor 700*a* is in or detects the unblocked state and the second cam shaft sensor 700*b* is in or detects the blocked state, (iii) a third signal when both the first cam shaft sensor 700*a* and the second cam shaft sensor 700*b* are in or detect the blocked state, and (iv) a fourth signal when both the first cam shaft sensor 700*a* and the second cam shaft sensor 700*b* are in or detect the unblocked state. The sensor flags 558 may be positioned on the cam adjustment gear 292 such that each of the first, second, third, and fourth signals correspond to any one of the first, second, third, and fourth rotational positions 566*a*, 566*b*, 566*c*, 566*d* of the cam shaft 290, as described in detail above with reference to FIGS. 28A-28D (e.g., the first signal may correspond to the first rotational position 566*a* of the cam shaft 290, the second signal may correspond to the second rotational position 566*b* of the cam shaft 290, the third signal may correspond to the third rotational position 566*c* of the cam shaft 290, and the fourth signal may correspond to the fourth rotational position 566*d* of the cam shaft 290, or any combination thereof). Thus, the controller 213 (see FIG. 5) or other electronic component of a printing device (e.g., the printer 100) may be configured to monitor the rotational position of the cam shaft 290 by receiving and interpreting the signals generated by the first and second cam shaft sensors 700*a*, 700*b*.

In other instances, any number of sensors 700 and any number of sensor flags 558 may be configured to generate any number of signals indicative of distinct rotational positions of the cam shaft 290 corresponding to a desired number of nip force, lift, or other settings of the printhead 138 and/or other components of the printhead assembly 200.

Figure 39:
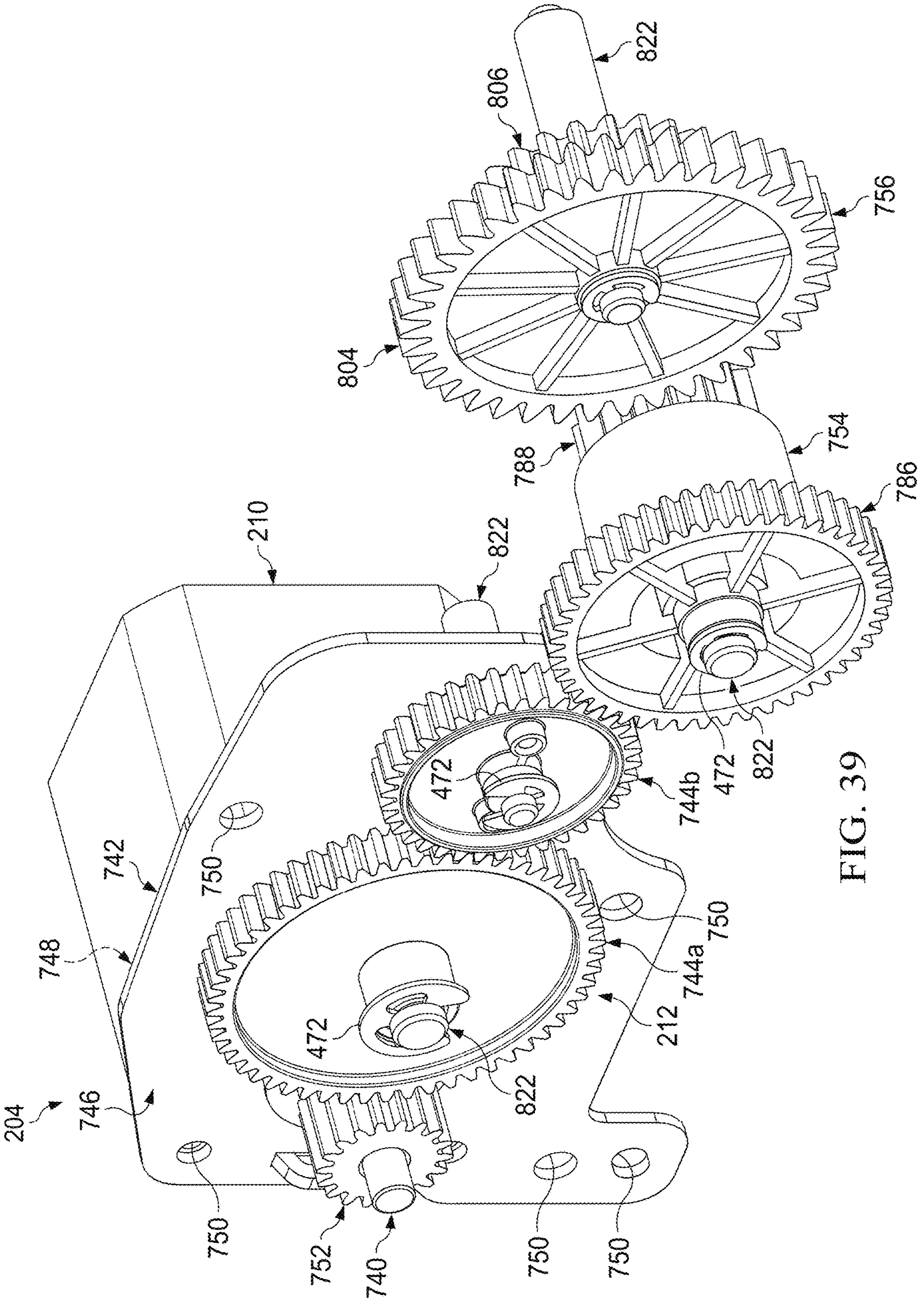
FIG. 39 illustrates a front, top, and left side isometric view of a gear subassembly of the printhead assembly of FIG. 5.
Figure 47:
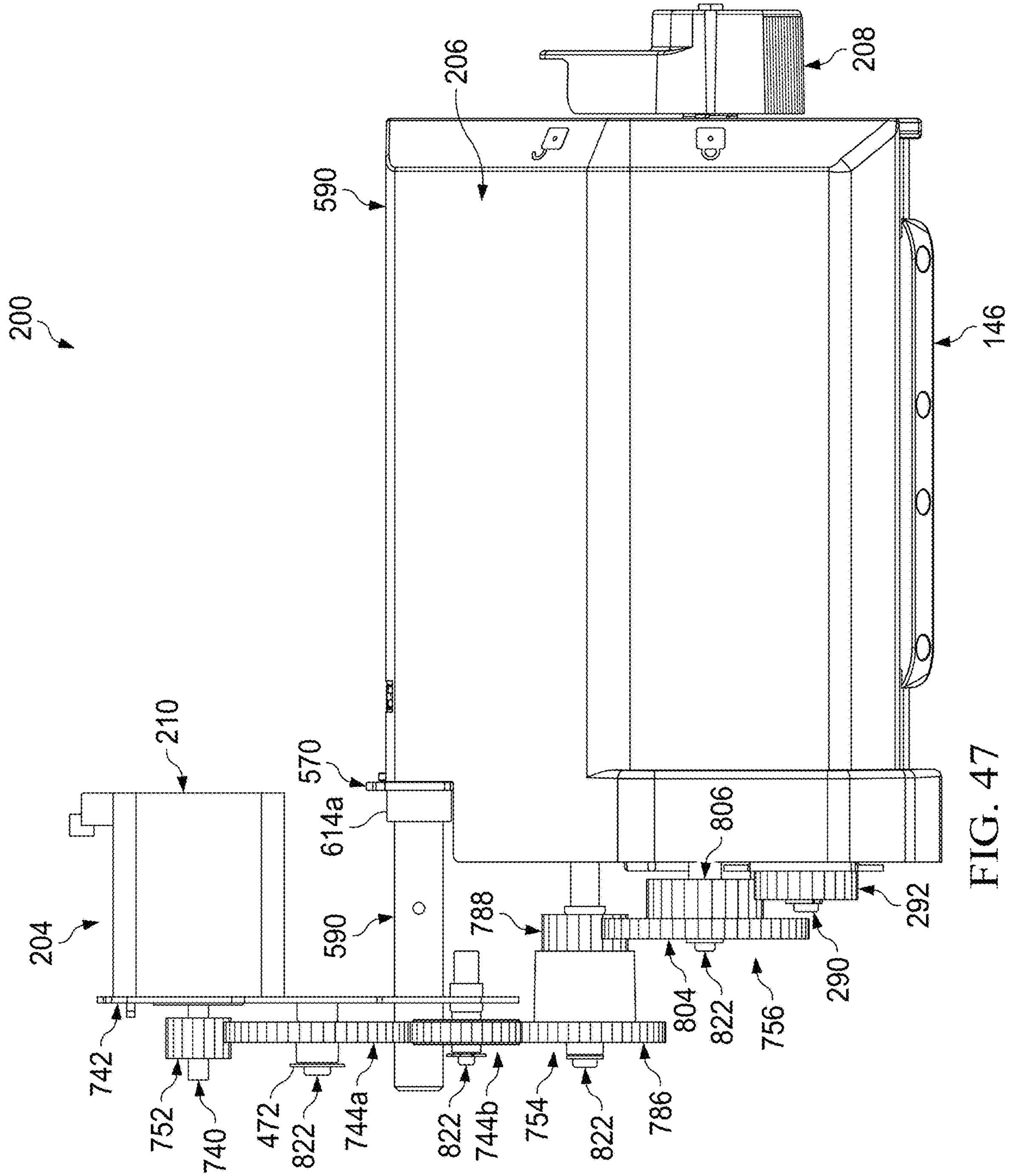
FIG. 47 illustrates a top plan view of the printhead assembly of FIG. 5.

Turning to FIG. 39, the gear subassembly 204 may operably engage the printhead module 202 via a gear train 212 in communication with (e.g., configured to generate rotational motion of) the cam adjustment gear 292 (see FIG. 47). The controller 213 (see FIG. 5) receiving signals generated by the sensors 700 may be in communication with the gear subassembly 204 (e.g., via an electronic connection with the driver 210) and may thus be capable of selecting a desired rotational position of the cam shaft 290 by operating the gear train 212.

In some instances, the driver 210 (e.g., an electric motor, DC motor, stepper motor, or any other suitable device known in the art to generate rotational motion) may be connected to an output shaft 740 extending outwardly therefrom. The driver 210 may be connected to an external power source (not shown) such that the driver 210 is configured to generate rotational motion of the output shaft 740. The gear subassembly 204 may include a gear plate 742 configured to support one or more gear train members 744 of the gear train 212. The gear plate 742 may be provided in the form of a substantially rectilinear panel defined by a gear surface 746 and a driver surface 748 and may include a plurality of gear plate holes 750 provided in the form of substantially circular openings extending between the gear surface 746 and the driver surface 748. The driver 210 may be positioned adjacent to the driver surface 748 such that the output shaft 740 extends through one of the gear plate holes 750 and extends beyond the gear surface 746. A pinion gear 752 may be positioned on the output shaft 740 adjacent to the gear plate 742 and configured to rotate in unison with the output shaft 740 (e.g., due to a press fit or friction fit between the pinion gear 752 and the output shaft 740).

The gear train members 744 may be configured to transmit the rotational motion of the pinion gear 752 to the cam adjustment gear 292. In some instances, the gear train members 744 may be in direct communication with the cam adjustment gear 292. In other instances, the gear train members 744 may transmit rotational motion to the cam adjustment gear 292 via one or more intermediary gears.

For example, in some instances, a first gear train member 744*a* and a second gear train member 744*b* may transmit rotational motion to the cam adjustment gear 292 via a first compound gear 754 and a second compound gear 756. The pinion gear 752 may engage the first gear train member 744*a*, the first gear train member 744*a* may engage the second gear train member 744*b*, the second gear train member 744*b* may engage the first compound gear 754, the first compound gear 754 may engage the second compound gear 756, and the second compound gear 756 may engage the cam adjustment gear 292 (see FIG. 47). In other instances, any number of gear train members 744 may be in indirect communication with the cam adjustment gear 292 via any number of intermediary gears.

Figure 40:
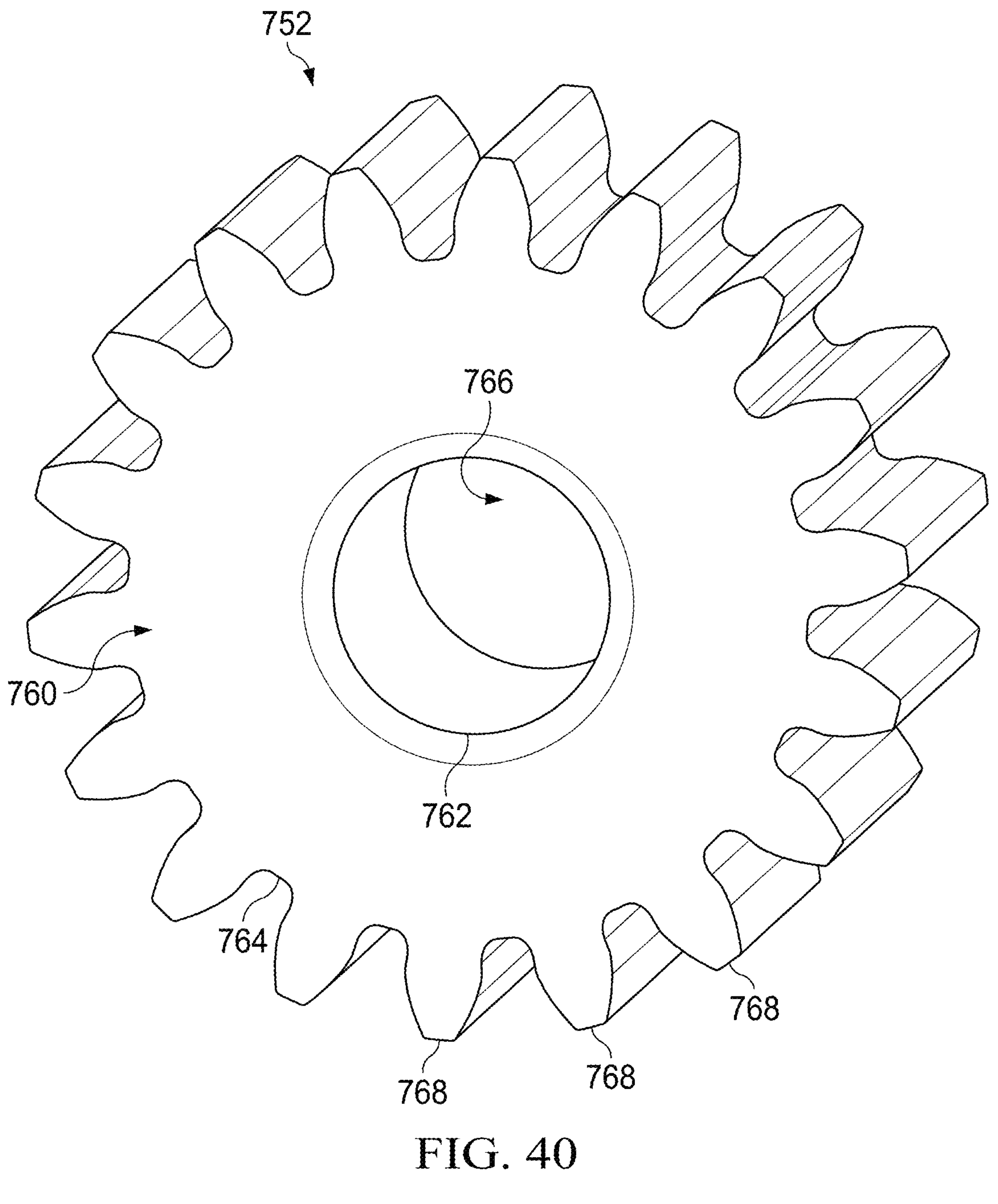
FIG. 40 illustrates a front and right side isometric view of a pinion gear of the gear subassembly of FIG. 39.

Turning to FIG. 40, the pinion gear 752 may be defined by a substantially annular pinion gear body 760 defined by a pinion gear inner core 762 and a pinion gear outer core 764. The pinion gear inner core 762 may define a substantially circular pinion gear opening 766 extending entirely through the pinion gear body 760 (e.g., configured to receive the output shaft 740). A plurality of pinion gear teeth 768 may be evenly radially spaced apart from one another along the pinion gear outer core 764 and extend outwardly therefrom.

Figure 41:
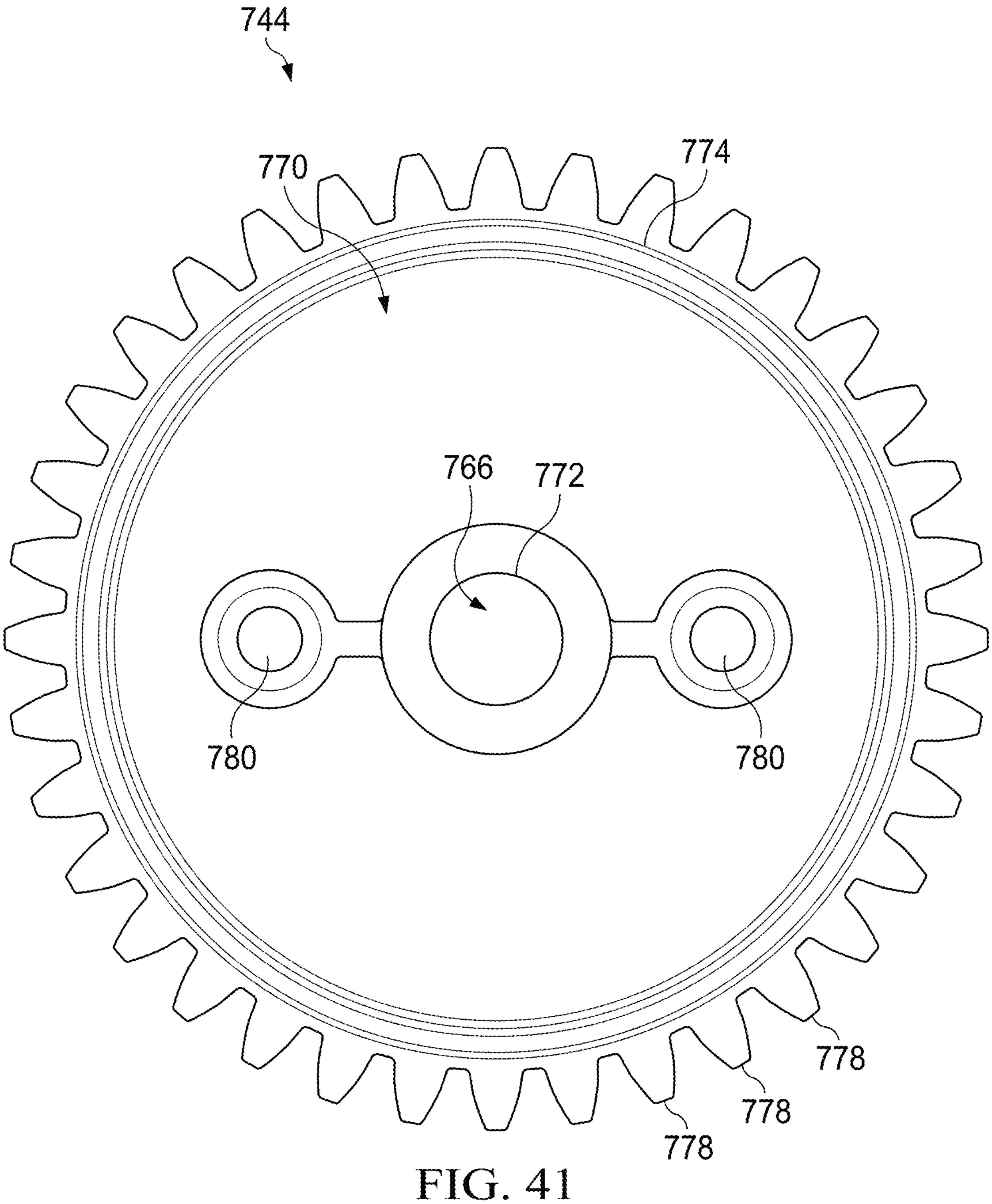
FIG. 41 illustrates a front and right side isometric view of a gear train member of the gear subassembly of FIG. 39.

Turning to FIG. 41, the gear train member 744 may be provided in the form of a substantially annular gear train member body 770 defined by a gear train member inner core 772 and a gear train member outer core 774. The gear train member inner core 772 may define a substantially circular gear train member opening 776 extending entirely through the gear train member body 770. A plurality of gear train member teeth 778 may be evenly radially spaced apart from one another along the gear train member outer core 774 and extend outwardly therefrom. In some instances, one or more gear train member cutouts 780 may be provided in the form of openings extending entirely through the gear train member body 770 (e.g., to reduce the weight or cost of manufacturing the gear train member 744). In other instances, the gear train member cutouts 780 may be omitted.

Figure 42:
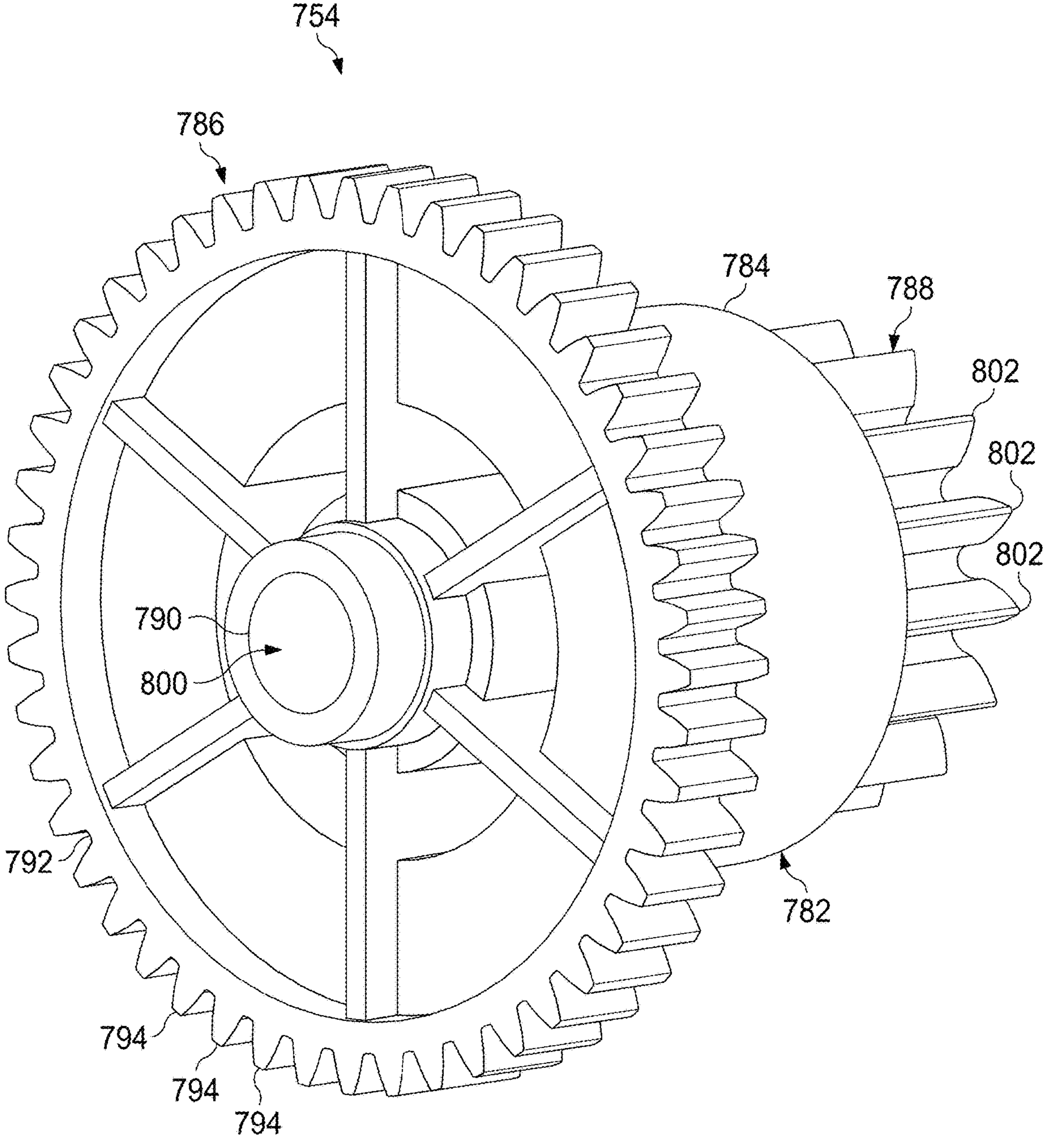
FIG. 42 illustrates a front, top, and right side isometric view of a first compound gear of the gear subassembly of FIG. 39.

Turning to FIG. 42, the first compound gear 754 may be provided in the form of a substantially annular compound gear body 782 defined by a compound gear body first side (not shown) and a compound gear body second side 784 opposing the compound gear body first side. A first front gear member 786 may be connected to the compound gear body 782 at the compound gear body first side, and a first rear gear member 788 may be connected to the compound gear body 782 at the compound gear body second side 784. The first front gear member 786 may be defined by first front gear inner core 790 and a first front gear outer core 792. A plurality of first front gear teeth 794 may be evenly radially spaced apart from one another along the first front gear outer core 792 and extend outwardly therefrom.

Figure 43:
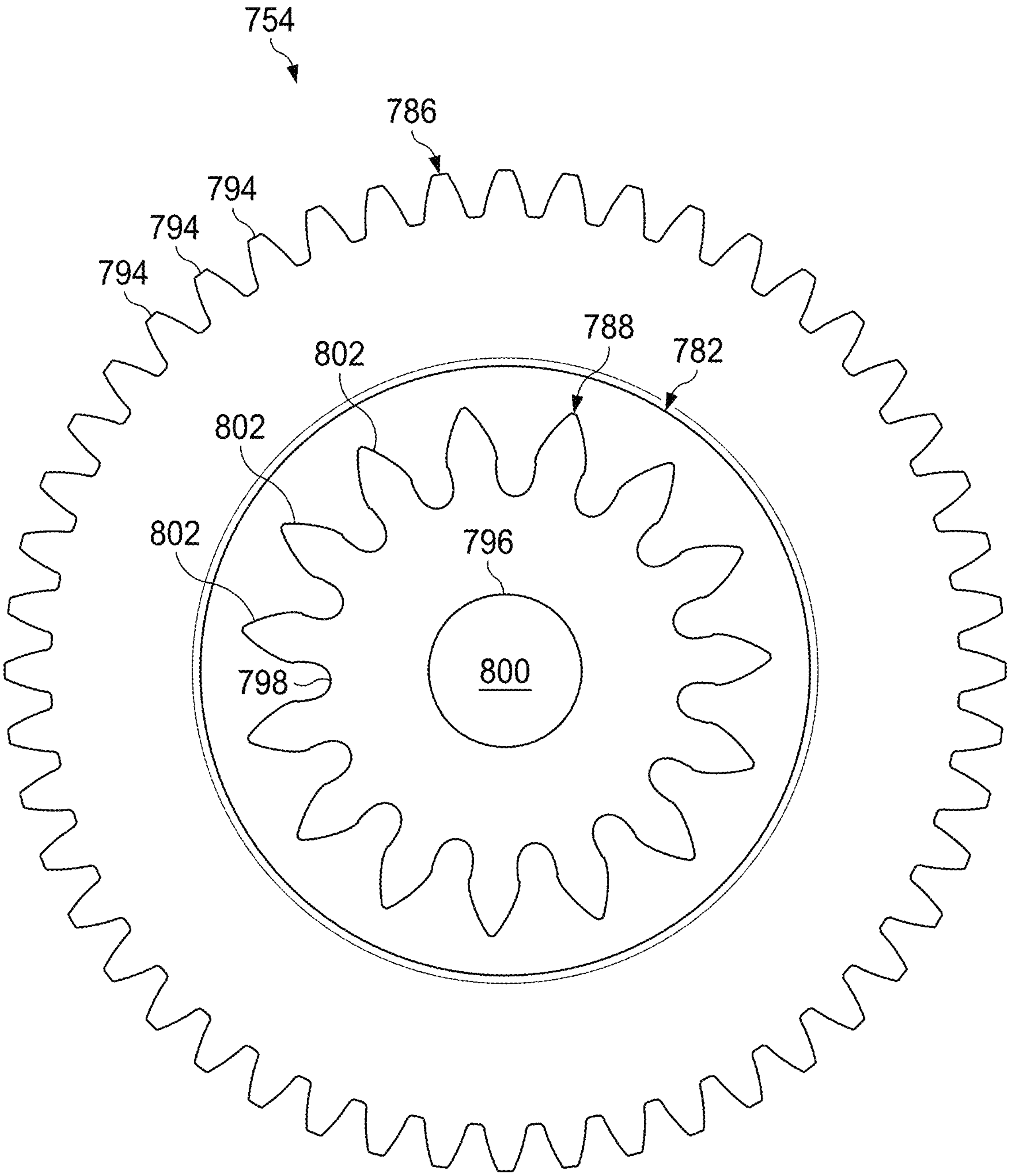
FIG. 43 illustrates a rear elevational view of the first compound gear of FIG. 42.

As best shown in FIG. 43, the first rear gear member 788 may be defined by a first rear gear inner core 796 and a first rear gear outer core 798. The first rear gear inner core 796 may align with the first front gear inner core 790 and define a first compound gear opening 800 extending entirely through the first compound gear 754. A plurality of first rear gear teeth 802 may be evenly radially spaced apart from one another along the first rear gear outer core 798 and extend outwardly therefrom.

Figure 44:
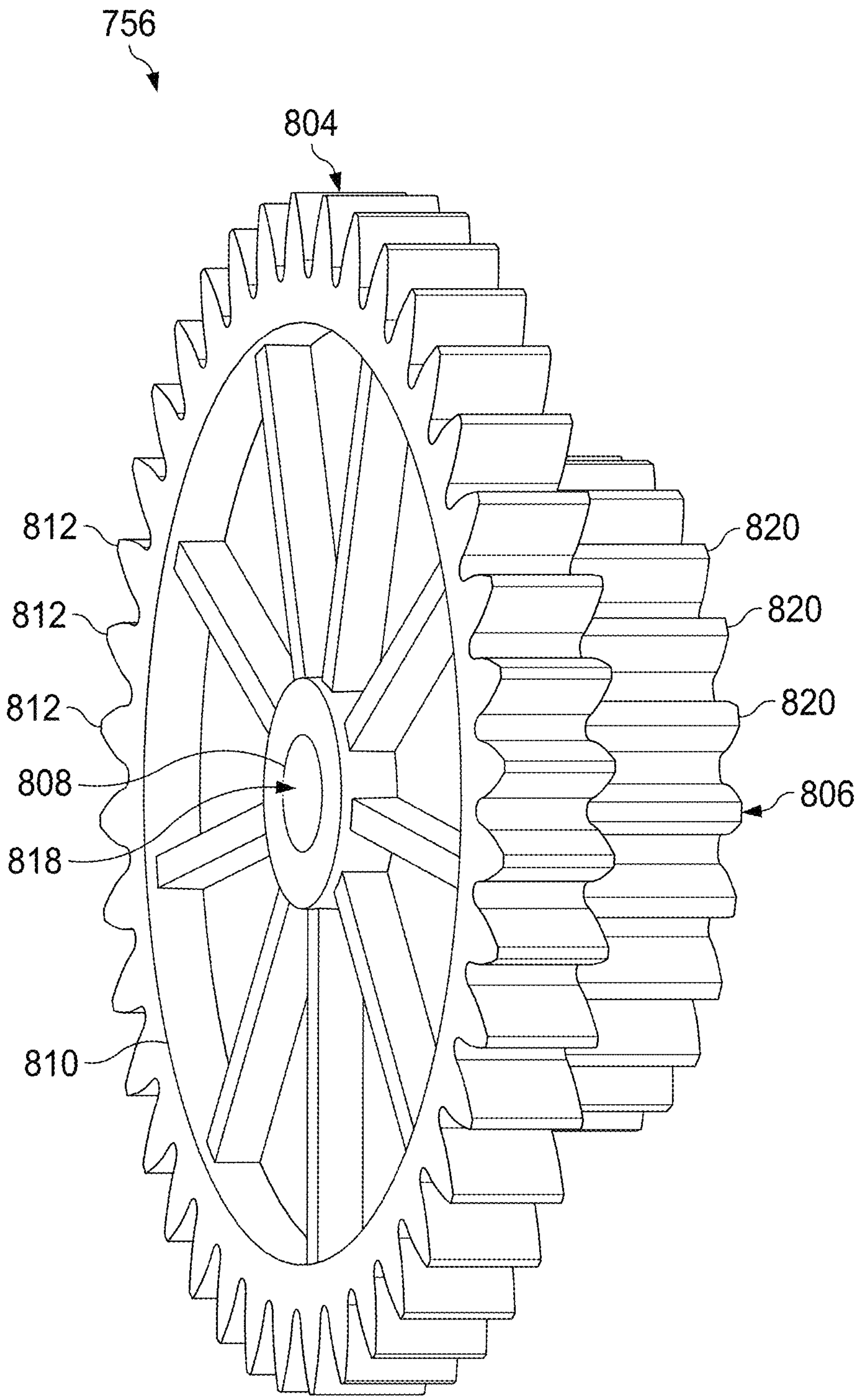
FIG. 44 illustrates a front and right side isometric view of a second compound gear of the gear subassembly of FIG. 39.

Turning to FIG. 44, the second compound gear 756 may be provided in the form of a second front gear member 804 and a second rear gear member 806 connected to the second front gear member 804 and extending outwardly therefrom. The second front gear member 804 may be defined by a second front gear inner core 808 and a second front gear outer core 810. A plurality of second front gear teeth 812 may be evenly radially spaced apart from one another along the second front gear outer core 810 and extend outwardly therefrom.

Figure 45:
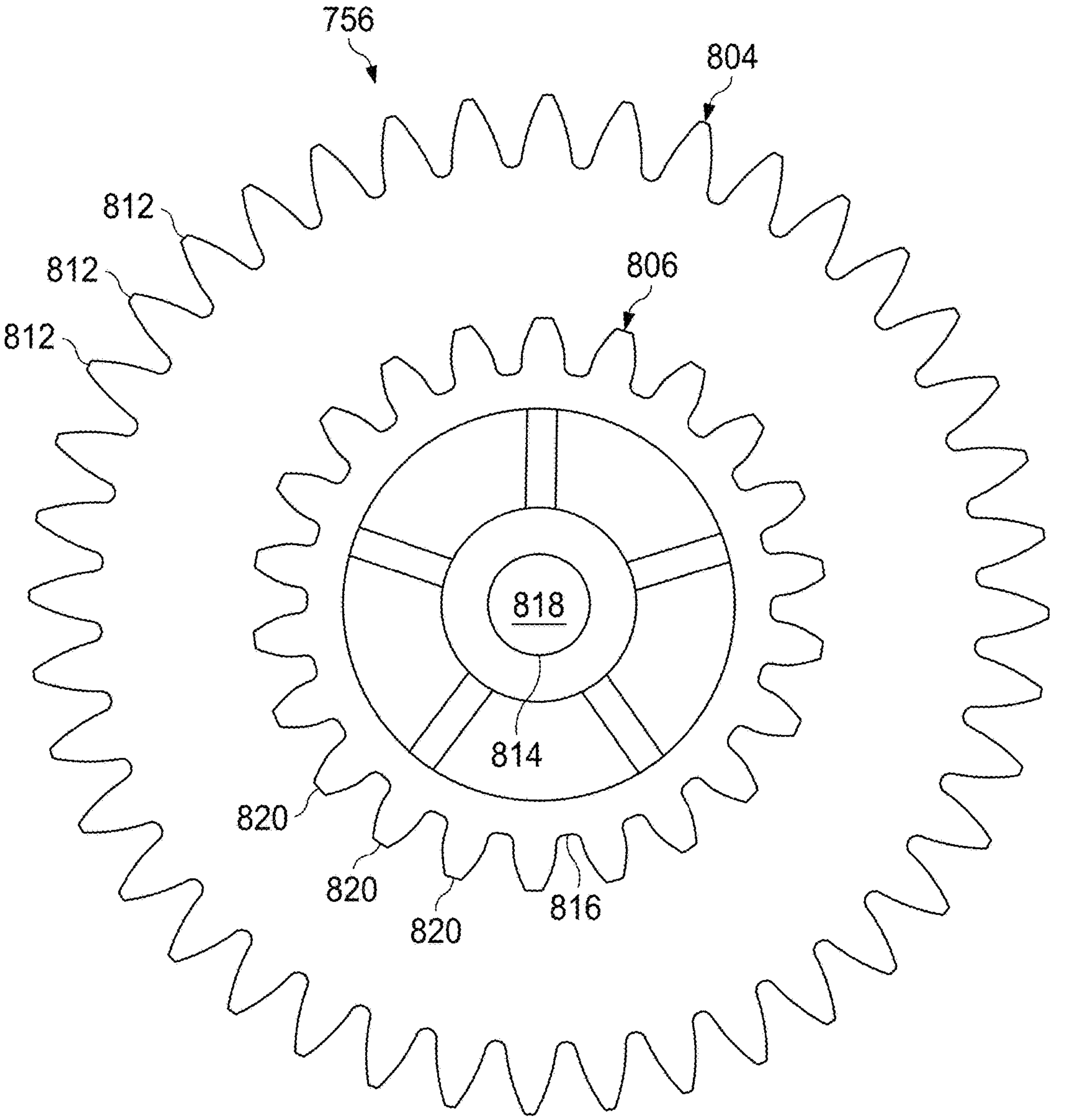
FIG. 45 illustrates a rear elevational view of the second compound gear of FIG. 44.

As best shown in FIG. 45, the second rear gear member 806 may be defined by a second rear gear inner core 814 and a second rear gear outer core 816. The second rear gear inner core 814 may align with the second front gear inner core 808 and define a second compound gear opening 818 extending entirely through the second compound gear 756. A plurality of second rear gear teeth 820 may be evenly radially spaced apart from one another along the second rear gear outer core 816 and extend outwardly therefrom.

Figure 46:
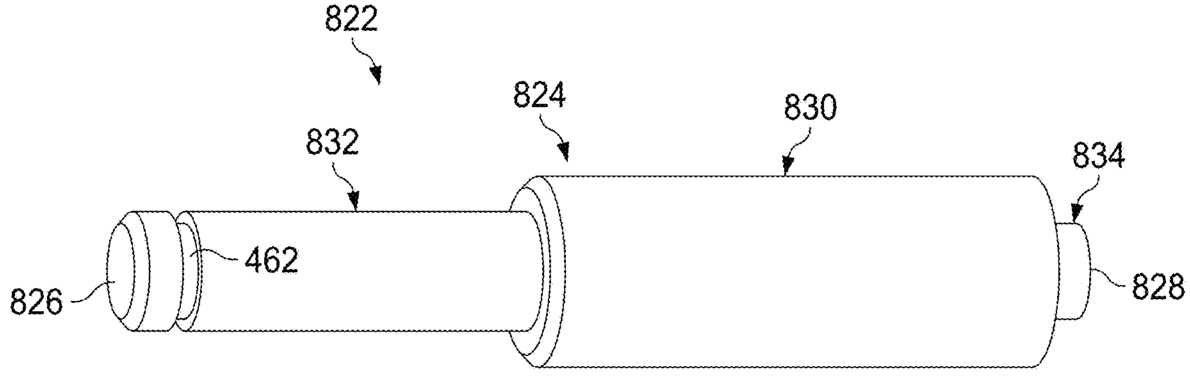
FIG. 46 illustrates a side elevational view of a pin member of the gear subassembly of FIG. 39.

Turning to FIG. 46, one or more gear pins 822 may be provided to facilitate attaching the gear train members 744 to the gear plate 742 and/or attaching intermediate gears (e.g., the first compound gear 754 and the second compound gear 756) to the side plate 570 (see FIG. 32). The gear pin 822 may be provided in the form of a substantially cylindrical gear pin body 824 defined by a gear pin first end 826 and a gear pin second end 828 opposing the gear pin first end 826.

In some instances, the gear pin 822 may include a center segment 830, a gear mounting member 832 extending between the gear pin first end 826 and the center segment 830, and an attachment member 834 extending between the center segment 830 and the gear pin second end 828. A washer groove 462 may be positioned along the gear mounting member 832 proximate to the gear pin first end 826 (e.g., to receive a washer 472 arranged to prevent the associated gear from tracking along the gear pin 822 as shown in FIG. 39). In other instances, the gear pin 822 may be provided in any suitable form provided that the gear pin first end 826 is configured to receive one of the gear train members 744 and/or intermediate gears and the gear pin second end 828 is configured to be received (e.g., in a press fit or a friction fit) by one of the gear plate holes 750 (see FIG. 39) or one of the side plate pin holes 584*h* (see FIG. 29).

As shown in FIG. 47, the gear pins 822 may couple the gear train members 744*a*, 744*b*, the first compound gear 754, and the second compound gear 756 to the gear plate 742 or the side plate 570 (not shown). In some instances, one or more of the gear train members 744 and/or the intermediate gears (e.g., the first compound gear 754 and the second compound gear 756) may be coupled to a stationary component of the printing device (e.g., the printer 100). In some instances, the second gear train member 744*b* may engage the first front gear member 786, the first rear gear member 788 may engage the second front gear member 804, and the second rear gear member 806 may engage the cam adjustment gear 292. Thus, the driver 210 may rotate the cam adjustment gear 292 by rotating the output shaft 740.

Turning to FIGS. 48-51, in some instances, a printing device (e.g., the printer 100) may be configured to automatically detect a desired setting (e.g., an optimum nip force) upon installation of a particular type of printable media 128 on the media holder 126 (see FIG. 2). The printing device may then operate the gear subassembly 204 to rotate the cam shaft 290 to a position associated with the desired setting, as described above with reference to FIG. 39.

Figure 48:
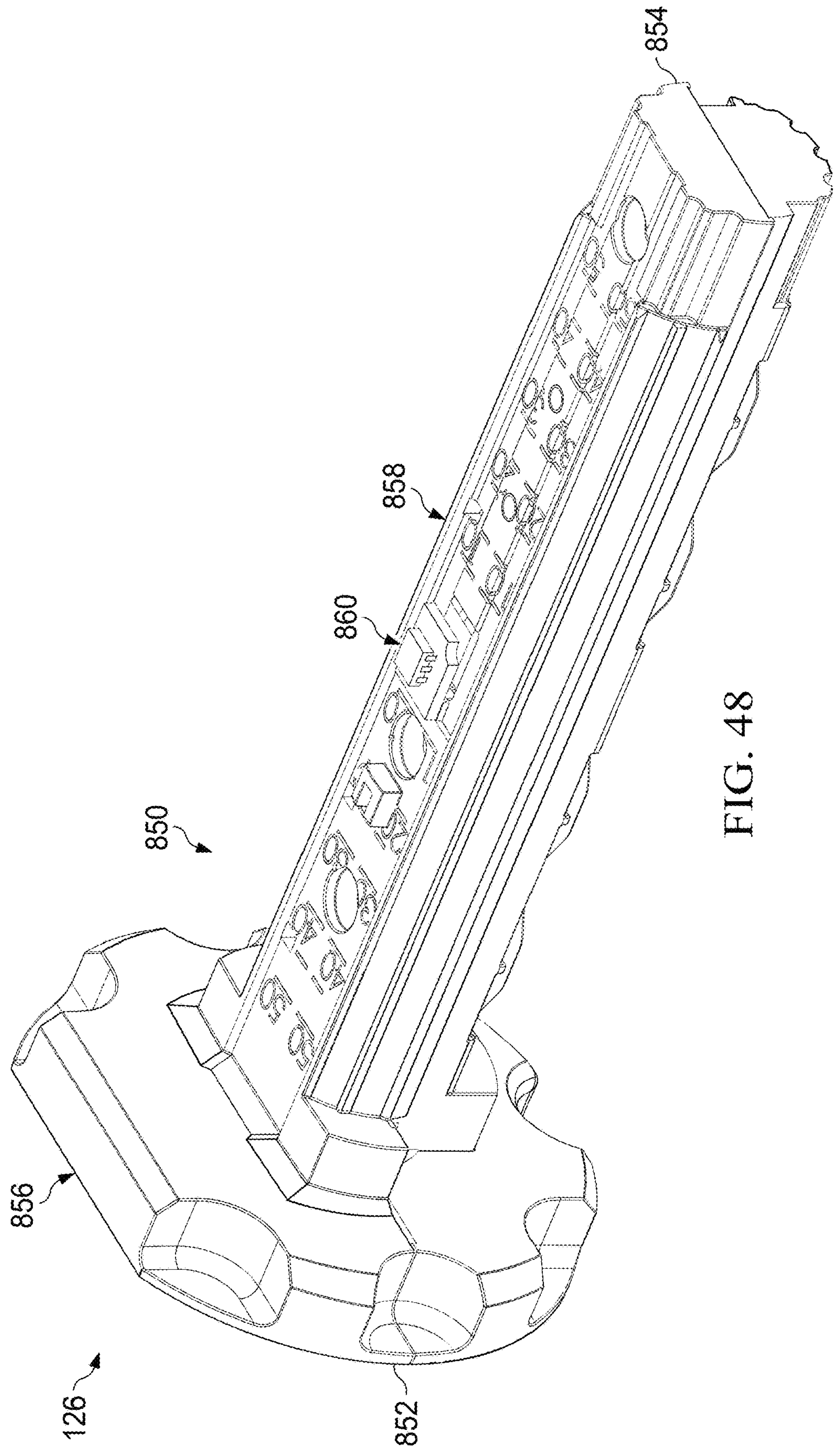
FIG. 48 illustrates a front, top, and left side isometric view of a media holder of the printer of FIGS. 1 and 2.

As shown in FIG. 48, the media holder 126 may be provided in the form of a substantially tubular media holder body 850 defined by a media holder first end 852 and a media holder second end 854 opposing the media holder first end 852. The media holder 126 may include an end wall 856 positioned at the media holder first end 852 and a media holder arm 858 connected to the end wall and extending outwardly therefrom. A reader 860 capable of distinguishing between different types of printable media 128 when they are installed on the media holder 126 may be positioned on the media holder arm 858. For example, the reader 860 may be provided in the form of a radio-frequency identification (RFID) reader, near field communication (NFC) reader, or any other suitable sensing or scanning device known in the art. At least a portion of the reader 860 may be flush with or emerge beyond the media holder arm 858 such that it is available for contact or engagement with a portion of a roll of printable media 128 installed on the media holder arm 858.

Figure 49:
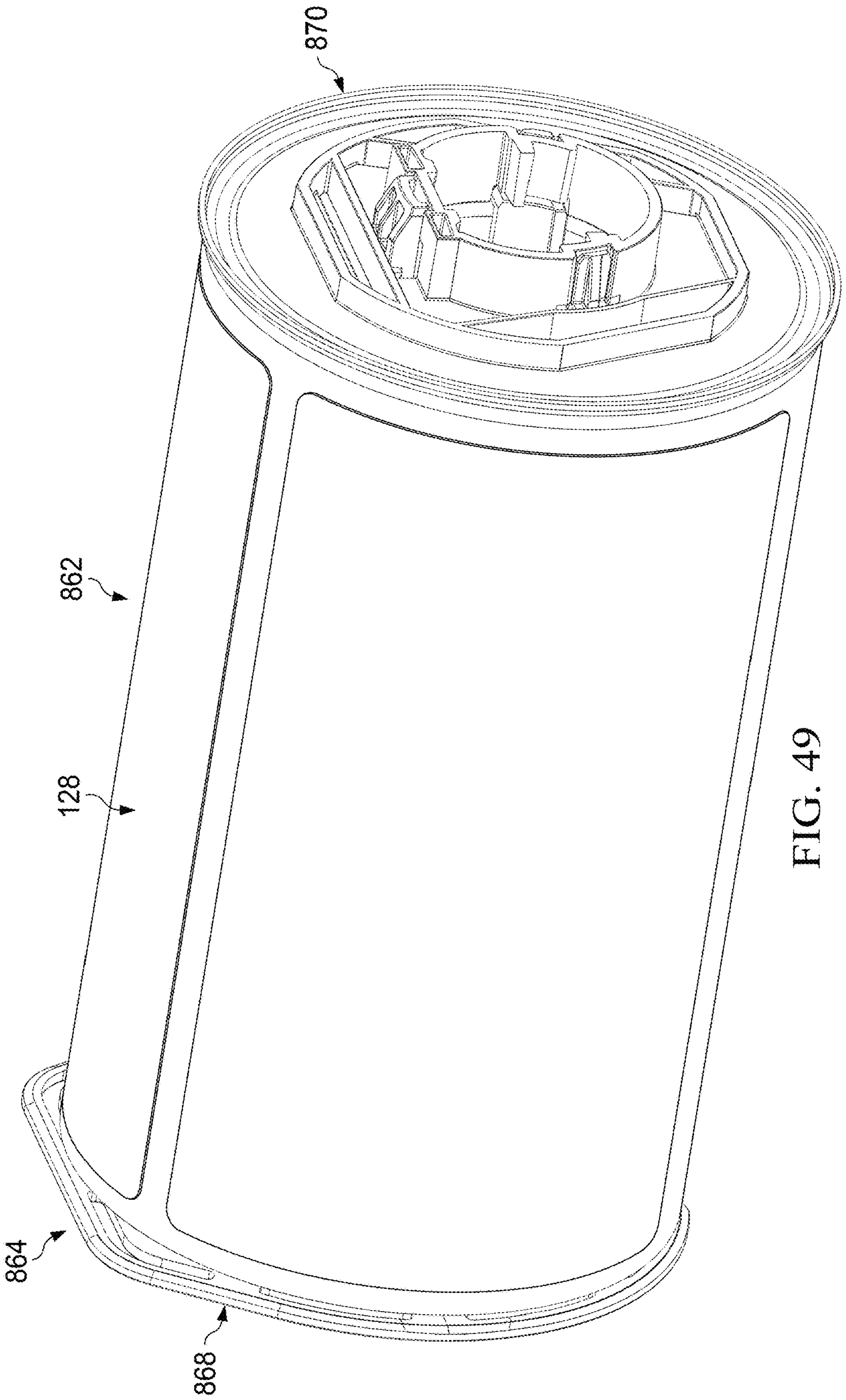
FIG. 49 illustrates a front, top, and left side isometric view of a media roll and a media cartridge for use with the printer of FIGS. 1 and 2.
Figure 50:
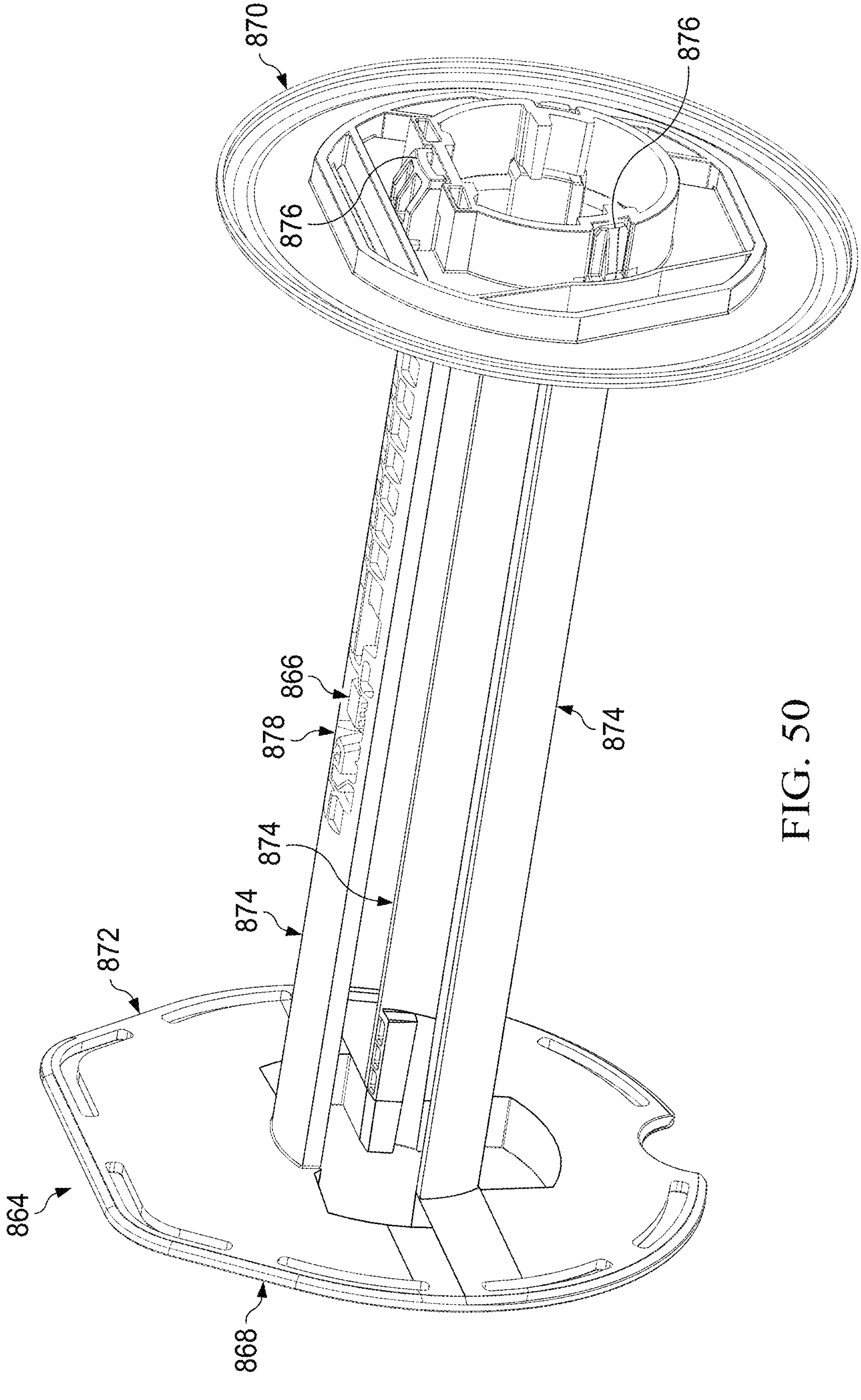
FIG. 50 illustrates a front, top, and left side isometric view of the media cartridge of FIG. 49.

Turning to FIG. 49, a media roll 862 provided in the form of a supply of printable media 128 wound about a core (not shown) may be provided for use with the printer 100. The media roll 862 may be installed on a media cartridge 864 designed for use with the media holder 126. For example, as shown in FIG. 50, the media cartridge 864 may have a smart cell 866 arranged to be positioned adjacent to or to contact the reader 860 when the media roll 862 is installed. The media cartridge 864 may be provided in the form of a cartridge body portion 868 and an end cap 870. In some instances, the cartridge body portion 868 may be provided in the form of a substantially circular cartridge flange 872 and three cartridge arms 874 connected to the cartridge flange 872 and extending outwardly therefrom. A distal end 876 of each cartridge arm 874 may engage the end cap 870 and couple the cartridge body portion 868 thereto.

The smart cell 866 may be positioned in a smart cell bay 878 provided in the form of an opening positioned along one of the cartridge arms 874 and extending entirely therethrough. The smart cell 866 and smart cell bay 878 may be arranged such that the reader 860 contacts or engages an adjacent surface of the smart cell 866 when the media roll 862 and media cartridge 864 are installed on the media holder 126. The smart cell 866 may transmit a signal to the reader 860 indicating the type of printable media 128 contained in the media roll 862. For example, the smart cell 866 may be provided in the form of an RFID chip, NFC chip, or any other electronic tag or chip capable of transmitting a signal to the reader 860.

In some instances, the reader 860 may be in communication with controller 213 (see FIG. 5) or another electronic component within a printing device (e.g., the printer 100), and the controller 213 may in turn be in communication with the driver 210 of the gear subassembly 204 and the sensors 700. Thus, the controller 213 may determine the desired rotational position of the cam shaft 290 based on the signal received from the reader 860 and may operate the driver 210 to rotate the cam adjustment gear 292 until the cam shaft sensors 700*a*, 700*b* indicate that the desired position of the cam shaft 290 has been reached. For example, in some instances, the controller 213 may determine a desired nip force setting based on the type of printable media 128 installed on the media holder 126 and may place the cam shaft 290 in the rotational position corresponding to the desired nip force.

Figure 51:
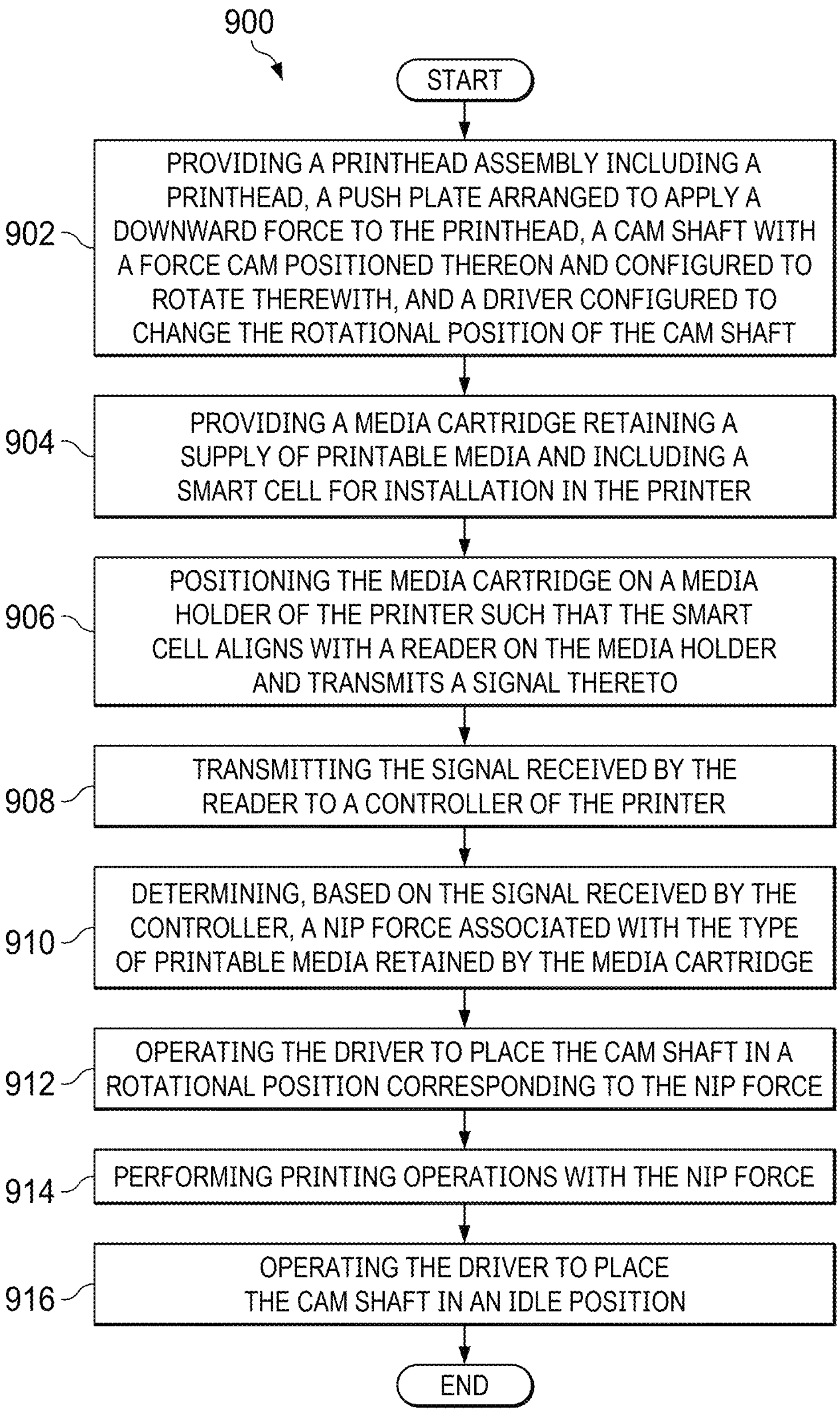
FIG. 51 is a flow chart illustrating a method of adjusting a nip force setting of a printhead in a printer according to the principles of the present disclosure.

FIG. 51 illustrates a method 900 of adjusting a nip force setting of a printhead in a printer (e.g., printer 100) according to the principles of the present disclosure.

At a step 902, a printhead assembly (e.g., printhead assembly 200) is provided. In some instances, the printhead assembly includes a printhead (e.g., printhead module 202) positioned to contact a platen roller (e.g., platen roller 140) of the printer, a push plate (e.g., push plate 286) arranged to impart a downward force to the printhead the strength of which depends on the position of the push plate relative to the printhead, a cam shaft (e.g., cam shaft 290) with a force cam (e.g., force cam 288) positioned thereon and configured to rotate therewith, and a driver (e.g., driver 210) configured to change the rotational position of the cam shaft via one or more gears (e.g., cam adjustment gear 292, gear subassembly 204). In some instances, the force cam is configured to alter the position of the push plate relative to the printhead depending on the rotational position of the cam shaft.

At a step 904, a media cartridge (e.g., media cartridge 864) retaining a supply of printable media (e.g., printable media 128) and including a smart cell (e.g., smart cell 866) is provided for installation in the printer.

At a step 906, the media cartridge is positioned on a media holder (e.g., media holder 126) of the printer. The media holder includes a reader (e.g., reader 860) positioned to align with and receive a signal from the smart cell.

At a step 908, the reader transmits the signal from the smart cell to a controller (e.g., controller 213) of the printer.

At a step 910, the controller determines, based on the signal received, a nip force associated with the type of printable media retained by the media cartridge.

At a step 912, the controller operates the driver to place the cam shaft in a rotational position (e.g., first rotational position 566*a*, second rotational position 566*b*, third rotational position 566*c*) corresponding to the nip force such that the force cam causes the push plate to apply the nip force to the printhead.

At a step 914, printing operations are performed by the printer with the nip force.

At a step 916, when the printing operations are completed by the printer, the controller may operate the driver to place the cam shaft in an idle rotational position (e.g., fourth rotational position 566*d*) such that the force cam does not engage the push plate.

It will be appreciated by those skilled in the art that while the above disclosure has been described above in connection with particular embodiments and examples, the above disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference as if each such patent or publication were individually incorporated by reference herein. Various features and advantages of the above disclosure are set forth in the following claims.

The invention claimed is:

1. A printhead assembly for use in a printer, comprising:
- a printhead positioned to engage a platen roller of the printer;
- a printhead holder retaining the printhead;
- a cam shaft designed to rotate into an idle position and one or more active positions;
- a force cam connected to the cam shaft and positioned to apply a downward force to the printhead; and
- a first lift cam and a second lift cam, the first and second lift cams connected to the cam shaft and positioned to engage the printhead holder,
- wherein the force cam causes the printhead to apply a nip force to the platen roller when the cam shaft is in any of the one or more active positions, and
- wherein the first and second lift cams engage the printhead holder and move the printhead out of engagement with the platen roller when the cam shaft is in the idle position.

2. The printhead assembly of claim 1, wherein the one or more active positions include a first active position, a second active position, and a third active position.

3. The printhead assembly of claim 2, wherein the nip force applied by the platen roller has a first strength when the cam shaft is in the first active position, a second strength when the cam shaft is in the second active position, and a third strength when the cam shaft is in the third active position, wherein the first strength is greater than the second strength and the third strength, and wherein the second strength is greater than the third strength.

4. The printhead assembly of claim 1, further comprising:
- a push plate in contact with the force cam and positioned above the printhead holder; and
- a first spring and a second spring positioned between the push plate and the printhead holder.

5. The printhead assembly of claim 4, wherein the force cam includes a first surface and a second surface arranged to engage the push plate depending on the position of the cam shaft, and wherein the push plate is positioned closer to the printhead holder when engaged by the first surface of the force cam than when the push plate is engaged by the second surface of the force cam.

6. The printhead assembly of claim 1, further comprising:
- a cam adjustment gear connected to the cam shaft and configured to rotate therewith;
- a driver configured to generate rotational motion of a pinion gear connected to the driver; and
- a gear train arranged to transmit the rotational motion of the pinion gear to the cam adjustment gear.

7. The printhead assembly of claim 6, further comprising:
- a sensor flag connected to the cam adjustment gear and extending outwardly therefrom; and
- a sensor positioned to detect the sensor flag.

8. The printhead assembly of claim 7, wherein the sensor is configured to generate a signal indicative of the rotational position of the cam shaft based on the position of the sensor flag.

9. A printhead control system for a printer, comprising:
- a printhead assembly including:
  - a printhead retained by a printhead holder and arranged to engage a platen roller of the printer;
  - a cam shaft designed to rotate into one or more rotational positions;
  - a force cam configured to apply a downward force to the printhead holder;
  - a lift cam configured to apply an upward force to the printhead holder;
  - a cam adjustment gear connected to the cam shaft and configured to rotate therewith; and
  - a sensor arranged to detect the rotational position of the cam shaft;
- a gear subassembly including a driver configured to generate rotational motion and a gear member arranged to transmit the rotational motion generated by the driver to the cam adjustment gear; and
- a controller of the printer configured to operate the gear subassembly to place the cam shaft in a desired rotational position.

10. The printhead control system of claim 9, wherein the one or more rotational positions include a first rotational position, a second rotational position, a third rotational position, and a fourth rotational position.

11. The printhead control system of claim 10, wherein the force cam applies a first nip force to the printhead holder when the cam shaft is in the first position, wherein the force cam applies a second nip force to the printhead holder when the cam shaft is in the second position, and wherein the force cam applies a third nip force to the printhead holder when the cam shaft is in the third position.

12. The printhead control system of claim 10, wherein the lift cam engages the printhead holder and lifts the printhead out of engagement with the platen roller when the cam shaft is in the fourth rotational position.

13. The printhead control system of claim 9, wherein the cam adjustment gear includes a sensor flag, and wherein the sensor is arranged to detect the sensor flag.

14. The printhead control system of claim 13, wherein the sensor transmits a signal indicating the rotational position of the cam shaft to the controller.

15. The printhead control system of claim 9, further comprising:

a media cartridge retaining a supply of printable media for use with the printer, the media cartridge including a smart cell; and a media holder of the printer, the media holder including a reader designed to receive a signal from the smart cell.

16. The printhead control system of claim 15, wherein the reader transmits the signal received from the smart cell to the controller, and wherein the controller determines what type of printable media is installed based on the signal received from the reader.

17. The printhead control system of claim 16, wherein the controller determines a nip force setting based on the type of printable media installed in the printer.

18. The printhead control system of claim 17, wherein the controller operates the gear subassembly to place the cam shaft in a rotational position corresponding to the nip force setting.

19. The printhead control system of claim 9, wherein the controller selects a nip force setting based on a type of printable media installed in the printer, and wherein the controller operates the gear subassembly to place the cam shaft in the rotational position corresponding to the nip force setting.

20. A method of adjusting a nip force setting of a printhead in a printer, comprising:

providing a printhead assembly including a printhead, a push plate arranged to apply a downward force to the printhead, a cam shaft with a force cam positioned thereon and configured to rotate therewith, and a driver configured to change the rotational position of the cam shaft;

providing a media cartridge including a smart cell, wherein the smart cell includes an electronic chip, the media cartridge retaining a supply of printable media for use with the printer;

positioning the media cartridge on a media holder of the printer such that a reader positioned on the media holder aligns with and receives a signal from the smart cell;

transmitting the signal received from the smart cell to a controller of the printer;

determining, based on the signal received, a nip force associated with a type of printable media retained by the media cartridge;

operating the driver to place the cam shaft in a rotational position corresponding to the nip force such that the force cam causes the push plate to apply the nip force to the printhead; and performing printing operations with the nip force.

* * * * *